US012600425B2

(12) United States Patent
Sakohata et al.

(10) Patent No.: US 12,600,425 B2
(45) Date of Patent: Apr. 14, 2026

(54) DETECTION SYSTEM, DETECTION METHOD, AND COMPUTER-READABLE STORAGE MEDIUM

(71) Applicant: SHIMANO INC., Sakai City (JP)

(72) Inventors: Rei Sakohata, Sakai City (JP); Kazuki Koshiyama, Sakai City (JP)

(73) Assignee: SHIMANO INC., Sakai (JP)

( * ) Notice: Subject to any disclaimer, the term of this patent is extended or adjusted under 35 U.S.C. 154(b) by 74 days.

(21) Appl. No.: 18/665,518

(22) Filed: May 15, 2024

(65) Prior Publication Data

US 2025/0353564 A1 Nov. 20, 2025

(51) Int. Cl.
*B62J 50/22* (2020.01)
*B62J 45/41* (2020.01)

(52) U.S. Cl.
CPC .............. *B62J 50/22* (2020.02); *B62J 45/41* (2020.02)

(58) Field of Classification Search
CPC .................................. B62J 50/22; B62J 45/41
See application file for complete search history.

(56) References Cited

U.S. PATENT DOCUMENTS

| | | | | |
|---|---|---|---|---|
| 10,493,994 | B1 * | 12/2019 | Fields | B60W 50/12 |
| 10,933,855 | B2 * | 3/2021 | Dhingra | B60T 15/041 |
| 11,090,542 | B2 * | 8/2021 | Hawkins, III | A63B 69/16 |
| 12,026,729 | B1 * | 7/2024 | Sanchez | G06N 5/04 |
| 12,102,872 | B1 * | 10/2024 | Striemer | A61B 5/1114 |
| 12,441,331 | B2 * | 10/2025 | Austin | B60W 40/08 |
| 2006/0272903 | A1 * | 12/2006 | Watarai | B62J 45/423 188/24.11 |
| 2009/0105919 | A1 * | 4/2009 | Karnjate | B60T 8/3275 701/70 |
| 2010/0311017 | A1 * | 12/2010 | Coil | G09B 9/052 701/31.4 |
| 2016/0039496 | A1 * | 2/2016 | Hancock | B60W 10/10 701/60 |
| 2016/0362118 | A1 * | 12/2016 | Mollicone | G05D 1/0276 |
| 2017/0089274 | A1 * | 3/2017 | Kolhouse | F02D 11/105 |
| 2017/0225742 | A1 * | 8/2017 | Hancock | B62M 6/45 |
| 2018/0130369 | A1 * | 5/2018 | McQuade | G07C 9/29 |
| 2019/0202424 | A1 | 7/2019 | Miller et al. | |
| 2019/0250619 | A1 * | 8/2019 | Gillett | B62M 6/45 |
| 2020/0114242 | A1 | 4/2020 | Carlson et al. | |
| 2023/0083770 | A1 * | 3/2023 | Kurotobi | B62J 45/41 701/2 |

(Continued)

FOREIGN PATENT DOCUMENTS

| | | | | |
|---|---|---|---|---|
| CN | 115661934 | A * | 1/2023 | |
| JP | H09254861 | A * | 9/1997 | B60L 7/12 |

*Primary Examiner* — Chico A Foxx
(74) *Attorney, Agent, or Firm* — MORI & WARD, LLP

(57) ABSTRACT

A detection system comprises a first sensor, a second sensor, and electronic controller circuitry. The first sensor is configured to obtain brake information relating to braking of a brake device of a human-powered vehicle. The second sensor is configured to obtain vehicle information including at least one of: motion information relating to a motion of the human-powered vehicle; and geographical information relating to a geographical location of the human-powered vehicle. The electronic controller circuitry is configured to determine a technical level of a rider of the human-powered vehicle based on the brake information and the vehicle information.

21 Claims, 24 Drawing Sheets

(56)　　　　　　References Cited

U.S. PATENT DOCUMENTS

| | | | |
|---|---|---|---|
| 2023/0105137 A1* | 4/2023 | Tsai | B60T 13/662 |
| | | | 303/137 |
| 2024/0053146 A1* | 2/2024 | Arai | B62J 45/414 |
| 2024/0078854 A1* | 3/2024 | Chandrasekaran | |
| | | | B61L 15/0081 |
| 2025/0178379 A1* | 6/2025 | Nonaka | B60C 11/1369 |
| 2025/0256804 A1 | 8/2025 | Oishi et al. | |

* cited by examiner

*FIG. 15*

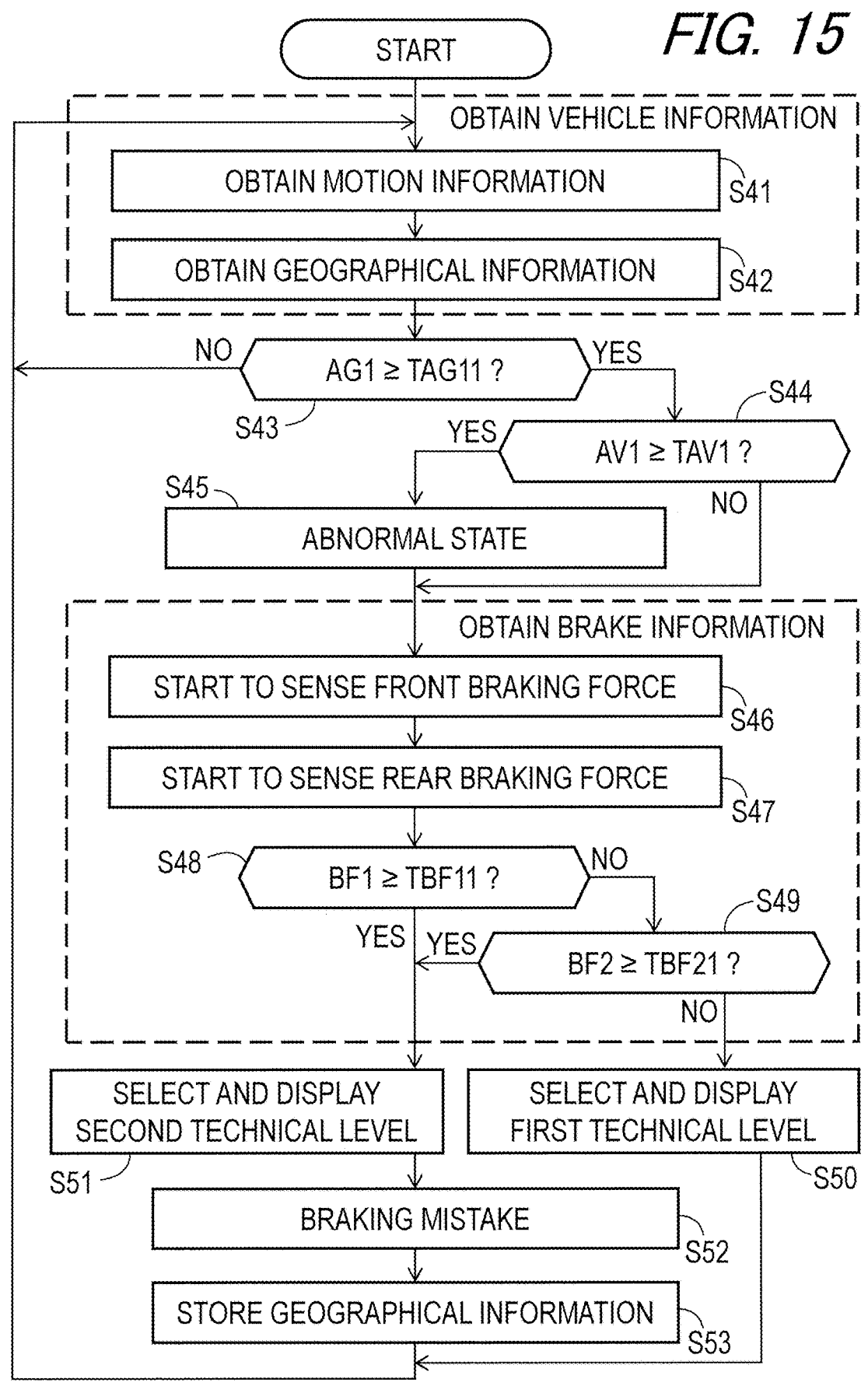

START

OBTAIN VEHICLE INFORMATION

OBTAIN MOTION INFORMATION          S41

OBTAIN GEOGRAPHICAL INFORMATION          S42

NO          AG1 ≥ TAG11 ?          YES

S43

YES          AV1 ≥ TAV1 ?          S44

S45

ABNORMAL STATE          NO

OBTAIN BRAKE INFORMATION

START TO SENSE FRONT BRAKING FORCE          S46

START TO SENSE REAR BRAKING FORCE          S47

S48          BF1 ≥ TBF11 ?          NO

S49

YES          YES          BF2 ≥ TBF21 ?

NO

SELECT AND DISPLAY SECOND TECHNICAL LEVEL          SELECT AND DISPLAY FIRST TECHNICAL LEVEL

S51          S50

BRAKING MISTAKE          S52

STORE GEOGRAPHICAL INFORMATION          S53

DETECTION SYSTEM, DETECTION METHOD, AND COMPUTER-READABLE STORAGE MEDIUM

BACKGROUND

Technical Field

The present invention relates to a detection system, a detection method, and a computer-readable storage medium.

Background Information

A technical skill of a user of a human-powered vehicle affects motions of the human-powered vehicle. One of objects of the present disclosure is to improve the accuracy of selection of the technical skill using a detection system.

SUMMARY

In accordance with a first aspect of the present invention, a detection system comprises a first sensor, a second sensor, and electronic controller circuitry. The first sensor is configured to obtain brake information relating to braking of a brake device of a human-powered vehicle. The second sensor is configured to obtain vehicle information including at least one of: motion information relating to a motion of the human-powered vehicle; and geographical information relating to a geographical location of the human-powered vehicle. The electronic controller circuitry is configured to determine a technical level of a rider of the human-powered vehicle based on the brake information and the vehicle information.

With the detection system according to the first aspect, it is possible to improve the accuracy of selection of the technical level using the brake information and the vehicle information.

In accordance with a second aspect of the present invention, the detection system according to the first aspect is configured so that the electronic controller circuitry is configured to determine the technical level based on the brake information and the motion information.

With the detection system according to the second aspect, it is possible to improve the accuracy of selection of the technical level using the brake information and the motion information.

In accordance with a third aspect of the present invention, the detection system according to the first or second aspect is configured so that the electronic controller circuitry is configured to determine the technical level based on the brake information and the geographical information.

With the detection system according to the third aspect, it is possible to improve the accuracy of selection of the technical level using the brake information and the geographical information.

In accordance with a fourth aspect of the present invention, the detection system according to any one of the first to third aspects is configured so that the first sensor is configured to be provided to the brake device.

With the detection system according to the fourth aspect, it is possible to improve the accuracy of the brake information.

In accordance with a fifth aspect of the present invention, the detection system according to any one of the first to fourth aspects is configured so that the first sensor includes a strain gauge.

With the detection system according to the fifth aspect, it is possible to obtain the brake information with a comparatively simple structure.

In accordance with a sixth aspect of the present invention, the detection system according to any one of the first to fifth aspects is configured so that the second sensor is configured to be provided to a vehicle body of the human-powered vehicle.

With the detection system according to the sixth aspect, it is possible to improve the accuracy of the vehicle information using the second sensor.

In accordance with a seventh aspect of the present invention, the detection system according to any one of the first to sixth aspects is configured so that the second sensor includes a motion sensor configured to obtain the motion information.

With the detection system according to the seventh aspect, it is possible to improve the accuracy of the motion information using the motion sensor.

In accordance with an eighth aspect of the present invention, the detection system according to the seventh aspect is configured so that the motion sensor includes an acceleration sensor configured to obtain, as the motion information, acceleration applied to the human-powered vehicle.

With the detection system according to the eighth aspect, it is possible to obtain the motion information with a comparatively simple structure.

In accordance with a ninth aspect of the present invention, the detection system according to any one of the first to eighth aspects is configured so that the second sensor includes a location sensor configured to obtain the geographical information.

With the detection system according to the ninth aspect, it is possible to improve the accuracy of the geographical information using the location sensor.

In accordance with a tenth aspect of the present invention, the detection system according to the ninth aspect is configured so that the location sensor includes a GPS sensor.

With the detection system according to the tenth aspect, it is possible to obtain the motion information with a comparatively simple structure.

In accordance with an eleventh aspect of the present invention, a detection system comprises a sensor and electronic controller circuitry. The sensor is configured to obtain motion information relating to a motion of a human-powered vehicle. The electronic controller circuitry is configured to determine a technical level of a rider of the human-powered vehicle based on the motion information.

With the detection system according to the eleventh aspect, it is possible to improve the accuracy of selection of the technical level using the motion sensor and the motion information.

In accordance with a twelfth aspect of the present invention, the detection system according to any one of the first to eleventh aspects is configured so that the technical level includes a first technical level and a second technical level. The electronic controller circuitry is configured to select the first technical level in a case where the brake information meets a first brake condition and where the vehicle information meets a first vehicle condition. The electronic controller circuitry is configured to select the second technical level in a case where the brake information meets a second brake condition and where the vehicle information meets the first vehicle condition, the second brake condition being different from the first brake condition.

With the detection system according to the twelfth aspect, it is possible to reliably improve the accuracy of selection of the technical level using the brake information and the vehicle information.

In accordance with a thirteenth aspect of the present invention, the detection system according to any one of the first to twelfth aspects is configured so that the technical level includes a first technical level and a second technical level. The electronic controller circuitry is configured to select the first technical level in a case where the brake information meets a first brake condition and where the motion information meets a first motion condition. The electronic controller circuitry is configured to select the second technical level in a case where the brake information meets a second brake condition and where the motion information meets the first motion condition, the second brake condition being different from the first brake condition.

With the detection system according to the thirteenth aspect, it is possible to reliably improve the accuracy of selection of the technical level using the brake information and the motion information.

In accordance with a fourteenth aspect of the present invention, the detection system according to any one of the first to thirteenth aspects is configured so that the technical level includes a first technical level and a second technical level. The electronic controller circuitry is configured to select the first technical level in a case where the brake information meets a first brake condition and where the geographical information meets a first geographical condition. The electronic controller circuitry is configured to select the second technical level in a case where the brake information meets a second brake condition and where the geographical information meets the first geographical condition, the second brake condition being different from the first brake condition.

With the detection system according to the fourteenth aspect, it is possible to reliably improve the accuracy of selection of the technical level using the brake information and the geographical information.

In accordance with a fifteenth aspect of the present invention, the detection system according to any one of the twelfth to fourteenth aspects is configured so that the electronic controller circuitry is configured to determine whether the human-powered vehicle is cornering based on the motion information.

With the detection system according to the fifteenth aspect, it is possible to improve the accuracy of selection of the technical level relating to cornering.

In accordance with a sixteenth aspect of the present invention, the detection system according to the fifteenth aspect is configured so that the electronic controller circuitry is configured to select the first technical level in a case where the human-powered vehicle is cornering and where a braking time for which the braking is executed meets a braking-time condition.

With the detection system according to the sixteenth aspect, it is possible to improve the accuracy of selection of the technical level relating to cornering and the braking.

In accordance with a seventeenth aspect of the present invention, the detection system according to the fifteenth or sixteenth aspect is configured so that the electronic controller circuitry is configured to select the first technical level in a case where the human-powered vehicle is cornering and where a state of the human-powered vehicle is in a predetermined state.

With the detection system according to the seventeenth aspect, it is possible to reliably improve the accuracy of selection of the technical level relating to cornering.

In accordance with an eighteenth aspect of the present invention, the detection system according to any one of the twelfth to seventeenth aspects is configured so that the electronic controller circuitry is configured to determine whether the human-powered vehicle is going straight based on the motion information.

With the detection system according to the eighteenth aspect, it is possible to improve the accuracy of selection of the technical level relating to going-straight.

In accordance with a nineteenth aspect of the present invention, the detection system according to the eighteenth aspect is configured so that the electronic controller circuitry is configured to select the first technical level in a case where the human-powered vehicle is going straight and where a braking time for which the braking is executed meets a braking-time condition.

With the detection system according to the nineteenth aspect, it is possible to reliably improve the accuracy of selection of the technical level relating to cornering and braking.

In accordance with a twentieth aspect of the present invention, the detection system according to any one of the twelfth to nineteenth aspects is configured so that the electronic controller circuitry is configured to determine, based on the geographical information, a time period for which the human-powered vehicle travels in a section selected by a user. The electronic controller circuitry is configured to select the first technical level in a case: where a relationship between front power of a front brake device and rear power of a rear brake device meets a brake power condition; or where a slip ratio of the rear brake device meets a rear brake slip condition.

With the detection system according to the twentieth aspect, it is possible to improve the accuracy of selection of the technical level relating to braking.

In accordance with a twenty-first aspect of the present invention, a detection method comprises: obtaining brake information relating to braking of a brake device of a human-powered vehicle using a first sensor; obtaining, using a second sensor, vehicle information including at least one of: motion information relating to a motion of the human-powered vehicle; and geographical information relating to a geographical location of the human-powered vehicle; and determining, using electronic controller circuitry, a technical level of a rider of the human-powered vehicle based on the brake information and the vehicle information.

With the detection method according to the twenty-first aspect, it is possible to improve the accuracy of selection of the technical level using the brake information and the vehicle information.

In accordance with a twenty-second aspect of the present invention, a computer-readable storage medium storing program instructions for causing a detection system to execute a detection method comprises: obtaining brake information relating to braking of a brake device of a human-powered vehicle using a first sensor; obtaining, using a second sensor, vehicle information including at least one of: motion information relating to a motion of the human-powered vehicle; and geographical information relating to a geographical location of the human-powered vehicle; and determining, using electronic controller circuitry, a technical level of a rider of the human-powered vehicle based on the brake information and the vehicle information.

With the computer-readable storage medium according to the twenty-second aspect, it is possible to improve the accuracy of selection of the technical level using the brake information and the vehicle information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 15 to 24 show flowcharts of the detection system in accordance with modifications.

DESCRIPTION OF THE EMBODIMENTS

Figure 1:
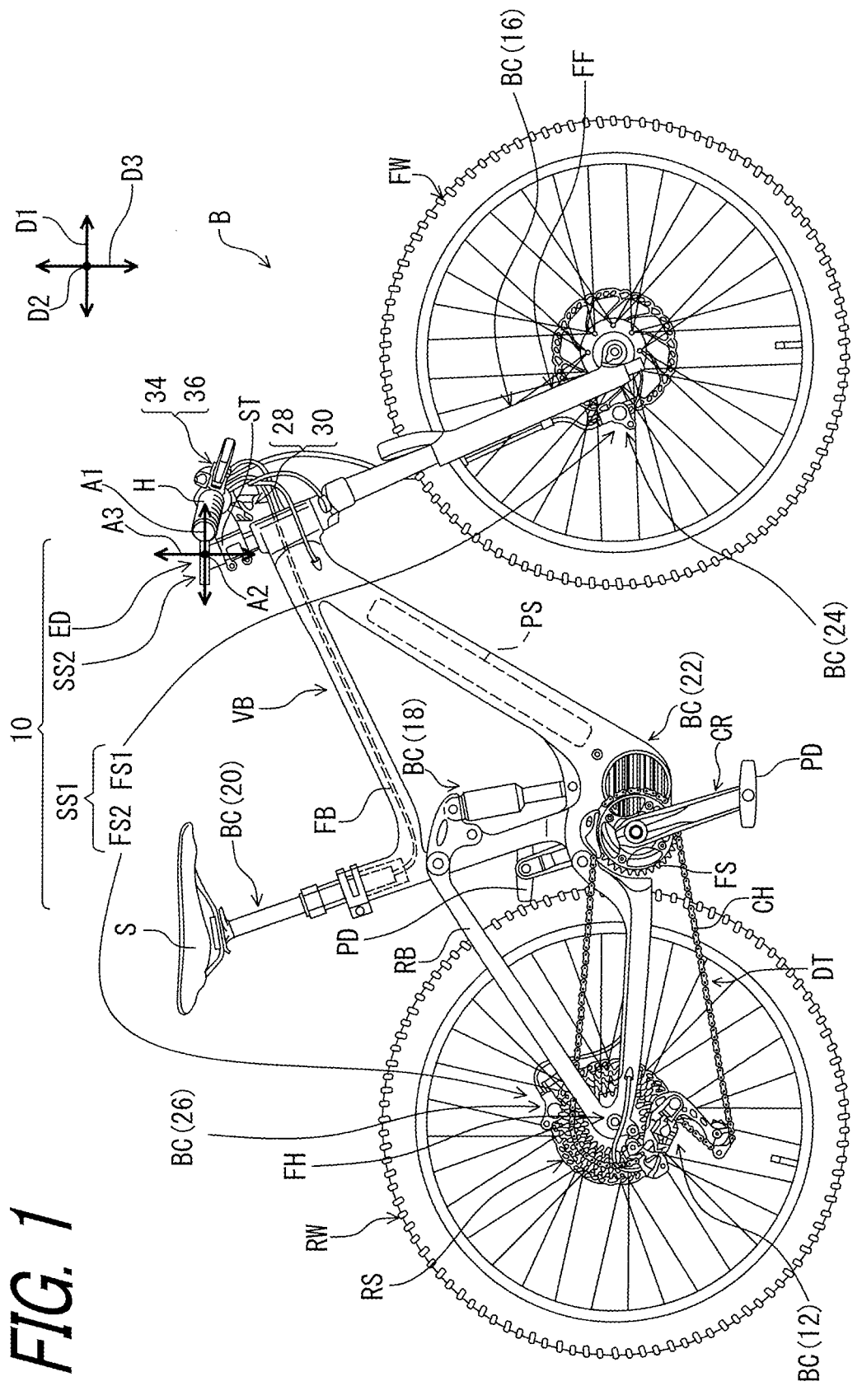
FIG. 1 is a side elevational view of a human-powered vehicle including a detection system in accordance with one of embodiments.

The embodiments will now be described with reference to the accompanying drawings, wherein like reference numerals designate corresponding or identical elements throughout the various drawings.

Referring initially to FIG. 1, a human-powered vehicle B includes a detection system 10 in accordance with one of embodiments. The human-powered vehicle B includes at least one human-powered vehicle component BC.

In the present application, the term "human-powered vehicle" includes a vehicle to travel with a motive power including at least a human power of a user who rides the vehicle. The human-powered vehicle includes a various kind of bicycles such as a mountain bike, a road bike, a city bike, a cargo bike, a hand bike, and a recumbent bike. Furthermore, the human-powered vehicle includes an electric bike called as an E-bike. The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only a driving source as motive power. Examples of the driving source include an internal-combustion engine and an electric motor. Generally, a light road vehicle, which includes a vehicle that does not require a driver's license for a public road, is assumed as the human-powered vehicle.

The human-powered vehicle B includes a vehicle body VB, a wheel FW, and a wheel RW. The wheel FW is rotatably coupled to the vehicle body VB. The wheel RW is rotatably coupled to the vehicle body VB. The vehicle body VB is supported by the wheels FW and RW. The wheel FW can also be referred to as a front wheel FW. The wheel RW can also be referred to as a rear wheel RW.

The vehicle body VB includes a front frame body FB, a rear frame body RB, a handlebar H, a stem ST, and a front fork FF. The rear frame body RB includes a swing arm. The rear frame body RB is movably coupled to the front frame body FB. The rear frame body RB is pivotally coupled to the front frame body FB. The front fork FF is pivotally coupled to the front frame body FB. The handlebar H is coupled to the front fork FF via the stem ST to be pivotable relative to the front frame body FB along with the front fork FF.

The human-powered vehicle B further includes a drivetrain DT. Here, for example, the drivetrain DT is a chain-drive type and includes a crank CR, at least one front sprocket FS, at least two rear sprockets RS, a chain CH, and pedals PD. The crank CR is rotatably coupled to the vehicle body VB. The at least one front sprocket FS is coupled to the crank CR to rotate relative to the vehicle body VB along with the crank CR. The rear sprockets RS are provided on a hub assembly FH of the wheel RW. The chain CH is configured to be engaged with one of the at least one front sprocket FS and one of the at least two rear sprockets RS. The pedals PD are coupled to the crank CR. A human driving force is applied to the pedals PD by a rider such that the human driving force is transmitted to the wheel RW via the at least one front sprocket FS, the chain CH, and the at least two rear sprockets RS. While the drivetrain DT is illustrated as a chain-drive type of drivetrain, the drivetrain DT can be selected from any type of drivetrain and can be a belt-drive type or a shaft-drive type.

In the present application, the following directional terms "front," "rear," "forward," "rearward," "left," "right," "transverse," "upward" and "downward" as well as any other similar directional terms refer to those directions which are determined based on the user who is in the user's standard position in the human-powered vehicle B while the user faces toward a handlebar or steering. Examples of the user's standard position include a saddle and a seat. Accordingly, these terms, as utilized to describe the detection system 10, the human-powered vehicle component BC, or other components, should be interpreted relative to the human-powered vehicle B equipped with the detection system 10, the human-powered vehicle component BC, or other components as used in an upright riding position on a horizontal surface.

As seen in FIG. 1, the at least one human-powered vehicle component BC includes a gear changer 12, a suspension 16, a suspension 18, an adjustable seatpost 20, an assist drive unit 22, a brake device 24, a brake device 26, and an electric device ED. Namely, the human-powered vehicle B includes the gear changer 12, the suspension 16, the suspension 18, the adjustable seatpost 20, the assist drive unit 22, the brake device 24, and the brake device 26. The gear changer 12 is configured to be mounted to the vehicle body VB. The suspension 16 is configured to be mounted to the vehicle body VB. The suspension 18 is configured to be mounted to the vehicle body VB. The adjustable seatpost 20 is configured to be mounted to the vehicle body VB. The assist drive unit 22 is configured to be mounted to the vehicle body VB.

The brake device 24 is configured to be mounted to the vehicle body VB. The brake device 26 is configured to be mounted to the vehicle body VB. The brake device 24 can also be referred to as a front brake device 24. The brake device 26 can be referred to as a rear brake device 26.

The gear changer 12 is configured to change a gear ratio of the human-powered vehicle B. The gear ratio is a ratio of a rotational speed of the at least two rear sprockets RS to a rotational speed of the at least one front sprocket FS. The gear changer 12 is configured to shift the chain CH relative to the at least two rear sprockets RS. In the present embodiment, the gear changer 12 includes a rear derailleur. However, the gear changer 12 can include another type of gear changer if needed or desired. Examples of another type of gear changer include a front derailleur and an internal-gear hub.

The suspension 16 is configured to absorb or damp shocks or vibrations generated by riding on rough terrain. The suspension 16 is installed in the front fork FF. The suspension 16 and the front fork FF constitute a suspension fork. The suspension 16 is configured to absorb or damp shocks or vibrations transmitted from at least one of the wheels FW and RW.

The suspension 18 is configured to absorb or damp shocks or vibrations generated by riding on rough terrain. The suspension 18 is coupled to the front frame body FB and the rear frame body RB. The suspension 18 is configured to absorb or damp shocks or vibrations transmitted from at least one of the wheels FW and RW.

The adjustable seatpost 20 is configured to change a height of the saddle S relative to the vehicle body VB. The adjustable seatpost 20 has an adjustable state and a locked state. The adjustable seatpost 20 allows the user to change the height of the saddle S in the adjustable state. The adjustable seatpost 20 is locked to maintain the height of the saddle S in the locked state. The adjustable seatpost 20 is configured to change the state of the adjustable seatpost 20 between the adjustable state and the locked state.

The assist drive unit 22 is configured to assist propulsion of the human-powered vehicle B. The assist drive unit 22 is configured to change an assist ratio depending on a human power applied to the human-powered vehicle B. For example, the assist drive unit 22 is configured to change the assist ratio depending on pedaling torque applied to the crank CR.

Examples of the electric device ED includes a smartphone, a tablet computer, a personal computer, a wearable device, and a cycle computer. Examples of the wearable device include a watch, a bracelet, a ring, a necklace, a belt, a helmet, and a device attachable to these items. In the present embodiment, the electric device ED has a function other than a function relating to the human-powered vehicle B. For example, the function other than a function relating to the human-powered vehicle B includes at least one of making a phone call, texting and browsing a website. The electronic controller circuitry EC1 has a function other than the function relating to the human-powered vehicle B. Alternatively, the electric device ED can have only a function relating to the human-powered vehicle B if needed or desired. The electronic controller circuitry EC1 can have only a function relating to the human-powered vehicle B if needed or desired. The electric device ED can also be referred to as an external device ED.

As seen in FIG. 1, the human-powered vehicle B includes a first operating device 28 and a second operating device 30. The first operating device 28 is configured to be mounted to the handlebar H in a conventional manner. The first operating device 28 is configured to receive a first user operation. The first operating device 28 is configured to operate at least one of the at least one human-powered vehicle component BC in response to the first user operation. The second operating device 30 is configured to be mounted to the handlebar H in a conventional manner. The second operating device 30 is configured to receive a second user operation. The second operating device 30 is configured to operate at least one of the at least one human-powered vehicle component BC in response to the second user operation.

The first operating device 28 is configured to operate at least one of the gear changer 12, the suspension 16, the suspension 18, the adjustable seatpost 20, and the assist drive unit 22 in response to the first user operation. The second operating device 30 is configured to operate at least one of the gear changer 12, the suspension 16, the suspension 18, the adjustable seatpost 20, and the assist drive unit 22 in response to the second user operation. The at least one human-powered vehicle component BC can include another operating device other than the first operating device 28 and the second operating device 30 if needed or desired.

The first operating device 28 is electrically connected to at least one of the gear changer 12, the suspension 16, the suspension 18, the adjustable seatpost 20, and the assist drive unit 22. The second operating device 30 is electrically connected to another of the gear changer 12, the suspension 16, the suspension 18, the adjustable seatpost 20, and the assist drive unit 22. In the present embodiment, the first operating device 28 is wirelessly connected to at least one of the gear changer 12, the suspension 16, the suspension 18, the adjustable seatpost 20, and the assist drive unit 22. The second operating device 30 is wirelessly connected to another of the gear changer 12, the suspension 16, the suspension 18, the adjustable seatpost 20, and the assist drive unit 22. However, the first operating device 28 can be electrically connected to at least one of the gear changer 12, the suspension 16, the suspension 18, the adjustable seatpost 20, and the assist drive unit 22 via an electric cable if needed or desired. The second operating device 30 can be electrically connected to another of the gear changer 12, the suspension 16, the suspension 18, the adjustable seatpost 20, and the assist drive unit 22 via an electric cable if needed or desired.

As seen in FIG. 1, the human-powered vehicle B includes an electric power source PS. Here, the electric power source PS includes a battery pack that includes one or more batteries. For example, the electric power source PS includes one or more rechargeable batteries.

The electric power source PS is configured to be mounted to the vehicle body VB. For example, the electric power source PS is configured to be provided in the downtube of the vehicle body VB. Alternatively, the electric power source PS can be attached an outer surface of the vehicle body VB.

The electric power source PS is configured to be electrically connected to at least one of the at least one human-powered vehicle component BC to supply electrical power to the at least one of the at least one human-powered vehicle component BC. The electric power source PS is configured to be electrically connected to at least one of the gear changer 12, the suspension 16, the suspension 18, the adjustable seatpost 20, the assist drive unit 22, the first operating device 28, and the second operating device 30. The electric power source PS is configured to supply electrical power to the at least one of the gear changer 12, the suspension 16, the suspension 18, the adjustable seatpost 20, the assist drive unit 22, the first operating device 28, and the second operating device 30. At least one of the gear changer 12, the suspension 16, the suspension 18, the adjustable seatpost 20, the assist drive unit 22, the first operating device 28, and the second operating device 30 can include another electric power source in a case where the electric power source PS is not electrically connected to the at least one of the gear changer 12, the suspension 16, the suspension 18, the adjustable seatpost 20, the assist drive unit 22, the first operating device 28, and the second operating device 30.

As seen in FIG. 1, the human-powered vehicle B includes a brake operating device 34 and a brake operating device 36. The brake operating device 34 is configured to be mounted to the vehicle body VB. The brake operating device 36 is configured to be mounted to the vehicle body VB. For example, the brake operating device 34 is configured to be mounted to the handlebar H. The brake operating device 36 is configured to be mounted to the handlebar H. The brake operating device 34 is configured to receive a user brake operation and is configured to operate the brake device 24 in response to the user brake operation. The brake operating device 36 is configured to receive a user brake operation and is configured to operate the brake device 26 in response to the user brake operation.

The brake device 24 is configured to apply braking force to the wheel FW in response to the user brake operation received by the brake operating device 34. The brake device 26 is configured to apply braking force to the wheel RW in response to the user brake operation received by the brake operating device 36.

Figure 2:
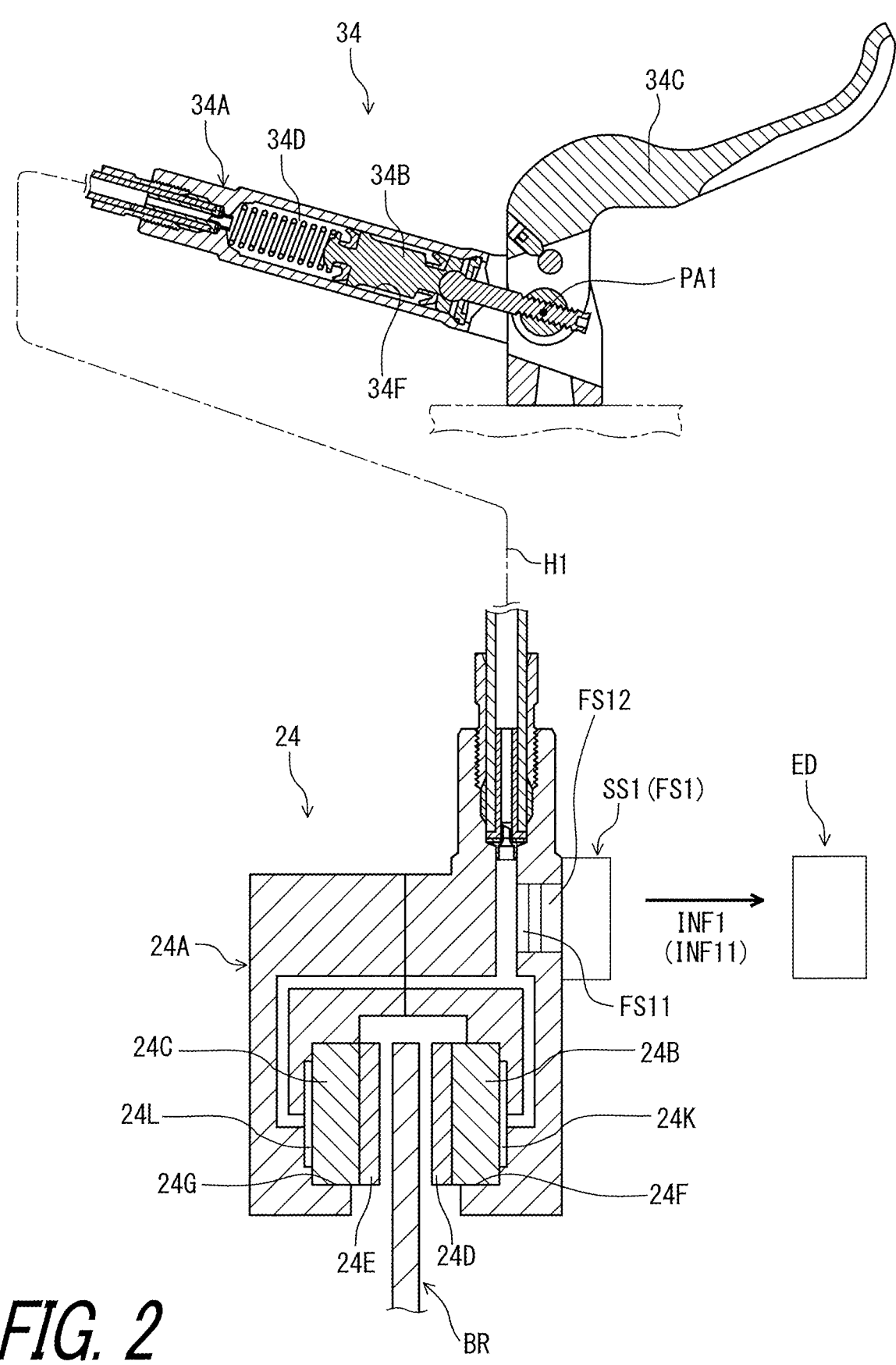
FIG. 2 is a cross-sectional view of a brake operating device and a brake device of the human-powered vehicle illustrated in FIG. 1.

As seen in FIG. 2, the brake device 24 is configured to be connected with the brake operating device 34 via a hydraulic hose H1. The brake device 24 includes a caliper body 24A, a piston 24B, a piston 24C, a brake pad 24D, a brake pad 24E, a hydraulic chamber 24K, and a hydraulic chamber 24L. The caliper body 24A includes a hole 24F and a hole 24G. The piston 24B is movably provided in the hole 24F. The piston 24C is movably provided in the hole 24G. The hydraulic chamber 24K is defined by the caliper body 24A and the piston 24B in the hole 24F. The hydraulic chamber 24L is defined by the caliper body 24A and the piston 24C in the hole 24G. The hydraulic chambers 24K and 24L are connected to the brake operating device 34 via the hydraulic hose H1.

The brake pads 24D and 24E are provided between the pistons 24B and 24C. The brake pad 24D is slidable with a disc brake rotor BR. The brake pad 24E is slidable with the disc brake rotor BR. The piston 24B is configured to move the brake pad 24D relative to the caliper body 24A toward the disc brake rotor BR in response to a hydraulic pressure supplied from the brake operating device 34. The piston 24C is configured to move the brake pad 24E relative to the caliper body 24A toward the disc brake rotor BR in response to the hydraulic pressure supplied from the brake operating device 34.

The brake operating device 34 includes a base member 34A, a piston 34B, an operating member 34C, and a hydraulic chamber 34D. The base member 34A includes a hole 34F. The piston 34B is movably provided in the hole 34F. The hydraulic chamber 34D is defined by the base member 34A and the piston 34B in the hole 34F. The hydraulic chamber 34D is connected to the hydraulic chambers 24K and 24L via the hydraulic hose H1.

The operating member 34C is pivotally coupled to the base member 34A about a pivot axis PA1. The piston 34B is coupled to the operating member 34C to move relative to the base member 34A in response to the motion of the operating member 34C. Thus, the hydraulic pressure is supplied from the brake operating device 34 to the brake device 24 via the hydraulic hose H1.

Figure 3:
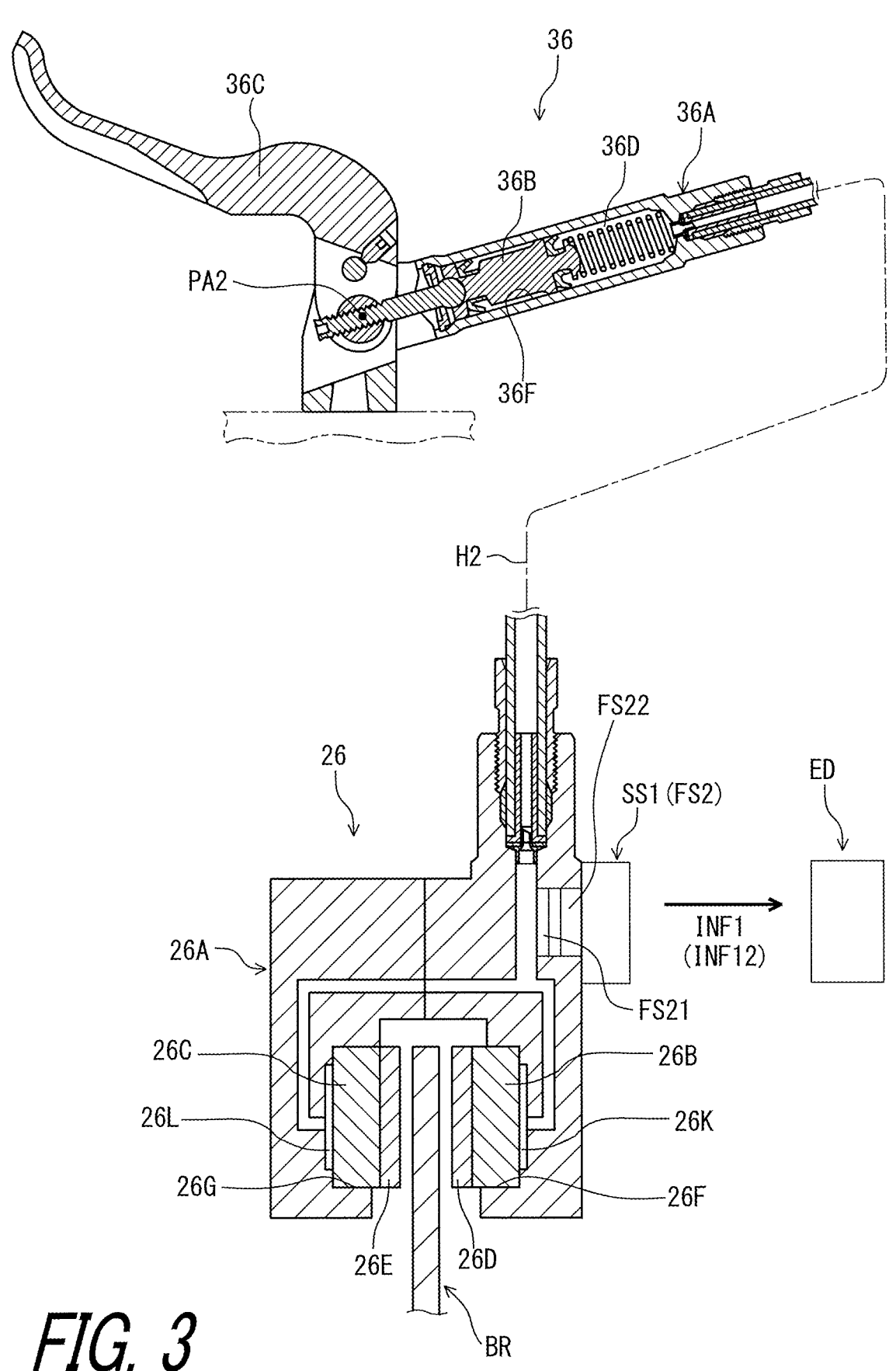
FIG. 3 is a cross-sectional view of a brake operating device and a brake device of the human-powered vehicle illustrated in FIG. 1.

As seen in FIG. 3, the brake device 26 is configured to be connected with the brake operating device 36 via a hydraulic hose H2. The brake device 26 includes a caliper body 26A, a piston 26B, a piston 26C, a brake pad 26D, a brake pad 26E, a hydraulic chamber 26K, and a hydraulic chamber 26L. The caliper body 26A includes a hole 26F and a hole 26G. The piston 26B is movably provided in the hole 26F. The piston 26C is movably provided in the hole 26G. The hydraulic chamber 26K is defined by the caliper body 26A and the piston 26B in the hole 26F. The hydraulic chamber 26L is defined by the caliper body 26A and the piston 26C in the hole 26G. The hydraulic chambers 26K and 26L are connected to the brake operating device 36 via the hydraulic hose H2.

The brake pads 26D and 26E are provided between the pistons 26B and 26C. The brake pad 26D is slidable with the disc brake rotor BR. The brake pad 26E is slidable with the disc brake rotor BR. The piston 26B is configured to move the brake pad 26D relative to the caliper body 26A toward the disc brake rotor BR in response to a hydraulic pressure supplied from the brake operating device 36. The piston 26C is configured to move the brake pad 26E relative to the caliper body 26A toward the disc brake rotor BR in response to the hydraulic pressure supplied from the brake operating device 36.

The brake operating device 36 includes a base member 36A, a piston 36B, an operating member 36C, and a hydraulic chamber 36D. The base member 36A includes a hole 36F. The piston 36B is movably provided in the hole 36F. The hydraulic chamber 36D is defined by the base member 36A and the piston 36B in the hole 36F. The hydraulic chamber 36D is connected to the hydraulic chambers 26K and 26L via the hydraulic hose H1.

The operating member 36C is pivotally coupled to the base member 36A about a pivot axis PA2. The piston 36B is coupled to the operating member 36C to move relative to the base member 36A in response to the motion of the operating member 36C. Thus, the hydraulic pressure is supplied from the brake operating device 36 to the brake device 26 via the hydraulic hose H2.

As seen in FIGS. 2 and 3, the detection system 10 comprises a first sensor SS1. The first sensor SS1 is configured to obtain brake information INF1 relating to braking of the brake device 24 and/or 26 of the human-powered vehicle B. The first sensor SS1 can also be referred to as a sensor SS1. Namely, the detection system 10 comprises a sensor SS1. The sensor is configured to obtain brake information INF1 relating to braking of the brake device 24 and/or 26 of the human-powered vehicle B.

The first sensor SS1 is configured to be provided to the brake device 24 and/or 26. The first sensor SS1 is configured to be provided to the caliper body 24A and/or 26A of the brake device 24 and/or 26.

As seen in FIG. 2, in the present embodiment, the first sensor SS1 includes a front force sensor FS1. The front force sensor FS1 is configured to be provided to the brake device 24. The front force sensor FS1 is configured to be provided to the caliper body 24A of the brake device 24.

The brake information INF1 includes front brake information INF11. The front force sensor FS1 is configured to obtain the front brake information INF11 relating to braking of the brake device 24 of the human-powered vehicle B. The front brake information INF11 includes front braking force generated by the brake device 24. The front force sensor FS1 is configured to sense, as the front brake information INF11, the front braking force generated by the brake device 24.

As seen in FIG. 3, the first sensor SS1 includes a rear force sensor FS2. The rear force sensor FS2 is configured to be provided to the brake device 26. The rear force sensor FS2 is configured to be provided to the caliper body 26A of the brake device 26.

The brake information INF1 includes rear brake information INF12. The rear force sensor FS2 is configured to obtain the rear brake information INF12 relating to braking of the brake device 26 of the human-powered vehicle B. The rear brake information INF12 includes rear braking force generated by the brake device 26. The rear force sensor FS2 is configured to sense, as the rear brake information INF12, the rear braking force generated by the brake device 26.

As seen in FIG. 2, the first sensor SS1 includes a strain gauge FS11. In the present embodiment, the front force sensor FS1 includes the strain gauge FS11. The strain gauge FS11 is configured to be provided to the caliper body 24A of the brake device 24. The strain gauge FS11 is configured to convert deformation of the strain gauge FS11 into a resistance value of the strain gauge FS11. The strain gauge FS11 is configured to be deformable in response to the hydraulic pressure supplied from the brake operating device 34. The structure of the front force sensor FS1 is not limited to the strain gauge FS11. For example, the front force sensor FS1 can include a piezoelectric element configured to convert deformation of the piezoelectric element into electricity.

The front force sensor FS1 includes an output circuit FS12. The output circuit FS12 is configured to convert the resistance value of the strain gauge FS11 into a voltage indicating the hydraulic pressure supplied from the brake operating device 34. Namely, the output circuit FS12 is configured to convert the resistance value of the strain gauge FS11 into the voltage indicating the front brake information INF11. The output circuit FS12 is electrically connected to the strain gauge FS11. The electronic controller circuitry EC1 is electrically connected to the front force sensor FS1 to receive the front brake information INF11 from the front force sensor FS1.

As seen in FIG. 3, the first sensor SS1 includes a strain gauge FS21. The rear force sensor FS2 includes the strain gauge FS21. The strain gauge FS21 is configured to be provided to the caliper body 26A of the brake device 26. The strain gauge FS21 is configured to convert deformation of the strain gauge FS21 into a resistance value of the strain gauge FS21. The strain gauge FS21 is configured to be deformable in response to the hydraulic pressure supplied from the brake operating device 36. The structure of the rear force sensor FS2 is not limited to the strain gauge FS21. For example, the rear force sensor FS2 can include a piezoelectric element configured to convert deformation of the piezoelectric element into electricity.

The rear force sensor FS2 includes an output circuit FS22. The output circuit FS22 is configured to convert the resistance value of the strain gauge FS21 into a voltage indicating the hydraulic pressure supplied from the brake operating device 36. Namely, the output circuit FS22 is configured to convert the resistance value of the strain gauge FS21 into the voltage indicating the rear brake information INF12. The output circuit FS22 is electrically connected to the strain gauge FS21. The electronic controller circuitry EC1 is electrically connected to the rear force sensor FS2 to receive the rear brake information INF12 from the rear force sensor FS2.

Figure 4:
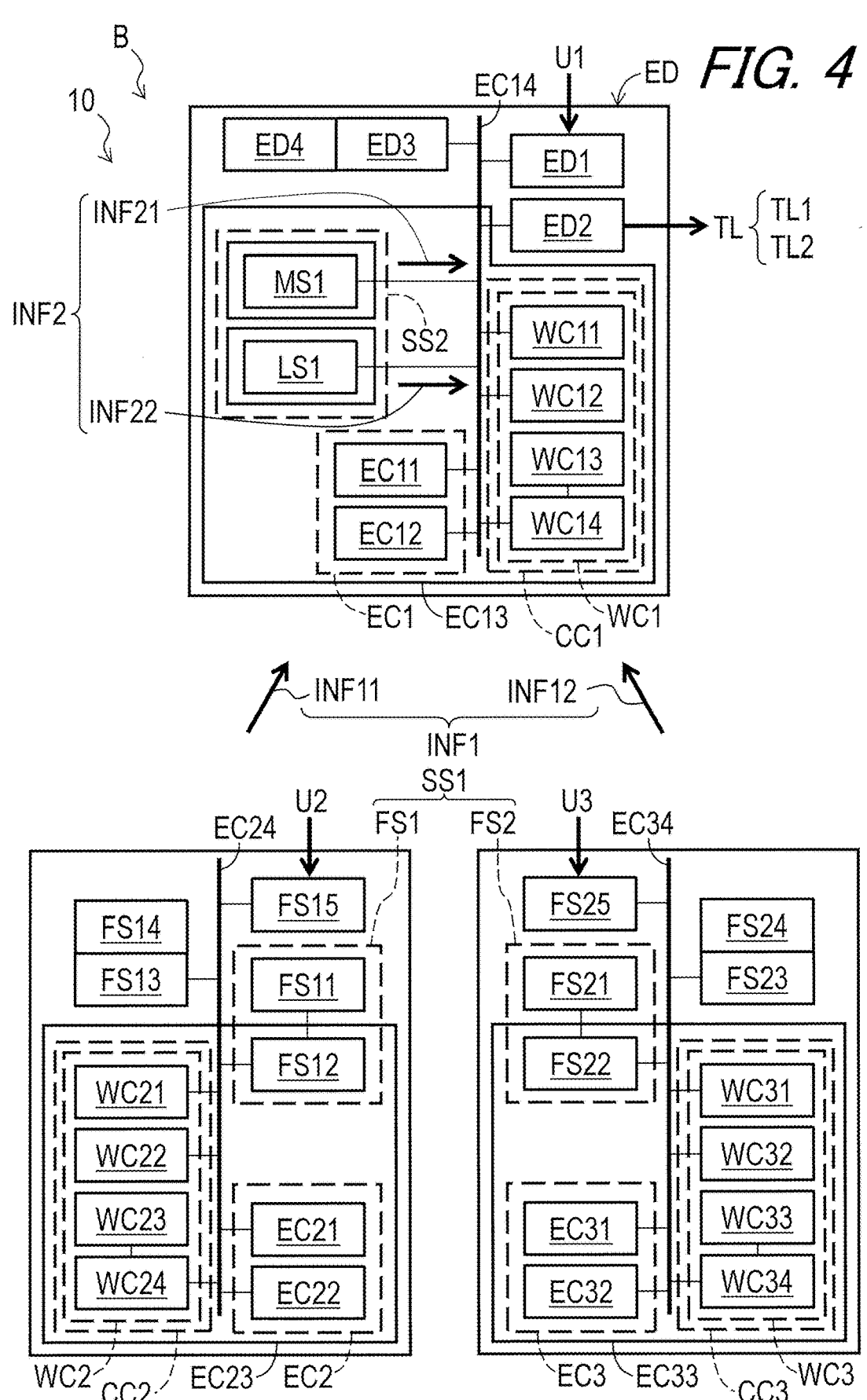
FIG. 4 is a schematic block diagram of the detection system of the human-powered vehicle illustrated in FIG. 1.

As seen in FIG. 4, the detection system 10 comprises electronic controller circuitry EC1. The detection system 10 comprises communicator circuitry CC1. In the present embodiment, the electric device ED includes the electronic controller circuitry EC1 and the communicator circuitry CC1. Alternatively, another of the at least one human-powered vehicle component BC can include the electronic controller circuitry EC1 and the communicator circuitry CC1 if needed or desired.

The electronic controller circuitry EC1 is electrically connected to the communicator circuitry CC1. The communicator circuitry CC1 is configured to wirelessly communicate with another communication device. The electronic controller circuitry EC1 is electrically connected to the communicator circuitry CC1 to control the communicator circuitry CC1.

The electronic controller circuitry EC1 includes a processor EC11 and a memory EC12. The electric device ED includes a circuit board EC13 and a system bus EC14. The communicator circuitry CC1 and the electronic controller circuitry EC1 are electrically mounted on the circuit board EC13. The electronic controller circuitry EC1 is coupled to the communicator circuitry CC1. The processor EC11 and the memory EC12 are electrically mounted on the circuit board EC13. The processor EC11 is coupled to the memory EC12. The memory EC12 is coupled to the processor EC11. The processor EC11 is electrically connected to the memory EC12 via the circuit board EC13 and the system bus EC14. The memory EC12 is electrically connected to the processor EC11 via the circuit board EC13 and the system bus EC14. For example, the electronic controller circuitry EC1 includes a semiconductor. The processor EC11 includes a semiconductor. The memory EC12 includes a semiconductor. However, the electronic controller circuitry EC1 can be free of a semiconductor if needed or desired. The processor EC11 can be free of a semiconductor if needed or desired. The memory EC12 can be free of a semiconductor if needed or desired.

For example, the processor EC11 includes at least one of a central processing unit (CPU), a micro processing unit (MPU), a graphics processing unit (GPU), and a memory controller. The memory EC12 is electrically connected to the processor EC11. For example, the memory EC12 includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a magnetic disc. The memory EC12 includes storage areas each having an address. The processor EC11 is configured to control the memory EC12 to store data in the storage areas of the memory EC12 and reads data from the storage areas of the memory EC12. The processor EC11 can also be referred to as a hardware processor EC11 or a processor circuit or circuitry EC11. The memory EC12 can also be referred to as a hardware memory EC12 or a memory circuit or circuitry EC12. The memory EC12 can also be referred to as a non-transitory computer-readable storage medium EC12. Namely, the electronic controller circuitry EC1 includes the non-transitory computer-readable storage medium EC12.

The electronic controller circuitry EC1 is configured to execute at least one control algorithm of the electric device ED. For example, the electronic controller circuitry EC1 is programed to execute at least one control algorithm of the electric device ED. The memory EC12 stores at least one program including at least one program instruction. The at least one program is read into the processor EC11, and thereby the at least one control algorithm of the electric device ED is executed based on the at least one program.

The structure of the electronic controller circuitry EC1 is not limited to the above structure. The structure of the electronic controller circuitry EC1 is not limited to the processor EC11 and the memory EC12. The electronic controller circuitry EC1 can be realized by hardware alone or a combination of hardware and software. In the present embodiment, the processor EC11 and the memory EC12 are integrated as a single chip such as an application specific integrated circuit (ASIC) or a field programmable gate array (FPGA). However, the processor EC11 and the memory EC12 can be separate chips if needed or desired.

The electronic controller circuitry EC1 can include at least two electronic controller circuits which are separately provided. The at least one control algorithm of the electric device ED can be executed by the at least two electronic controller circuits if needed or desired. The electronic controller circuitry EC1 can include at least two processors which are separately provided. The electronic controller circuitry EC1 can include at least two memories which are separately provided. The at least one control algorithm of the electric device ED can be executed by the at least two processors if needed or desired. The at least one control algorithm of the electric device ED can be stored in the at least two memories if needed or desired. The electronic controller circuitry EC1 can include at least two circuit boards which are separately provided if needed or desired. The electronic controller circuitry EC1 can include at least two system buses which are separately provided if needed or desired.

The communicator circuitry CC1 is electrically mounted on the circuit board EC13. The communicator circuitry CC1 is electrically connected to the processor EC11 and the memory EC12 with the circuit board EC13 and the system bus EC14.

The communicator circuitry CC1 includes wireless communicator circuitry WC1. The wireless communicator circuitry WC1 is configured to wirelessly communicate with another wireless communicator circuitry. For example, the wireless communicator circuitry WC1 includes signal transmitting circuitry WC11, signal receiving circuitry WC12, and antenna circuitry WC13. The signal transmitting circuitry WC11 is electrically connected to the antenna circuitry WC13. The signal receiving circuitry WC12 is electrically connected to the antenna circuitry WC13.

The wireless communicator circuitry WC1 is configured to transmit wireless signals via the antenna circuitry WC13. The wireless communicator circuitry WC1 is configured to superimpose digital signals on carrier wave using a predetermined wireless communication protocol to wirelessly transmit signals. In the present embodiment, the wireless communicator circuitry WC1 is configured to encrypt signals using a cryptographic key to generate encrypted wireless signals.

The wireless communicator circuitry WC1 is configured to receive wireless signals via the antenna circuitry WC13. In the present embodiment, the wireless communicator circuitry WC1 is configured to decode the wireless signals to recognize signals transmitted from other wireless communicators. The wireless communicator circuitry WC1 is configured to decrypt the wireless signals using the cryptographic key.

The wireless communicator circuitry WC1 includes a signal amplifier WC14. The signal amplifier WC14 is coupled to the signal transmitting circuitry WC11, the signal receiving circuitry WC12, and the antenna circuitry WC13. The signal amplifier WC14 is configured to selectively amplify the signals of the antenna circuitry WC13. The signal amplifier WC14 can be controlled by the electronic controller circuitry EC1. The electronic controller circuitry EC1 can be configured to control the signal amplifier WC14 such that the signal amplifier WC14 operates in a low-power or high-power consumption state.

The communicator circuitry CC1 can include wired communicator circuitry and a cable connector. The wired communicator circuitry can be electrically connected to the electronic controller circuitry EC1. The cable connector can be electrically connected to the wired communicator circuitry. The wired communicator circuitry can be configured to communicate with another wired communicator circuitry via the cable connector and an electric cable connected to the cable connector.

The wired communicator circuitry can be configured to communicate with another wired communicator circuitry using power line communication (PLC) technology. For example, the electric cable includes a ground line and a voltage line that are detachably connected to a serial bus that is formed by communication interfaces. The wired communicator circuitry can be configured to communicate with another wired communication circuitry through the voltage line using the PLC technology. Since the PLC technology has been known, it will not be described in detail here for the sake of brevity.

In the present embodiment, the electric device ED includes a user interface ED1 and a display ED2. The user interface ED1 is configured to receive a user input U1. The display ED2 is configured to display information relating to at least one of the electric device ED and the human-powered vehicle B. For example, the user input U1 can indicate at least one of a power-on, a power-off, a start of pairing, an end of pairing, and a change in settings.

In the present embodiment, the user interface ED1 includes a touch panel configured to receive the user input U1. The touch panel is provided in the display ED2. However, the touch panel can be omitted from the user interface ED1 if needed or desired. The user interface ED1 can include another type of interface such as a switch or a dial.

In the present embodiment, the electric device ED includes a power source holder ED3. The power source holder ED3 is configured to detachably and reattachably hold an electric power source ED4. The power source holder ED3 is configured to be electrically connected to the electronic controller circuitry EC1, the communicator circuitry CC1, and other electronic parts of the electric device ED. The electric power source ED4 is configured to supply electricity to the electronic controller circuitry EC1, the communicator circuitry CC1, and other electronic parts of the electric device ED via the power source holder ED3. Examples of the electric power source ED4 includes a primary battery and a secondary battery. The electric device ED can be configured to receive electricity from another electric power source other than the electric power source PS via an electric cable if needed or desired.

As seen in FIG. 4, the detection system 10 comprises a second sensor SS2. The second sensor SS2 is configured to obtain vehicle information INF2 including at least one of: motion information INF21 relating to a motion of the human-powered vehicle B; and geographical information INF22 relating to a geographical location of the human-powered vehicle B. In the present embodiment, the vehicle information INF2 includes the motion information INF21 and the geographical information INF22. The vehicle information INF2 can include only one of the motion information INF21 and the geographical information INF22 if needed or desired.

The second sensor SS2 includes a motion sensor MS. The motion sensor MS is configured to obtain the motion information INF21. The motion sensor MS can also be referred to as a sensor MS. Namely, the detection system 10 comprises the sensor MS. The sensor MS is configured to obtain the motion information INF21 relating to the motion of the human-powered vehicle B.

For example, the motion sensor MS includes an acceleration sensor MS1. The acceleration sensor MS1 is configured to obtain, as the motion information INF21, acceleration applied to the human-powered vehicle B. The acceleration applied to the human-powered vehicle B indicates the motion of the human-powered vehicle B. The motion sensor MS can include a sensor other than the acceleration sensor MS1 if needed or desired. The motion sensor MS can include a gyro sensor. The gyro sensor is configured to obtain, as the motion information INF21, an angular velocity applied to the human-power vehicle.

Figure 5:
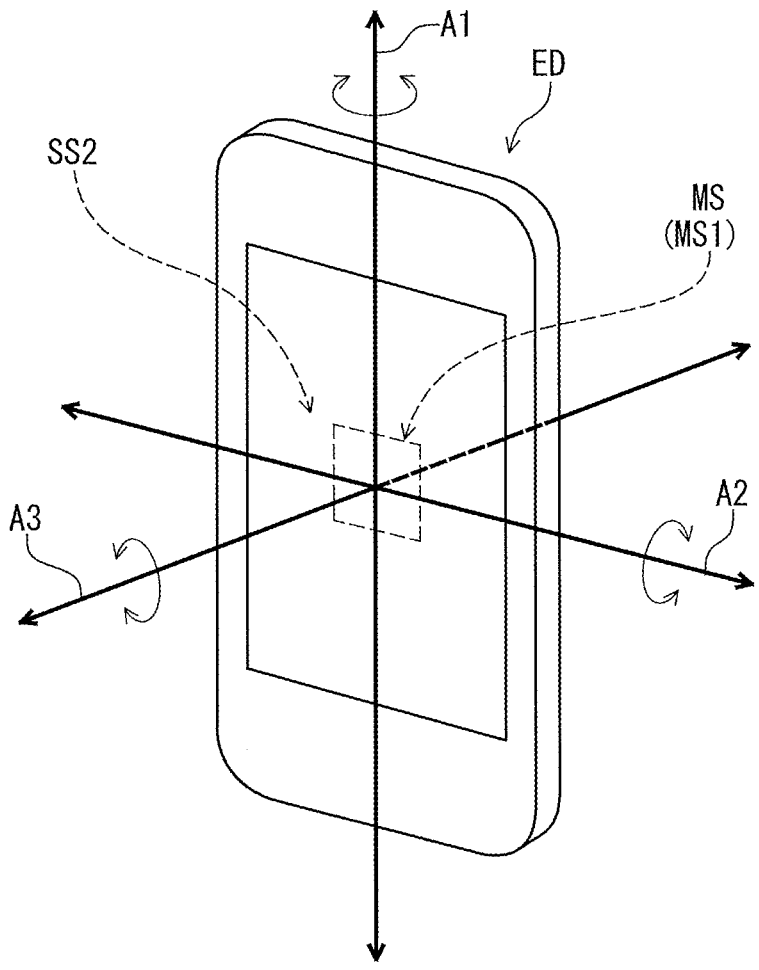
FIG. 5 is a perspective view of an electric device included in the detection system of the human-powered vehicle illustrated in FIG. 1.

As seen in FIG. 5, for example, the acceleration sensor MS1 includes a 3-axis accelerometer. The acceleration sensor MS1 is configured to obtain a first motion of the human-powered vehicle B about a first axis A1. The acceleration sensor MS1 is configured to obtain a second motion of the human-powered vehicle B about a second axis A2. The acceleration sensor MS1 is configured to obtain a third motion of the human-powered vehicle B about a third axis A3.

As seen in FIG. 1, the second axis A2 is defined parallel to a second horizontal direction D2 in a state where the electric device ED is mounted to the vehicle body VB and where the human-powered vehicle B is in the upright riding position. The third axis A3 is defined parallel to a vertical direction D3 in the state where the electric device ED is mounted to the vehicle body VB and where the human-powered vehicle B is in the upright riding position. The vertical direction D3 is defined perpendicularly to the second horizontal direction D2. The first axis A1 is defined parallel to a first horizontal direction D1 in the state where the electric device ED is mounted to the vehicle body VB and where the human-powered vehicle B is in the upright riding position. The first horizontal direction D1 is defined perpendicularly to each of the second horizontal direction D2 and the vertical direction D3.

As seen in FIG. 4, the electronic controller circuitry EC1 is configured to receive, from the acceleration sensor MS1 of the motion sensor MS, the motion information INF21 indicating the first motion of at least one of the electric device ED and the human-powered vehicle B occurring about the first axis A1. The electronic controller circuitry EC1 is configured to receive, from the acceleration sensor MS1 of the motion sensor MS, the motion information INF21 indicating the second motion of at least one of the electric device ED and the human-powered vehicle B occurring about the second axis A2. The electronic controller circuitry EC1 is configured to receive, from the acceleration sensor MS1 of the motion sensor MS, the motion information INF21 indicating the third motion of at least one of the electric device ED and the human-powered vehicle B occurring about the third axis A3. The first axis A1 can also be referred to as a roll axis A1. The second axis A2 can also be referred to as a pitch axis A2. The third axis A3 can also be referred to as a yaw axis A3.

Figure 6:
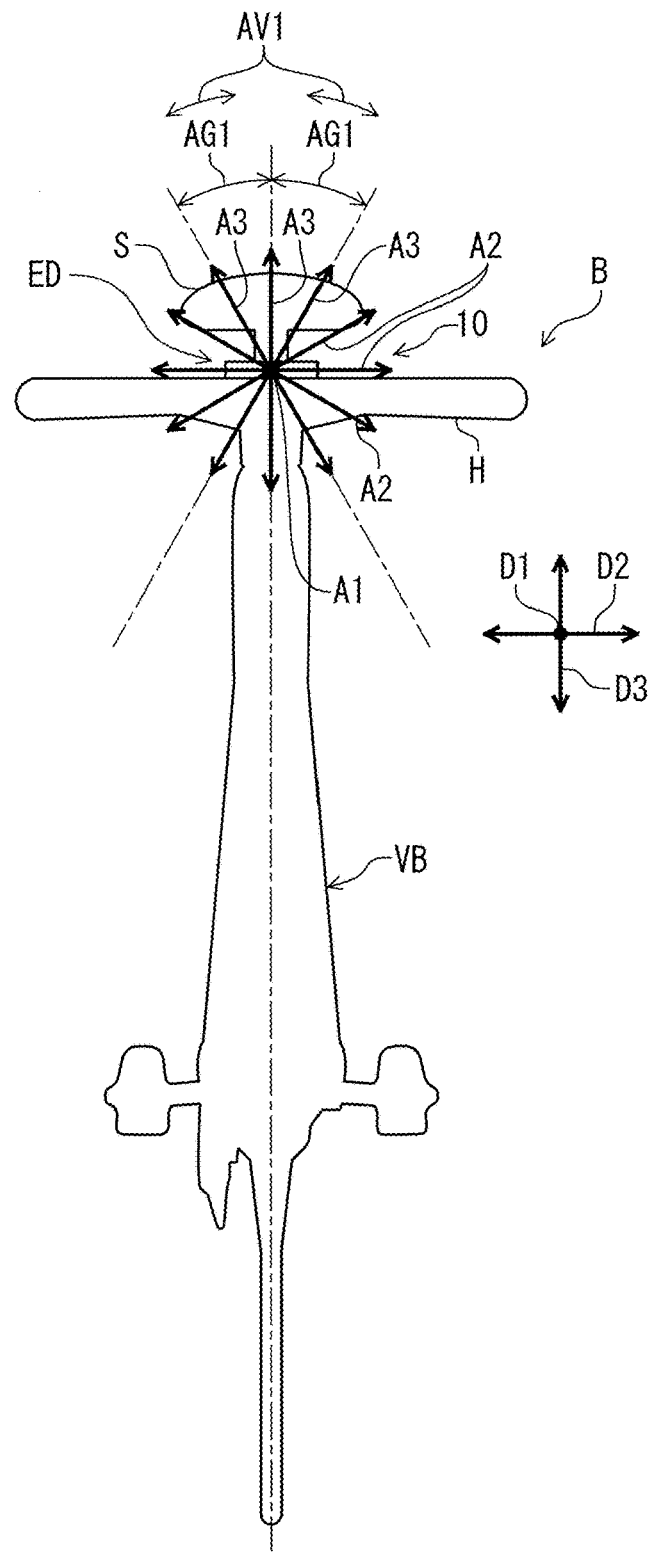
FIG. 6 is a schematic front view of the human-powered vehicle illustrated in FIG. 1.

As seen in FIG. 6, the motion information INF21 includes a first rotation angle AG1 of the electric device ED or the human-powered vehicle B. The first rotation angle AG1 is defined about the first axis A1. The first rotation angle AG1 is defined between the third axis A3 and the vertical direction D3. A first angular velocity AV1 is defined about the first axis A1. The first angular velocity AV1 is defined as an angular velocity of the third axis A3 about the first axis A1.

Figure 7:
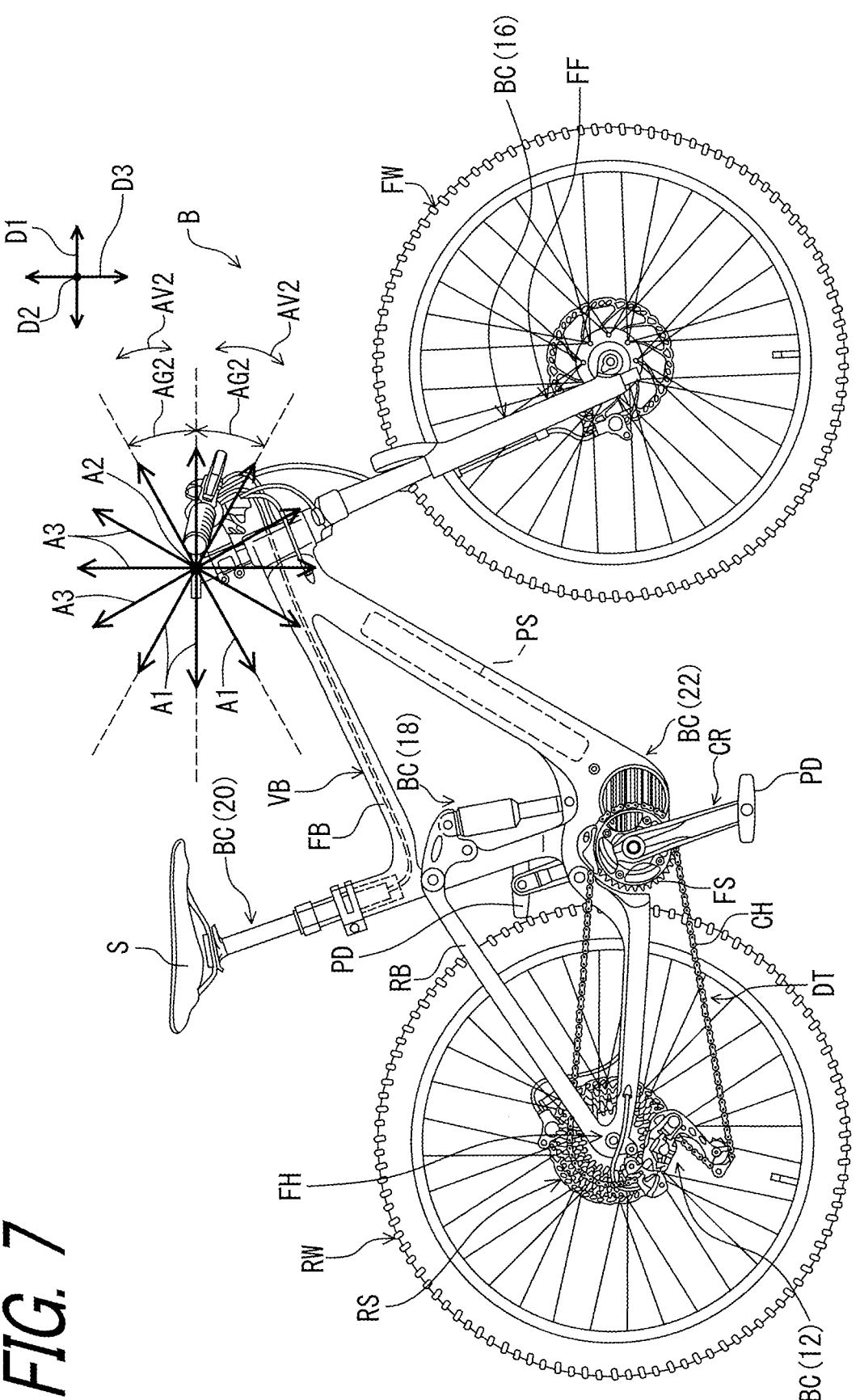
FIG. 7 is a side elevational view of the human-powered vehicle illustrated in FIG. 1.

As seen in FIG. 7, the motion information INF21 includes a second rotation angle AG2 of the electric device ED or the human-powered vehicle B. The second rotation angle AG2 is defined about the second axis A2. The second rotation angle AG2 is defined between the first axis A1 and the first horizontal direction D1. A second angular velocity AV2 is defined about the second axis A2. The second angular velocity AV2 is defined as an angular velocity of the first axis A1 about the second axis A2.

Figure 8:
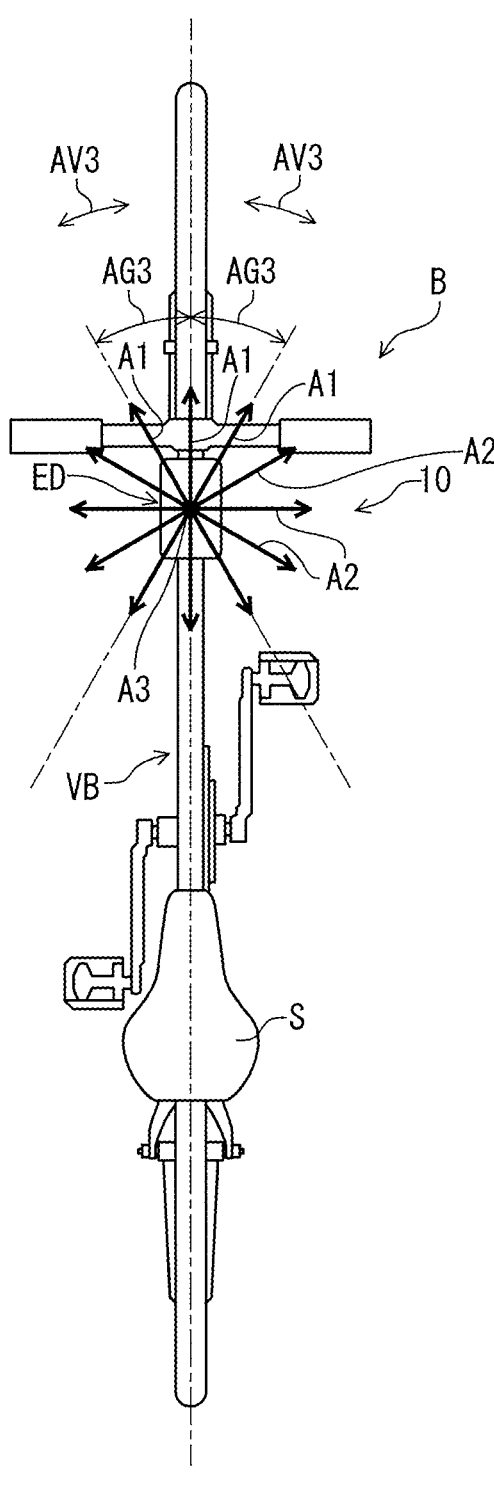
FIG. 8 is a plan view of the human-powered vehicle illustrated in FIG. 1.

As seen in FIG. 8, the motion information INF21 includes a third rotation angle AG3 of the electric device ED or the human-powered vehicle B. The third rotation angle AG3 is defined about the third axis A3. The third rotation angle AG3 is defined between the first axis A1 and the first horizontal direction D1. A third angular velocity AV3 is defined about the third axis A3. The third angular velocity AV3 is defined as an angular velocity of the first axis A1 about the third axis A3.

As seen in FIG. 6, the electronic controller circuitry EC1 is configured to recognize or calculate the first rotation angle AG1 of the human-powered vehicle B about the first axis A1 based on the motion information INF21 obtained by the motion sensor MS. The electronic controller circuitry EC1 is configured to recognize or calculate the second rotation angle AG2 of the human-powered vehicle B about the second axis A2 based on the motion information INF21 obtained by the motion sensor MS. The electronic controller circuitry EC1 is configured to recognize or calculate the third rotation angle AG3 of the human-powered vehicle B about the third axis A3 based on the motion information INF21 obtained by the motion sensor MS.

The electronic controller circuitry EC1 is configured to calculate the first angular velocity AV1 of the human-powered vehicle B about the first axis A1 based on the motion information INF21 obtained by the motion sensor MS. The electronic controller circuitry EC1 is configured to calculate the second angular velocity AV2 of the human-powered vehicle B about the second axis A2 based on the motion information INF21 obtained by the motion sensor MS. The electronic controller circuitry EC1 is configured to calculate the third angular velocity AV3 of the human-powered vehicle B about the third axis A3 based on the motion information INF21 obtained by the motion sensor MS.

As seen in FIG. 4, the second sensor SS2 includes a location sensor LS. The location sensor LS is configured to obtain the geographical information INF22. The location sensor LS is provided separately from the motion sensor MS. The location sensor LS includes a GPS sensor LS1. The GPS sensor LS1 is configured to periodically obtain the geographical information INF22. The geographical information INF22 includes a current location of the human-powered vehicle B. For example, the current location can be indicated with a coordinate including a longitude and a latitude. The location sensor LS can include a sensor other than the GPS sensor LS1 if needed or desired.

The electronic controller circuitry EC1 is configured to periodically receive the geographical information INF22 from the location sensor LS. The electronic controller circuitry EC1 is configured to store reference geographical information in the memory EC12. The reference geographical information includes at least one reference region. The at least one reference region is defined with a longitude and a latitude. The electronic controller circuitry EC1 is configured to determine whether the human-powered vehicle B is in the at least one reference region based on the geographical information INF22 received from the location sensor LS.

As seen in FIG. 1, the second sensor SS2 is configured to be provided to the vehicle body VB of the human-powered vehicle B. For example, the second sensor SS2 is configured to be mounted to the stem ST of the vehicle body VB. The motion sensor MS is configured to be provided to the vehicle body VB of the human-powered vehicle B. The acceleration sensor MS1 is configured to be provided to the vehicle body VB of the human-powered vehicle B. The location sensor LS is configured to be provided to the vehicle body VB. The GPS sensor LS1 is configured to be provided to the vehicle body VB. The position of the second sensor SS2 is not limited to the positions depicted in FIG. 1. The positions of the second sensor SS2, the motion sensor MS, the acceleration sensor MS1, the location sensor LS, and the GPS sensor LS1 are not limited to the positions depicted in FIG. 1. At least one of the motion sensor MS, the acceleration sensor MS1, the location sensor LS, and the GPS sensor LS1 can be provided to positions other than the positions depicted in FIG. 1 if needed or desired.

As seen in FIG. 4, for example, the electric device ED includes the second sensor SS2. The electric device ED includes the motion sensor MS and the location sensor LS. The electric device ED includes the acceleration sensor MS1 and the GPS sensor LS1. However, the second sensor SS2 can be provided to a device other than the electric device ED if needed or desired. Alternatively, the motion sensor MS can be provided to a device other than the electric device ED if needed or desired. The acceleration sensor MS1 can be provided to a device other than the electric device ED if needed or desired. The location sensor LS can be provided to a device other than the electric device ED if needed or desired. The GPS sensor LS1 can be provided to a device other than the electric device ED if needed or desired.

As seen in FIG. 4, the electronic controller circuitry EC1 is configured to receive the vehicle information INF2 from the second sensor SS2. The electronic controller circuitry EC1 is configured to receive the motion information INF21 from the motion sensor MS of the second sensor SS2. The electronic controller circuitry EC1 is configured to receive the geographical information INF22 from the location sensor LS of the second sensor SS2.

The detection system 10 comprises first electronic controller circuitry EC2. The detection system 10 comprises first communicator circuitry CC2. For example, the first electronic controller circuitry EC2 and the first communicator circuitry CC2 are provided to the brake device 24. However, the first electronic controller circuitry EC2 and the first communicator circuitry CC2 can be provided to a portion other than brake device 24 if needed or desired.

The first electronic controller circuitry EC2 is electrically connected to the first communicator circuitry CC2. The first communicator circuitry CC2 is configured to wirelessly communicate with another communication device such as the wireless communicator circuitry WC1. The first electronic controller circuitry EC2 is electrically connected to the first communicator circuitry CC2 to control the first communicator circuitry CC2.

The first electronic controller circuitry EC2 includes a first processor EC21 and a first memory EC22. The brake device 24 includes a first circuit board EC23 and a first system bus EC24. The first communicator circuitry CC2 and the first electronic controller circuitry EC2 are electrically mounted on the first circuit board EC23. The first electronic controller circuitry EC2 is coupled to the first communicator circuitry CC2. The first processor EC21 and the first memory EC22 are electrically mounted on the first circuit board EC23. The first processor EC21 is coupled to the first memory EC22. The first memory EC22 is coupled to the first processor EC21. The first processor EC21 is electrically connected to the first memory EC22 via the first circuit board EC23 and the first system bus EC24. The first memory EC22 is electrically connected to the first processor EC21 via the first circuit board EC23 and the first system bus EC24. For example, the first electronic controller circuitry EC2 includes a semiconductor. The first processor EC21 includes a semiconductor. The first memory EC22 includes a semiconductor. However, the first electronic controller circuitry EC2 can be free of a semiconductor if needed or desired. The first processor EC21 can be free of a semiconductor if needed or desired. The first memory EC22 can be free of a semiconductor if needed or desired.

For example, the first processor EC21 includes at least one of a central processing unit (CPU), a micro processing unit (MPU), a graphics processing unit (GPU), and a memory controller. The first memory EC22 is electrically connected to the first processor EC21. For example, the first memory EC22 includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a magnetic disc. The first memory EC22 includes storage areas each having an address. The first processor EC21 is configured to control the first memory EC22 to store data in the storage areas of the first memory EC22 and reads data from the storage areas of the first memory EC22. The first processor EC21 can also be referred to as a first hardware processor EC21 or a first processor circuit or circuitry EC21. The first memory EC22 can also be referred to as a first hardware memory EC22 or a first memory circuit or circuitry EC22. The first memory EC22 can also be referred to as a non-transitory computer-readable storage medium EC22. Namely, the first electronic controller circuitry EC2 includes the non-transitory computer-readable storage medium EC22.

The first electronic controller circuitry EC2 is configured to execute at least one control algorithm of the brake device 24. For example, the first electronic controller circuitry EC2 is programed to execute at least one control algorithm of the brake device 24. The first memory EC22 stores at least one program including at least one program instruction. The at least one program is read into the first processor EC21, and thereby the at least one control algorithm of the brake device 24 is executed based on the at least one program.

The structure of the first electronic controller circuitry EC2 is not limited to the above structure. The structure of the first electronic controller circuitry EC2 is not limited to the first processor EC21 and the first memory EC22. The first electronic controller circuitry EC2 can be realized by hardware alone or a combination of hardware and software. In the present embodiment, the first processor EC21 and the first memory EC22 are integrated as a single chip such as an application specific integrated circuit (ASIC) or a field programmable gate array (FPGA). However, the first processor EC21 and the first memory EC22 can be separate chips if needed or desired. The first electronic controller circuitry EC2 can include the first processor EC21, the first memory EC22, the first circuit board EC23, and the first system bus EC24 if needed or desired.

The first electronic controller circuitry EC2 can include at least two electronic controller circuits which are separately provided. The at least one control algorithm of the brake device 24 can be executed by the at least two electronic controller circuits if needed or desired. The first electronic controller circuitry EC2 can include at least two processors which are separately provided. The first electronic controller circuitry EC2 can include at least two memories which are separately provided. The at least one control algorithm of the brake device 24 can be executed by the at least two processors if needed or desired. The at least one control algorithm of the brake device 24 can be stored in the at least two memories if needed or desired. The first electronic controller circuitry EC2 can include at least two circuit boards which are separately provided if needed or desired. The first electronic controller circuitry EC2 can include at least two system buses which are separately provided if needed or desired.

The first communicator circuitry CC2 is electrically mounted on the first circuit board EC23. The first communicator circuitry CC2 is electrically connected to the first processor EC21 and the first memory EC22 with the first circuit board EC23 and the first system bus EC24.

The first communicator circuitry CC2 includes first wireless communicator circuitry WC2. The first wireless communicator circuitry WC2 is configured to wirelessly communicate with another wireless communicator circuitry. For example, the first wireless communicator circuitry WC2 includes first signal transmitting circuitry WC21, first signal receiving circuitry WC22, and first antenna circuitry WC23. The first signal transmitting circuitry WC21 is electrically connected to the first antenna circuitry WC23. The first signal receiving circuitry WC22 is electrically connected to the first antenna circuitry WC23.

The first wireless communicator circuitry WC2 is configured to transmit wireless signals via the first antenna circuitry WC23. The first wireless communicator circuitry WC2 is configured to superimpose digital signals on carrier wave using a predetermined wireless communication protocol to wirelessly transmit signals. In the present embodiment, the first wireless communicator circuitry WC2 is configured to encrypt signals using a cryptographic key to generate encrypted wireless signals.

The first wireless communicator circuitry WC2 is configured to receive wireless signals via the first antenna circuitry WC23. In the present embodiment, the first wireless communicator circuitry WC2 is configured to decode the wireless signals to recognize signals transmitted from other wireless communicators. The first wireless communicator circuitry WC2 is configured to decrypt the wireless signals using the cryptographic key.

The first wireless communicator circuitry WC2 includes a first signal amplifier WC24. The first signal amplifier WC24 is coupled to the first signal transmitting circuitry WC21, the first signal receiving circuitry WC22, and the first antenna circuitry WC23. The first signal amplifier WC24 is configured to selectively amplify the signals of the first antenna circuitry WC23. The first signal amplifier WC24 can be controlled by the first electronic controller circuitry EC2. The first electronic controller circuitry EC2 can be configured to control the first signal amplifier WC24 such that the first signal amplifier WC24 operates in a low-power or high-power consumption state.

Instead of or in addition to the first wireless communicator circuitry WC2, the first communicator circuitry CC2 can include first wired communicator circuitry and a first cable connector. The first wired communicator circuitry can be electrically connected to the first electronic controller circuitry EC2. The first cable connector can be electrically connected to the first wired communicator circuitry. The first wired communicator circuitry can be configured to communicate with another first wired communicator circuitry via the first cable connector and an electric cable connected to the first cable connector.

The first wired communicator circuitry can be configured to communicate with another first wired communicator circuitry using power line communication (PLC) technology. For example, the electric cable includes a ground line and a voltage line that are detachably connected to a serial bus that is formed by communication interfaces. The first wired communicator circuitry can be configured to communicate with another wired communication circuitry through the voltage line using the PLC technology. Since the PLC technology has been known, it will not be described in detail here for the sake of brevity.

The detection system 10 includes a user interface FS15. The user interface FS15 is provided to the brake device 24. The user interface FS15 is configured to receive a user input U2. For example, the user input U2 can indicate at least one of a power-on, a power-off, a start of pairing, an end of pairing, and a change in settings. In the present embodiment, the user interface FS15 includes a switch configured to receive the user input U2. The user interface FS15 can be omitted from the brake device 24 if needed or desired. The user interface FS15 can include another type of interface such as a dial or a touch panel.

The detection system 10 includes a first power source holder FS13 and a first electric power source FS14. The first power source holder FS13 and the first electric power source FS14 are provided to the brake device 24. The first power source holder FS13 is configured to detachably and reattachably hold the first electric power source FS14. The first power source holder FS13 is configured to be electrically connected to the first electronic controller circuitry EC2, the first communicator circuitry CC2, and other electronic parts of the brake device 24. The first electric power source FS14 is configured to supply electricity to the first electronic controller circuitry EC2, the first communicator circuitry CC2, and other electronic parts of the brake device 24 via the first power source holder FS13. Examples of the first electric power source FS14 includes a primary battery and a secondary battery. The brake device 24 can be configured to receive electricity from another electric power source other than the first electric power source FS14 via an electric cable if needed or desired.

As seen in FIG. 4, the detection system 10 comprises second electronic controller circuitry EC3. The detection system 10 comprises second communicator circuitry CC3. For example, the second electronic controller circuitry EC3 and the second communicator circuitry CC3 are provided to the brake device 26. However, the second electronic controller circuitry EC3 and the second communicator circuitry CC3 can be provided to a portion other than brake device 26 if needed or desired.

The second electronic controller circuitry EC3 is electrically connected to the second communicator circuitry CC3. The second communicator circuitry CC3 is configured to wirelessly communicate with another communication device such as the wireless communicator circuitry WC1 or the first wireless communicator circuitry WC2. The second electronic controller circuitry EC3 is electrically connected to the second communicator circuitry CC3 to control the second communicator circuitry CC3.

The second electronic controller circuitry EC3 includes a second processor EC31 and a second memory EC32. The brake device 26 includes a second circuit board EC33 and a second system bus EC34. The second communicator circuitry CC3 and the second electronic controller circuitry EC3 are electrically mounted on the second circuit board EC33. The second electronic controller circuitry EC3 is coupled to the second communicator circuitry CC3. The second processor EC31 and the second memory EC32 are electrically mounted on the second circuit board EC33. The second processor EC31 is coupled to the second memory EC32. The second memory EC32 is coupled to the second processor EC31. The second processor EC31 is electrically connected to the second memory EC32 via the second circuit board EC33 and the second system bus EC34. The second memory EC32 is electrically connected to the second processor EC31 via the second circuit board EC33 and the second system bus EC34. For example, the second electronic controller circuitry EC3 includes a semiconductor. The second processor EC31 includes a semiconductor. The second memory EC32 includes a semiconductor. However, the second electronic controller circuitry EC3 can be free of a semiconductor if needed or desired. The second processor EC31 can be free of a semiconductor if needed or desired. The second memory EC32 can be free of a semiconductor if needed or desired.

For example, the second processor EC31 includes at least one of a central processing unit (CPU), a micro processing unit (MPU), a graphics processing unit (GPU), and a memory controller. The second memory EC32 is electrically connected to the second processor EC31. For example, the second memory EC32 includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a magnetic disc. The second memory EC32 includes storage areas each having an address. The second processor EC31 is configured to control the second memory EC32 to store data in the storage areas of the second memory EC32 and reads data from the storage areas of the second memory EC32. The second processor EC31 can also be referred to as a second hardware processor EC31 or a second processor circuit or circuitry EC31. The second memory EC32 can also be referred to as a second hardware memory EC32 or a second memory circuit or circuitry EC32. The second memory EC32 can also be referred to as a non-transitory computer-readable storage medium EC32. Namely, the second electronic controller circuitry EC3 includes the non-transitory computer-readable storage medium EC32.

The second electronic controller circuitry EC3 is configured to execute at least one control algorithm of the brake device 26. For example, the second electronic controller circuitry EC3 is programed to execute at least one control algorithm of the brake device 26. The second memory EC32 stores at least one program including at least one program instruction. The at least one program is read into the second processor EC31, and thereby the at least one control algorithm of the brake device 26 is executed based on the at least one program.

The structure of the second electronic controller circuitry EC3 is not limited to the above structure. The structure of the second electronic controller circuitry EC3 is not limited to the second processor EC31 and the second memory EC32. The second electronic controller circuitry EC3 can be realized by hardware alone or a combination of hardware and software. In the present embodiment, the second processor EC31 and the second memory EC32 are integrated as a single chip such as an application specific integrated circuit (ASIC) or a field programmable gate array (FPGA). However, the second processor EC31 and the second memory EC32 can be separate chips if needed or desired. The second electronic controller circuitry EC3 can include the second processor EC31, the second memory EC32, the second circuit board EC33, and the second system bus EC34 if needed or desired.

The second electronic controller circuitry EC3 can include at least two electronic controller circuits which are separately provided. The at least one control algorithm of the brake device 26 can be executed by the at least two electronic controller circuits if needed or desired. The second electronic controller circuitry EC3 can include at least two processors which are separately provided. The second electronic controller circuitry EC3 can include at least two memories which are separately provided. The at least one control algorithm of the brake device 26 can be executed by the at least two processors if needed or desired. The at least one control algorithm of the brake device 26 can be stored in the at least two memories if needed or desired. The second electronic controller circuitry EC3 can include at least two circuit boards which are separately provided if needed or desired. The second electronic controller circuitry EC3 can include at least two system buses which are separately provided if needed or desired.

The second communicator circuitry CC3 is electrically mounted on the second circuit board EC33. The second communicator circuitry CC3 is electrically connected to the second processor EC31 and the second memory EC32 with the second circuit board EC33 and the second system bus EC34.

The second communicator circuitry CC3 includes second wireless communicator circuitry WC3. The second wireless communicator circuitry WC3 is configured to wirelessly communicate with another wireless communicator circuitry. For example, the second wireless communicator circuitry WC3 includes second signal transmitting circuitry WC31, second signal receiving circuitry WC32, and second antenna circuitry WC33. The second signal transmitting circuitry WC31 is electrically connected to the second antenna circuitry WC33. The second signal receiving circuitry WC32 is electrically connected to the second antenna circuitry WC33.

The second wireless communicator circuitry WC3 is configured to transmit wireless signals via the second antenna circuitry WC33. The second wireless communicator circuitry WC3 is configured to superimpose digital signals on carrier wave using a predetermined wireless communication protocol to wirelessly transmit signals. In the present embodiment, the second wireless communicator circuitry WC3 is configured to encrypt signals using a cryptographic key to generate encrypted wireless signals.

The second wireless communicator circuitry WC3 is configured to receive wireless signals via the second antenna circuitry WC33. In the present embodiment, the second wireless communicator circuitry WC3 is configured to decode the wireless signals to recognize signals transmitted from other wireless communicators. The second wireless communicator circuitry WC3 is configured to decrypt the wireless signals using the cryptographic key.

The second wireless communicator circuitry WC3 includes a second signal amplifier WC34. The second signal amplifier WC34 is coupled to the second signal transmitting circuitry WC31, the second signal receiving circuitry WC32, and the second antenna circuitry WC33. The second signal amplifier WC34 is configured to selectively amplify the signals of the second antenna circuitry WC33. The second signal amplifier WC34 can be controlled by the second electronic controller circuitry EC3. The second electronic controller circuitry EC3 can be configured to control the second signal amplifier WC34 such that the second signal amplifier WC34 operates in a low-power or high-power consumption state.

Instead of or in addition to the second wireless communicator circuitry WC3, the second communicator circuitry CC3 can include second wired communicator circuitry and a second cable connector. The second wired communicator circuitry can be electrically connected to the second electronic controller circuitry EC3. The second cable connector can be electrically connected to the second wired communicator circuitry. The second wired communicator circuitry can be configured to communicate with another second wired communicator circuitry via the second cable connector and an electric cable connected to the second cable connector.

The second wired communicator circuitry can be configured to communicate with another second wired communicator circuitry using power line communication (PLC) technology. For example, the electric cable includes a ground line and a voltage line that are detachably connected to a serial bus that is formed by communication interfaces. The second wired communicator circuitry can be configured to communicate with another wired communication circuitry through the voltage line using the PLC technology. Since the PLC technology has been known, it will not be described in detail here for the sake of brevity.

The detection system 10 includes a user interface FS25. The user interface FS25 is provided to the brake device 26. The user interface FS25 is configured to receive a user input U3. For example, the user input U3 can indicate at least one of a power-on, a power-off, a start of pairing, an end of pairing, and a change in settings. In the present embodiment, the user interface FS25 includes a switch configured to receive the user input U3. The user interface FS25 can be omitted from the brake device 26 if needed or desired. The user interface FS25 can include another type of interface such as a dial or a touch panel.

The detection system 10 includes a second power source holder FS23 and a second electric power source FS24. The second power source holder FS23 and the second electric power source FS24 are provided to the brake device 26. The second power source holder FS23 is configured to detachably and reattachably hold the second electric power source FS24. The second power source holder FS23 is configured to be electrically connected to the second electronic controller circuitry EC3, the second communicator circuitry CC3, and other electronic parts of the brake device 26. The second electric power source FS24 is configured to supply electricity to the second electronic controller circuitry EC3, the second communicator circuitry CC3, and other electronic parts of the brake device 26 via the second power source holder FS23. Examples of the second electric power source FS24 includes a primary battery and a secondary battery. The brake device 26 can be configured to receive electricity from another electric power source other than the second electric power source FS24 via an electric cable if needed or desired.

As seen in FIG. 4, the front force sensor FS1 of the first sensor SS1 is electrically connected to the first electronic controller circuitry EC2. The first electronic controller circuitry EC2 is configured to receive the front brake information INF11 obtained by the front force sensor FS1. The first electronic controller circuitry EC2 is configured to control the first wireless communicator circuitry WC2 to wirelessly transmit the front brake information INF11 to another wireless communicator circuitry such as the wireless communicator circuitry WC1. The electronic controller circuitry EC1 is configured to receive the front brake information INF11 via the wireless communicator circuitry WC1.

The rear force sensor FS2 of the first sensor SS1 is electrically connected to the first electronic controller circuitry EC2. The first electronic controller circuitry EC2 is configured to receive the rear brake information INF12 obtained by the rear force sensor FS2. The first electronic controller circuitry EC2 is configured to control the first wireless communicator circuitry WC2 to wirelessly transmit the rear brake information INF12 to another wireless communicator circuitry such as the wireless communicator circuitry WC1. The electronic controller circuitry EC1 is configured to receive the rear brake information INF12 via the wireless communicator circuitry WC1.

As seen in FIG. 4, the second sensor SS2 is electrically connected to the electronic controller circuitry EC1. The electronic controller circuitry EC1 is configured to receive the vehicle information INF2 from the second sensor SS2.

The motion sensor MS is electrically connected to the electronic controller circuitry EC1. The electronic controller circuitry EC1 is configured to receive the motion information INF21 from the motion sensor MS. The acceleration sensor MS1 is electrically connected to the electronic controller circuitry EC1. The electronic controller circuitry EC1 is configured to receive the motion information INF21 from the acceleration sensor MS1. For example, the electronic controller circuitry EC1 is configured to receive the first rotation angle AG1, the second rotation angle AG2, and the third rotation angle AG3 from the acceleration sensor MS1.

The location sensor LS is electrically connected to the electronic controller circuitry EC1. The electronic controller circuitry EC1 is configured to receive the geographical information INF22 from the location sensor LS.

The GPS sensor LS1 is electrically connected to the electronic controller circuitry EC1. The electronic controller circuitry EC1 is configured to receive the geographical information INF22 from the GPS sensor LS1. For example, the electronic controller circuitry EC1 is configured to receive the current coordinate of the electric device ED or the human-powered vehicle B from the GPS sensor LS1.

Figure 9:
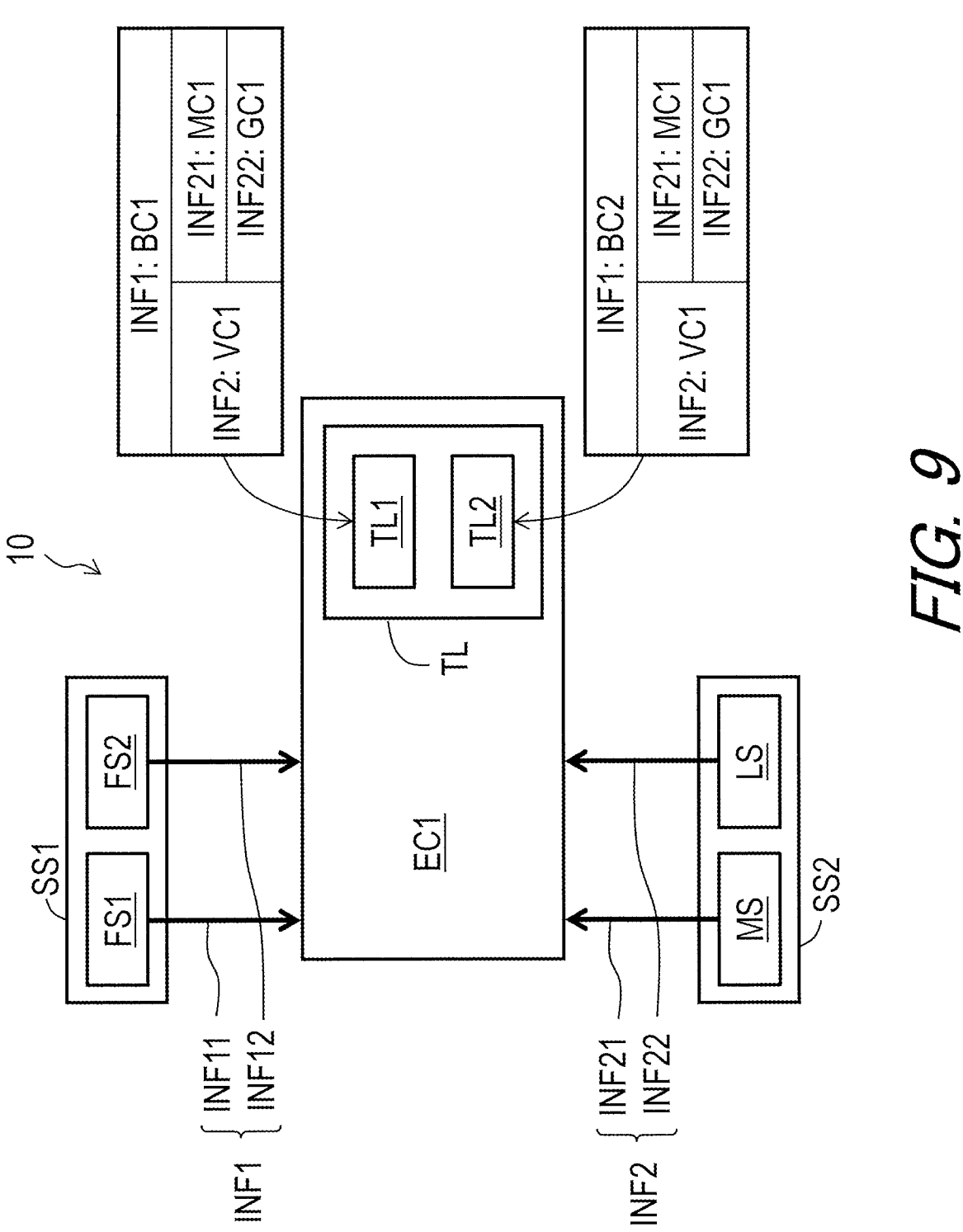
FIG. 9 is a schematic block diagram of the detection system of the human-powered vehicle illustrated in FIG. 1.

As seen in FIG. 9, the electronic controller circuitry EC1 is configured to determine the technical level TL of the rider of the human-powered vehicle B based on the brake information INF1 and the vehicle information INF2. The electronic controller circuitry EC1 is configured to determine the technical level TL based on the brake information INF1 and the motion information INF21. The electronic controller circuitry EC1 is configured to determine the technical level TL based on the brake information INF1 and the geographical information INF22.

The technical level TL includes a first technical level TL1 and a second technical level TL2. The first technical level TL1 is different from the second technical level TL2. The first technical level TL1 is higher than the second technical level TL2. The electronic controller circuitry EC1 is configured to store the first technical level TL1 and the second technical level TL2 in the memory EC12. The technical level TL can include at least one additional technical level which is different from the first technical level TL1 and the second technical level TL2 in addition to the first technical level TL1 and the second technical level TL2 if needed or desired.

As seen in FIG. 9, the electronic controller circuitry EC1 is configured to determine the technical level TL of the rider of the human-powered vehicle B in a case where the vehicle information INF2 meets a first vehicle condition VC1. The electronic controller circuitry EC1 is configured not to determine the technical level TL of the rider of the human-powered vehicle B in a case where the vehicle information INF2 meets a second vehicle condition VC2. The second vehicle condition VC2 is different from the first vehicle condition VC1.

The electronic controller circuitry EC1 is configured to determine the technical level TL in a case where the motion information INF21 meets a first motion condition MC1. The electronic controller circuitry EC1 is configured not to determine the technical level TL in a case where the motion information INF21 meets a second motion condition MC2. The second motion condition MC2 is different from the first motion condition MC1.

For example, the first vehicle condition VC1 includes that the human-powered vehicle B is cornering. The second vehicle condition VC2 includes that the human-powered vehicle B is not cornering in a case where the first vehicle condition VC1 includes that the human-powered vehicle B is cornering. The first vehicle condition VC1 can include that the human-powered vehicle B is going straight. The second motion condition MC2 includes that the human-powered vehicle B is cornering and/or not going straight in a case where the first vehicle condition VC1 includes that the human-powered vehicle B is going straight.

The electronic controller circuitry EC1 is configured to determine the technical level TL in a case where the geographical information INF22 meets a first geographical condition GC1. The electronic controller circuitry EC1 is configured not to determine the technical level TL in a case where the geographical information INF22 meets a second geographical condition GC2. The second geographical condition GC2 is different from the first geographical condition GC1.

For example, the first vehicle condition VC1 includes that the human-powered vehicle B is in a predetermined area. The second vehicle condition VC2 includes that the human-powered vehicle B is not in the predetermined area. The first geographical condition GC1 includes that the human-powered vehicle B is in the predetermined area. The second geographical condition GC2 includes that the human-powered vehicle B is not in the predetermined area.

As seen in FIG. 9, the electronic controller circuitry EC1 is configured to select the first technical level TL1 in a case where the brake information INF1 meets a first brake condition BC1 and where the vehicle information INF2 meets the first vehicle condition VC1. The electronic controller circuitry EC1 is configured to select the second technical level TL2 in a case where the brake information INF1 meets a second brake condition BC2 and where the vehicle information INF2 meets the first vehicle condition VC1. The second brake condition BC2 is different from the first brake condition BC1.

For example, the first brake condition BC1 includes that a braking time for which braking of the brake device 24 and/or 26 is executed meets a braking-time condition. The second brake condition BC2 includes that the braking time for which braking of the brake device 24 and/or 26 is executed does not meet the braking-time condition.

The electronic controller circuitry EC1 is configured to select the first technical level TL1 in a case where the brake information INF1 meets the first brake condition BC1 and where the motion information INF21 meets the first motion condition MC1. The electronic controller circuitry EC1 is configured to select the second technical level TL2 in a case where the brake information INF1 meets the second brake condition BC2 and where the motion information INF21 meets the first motion condition MC1.

Figure 10:
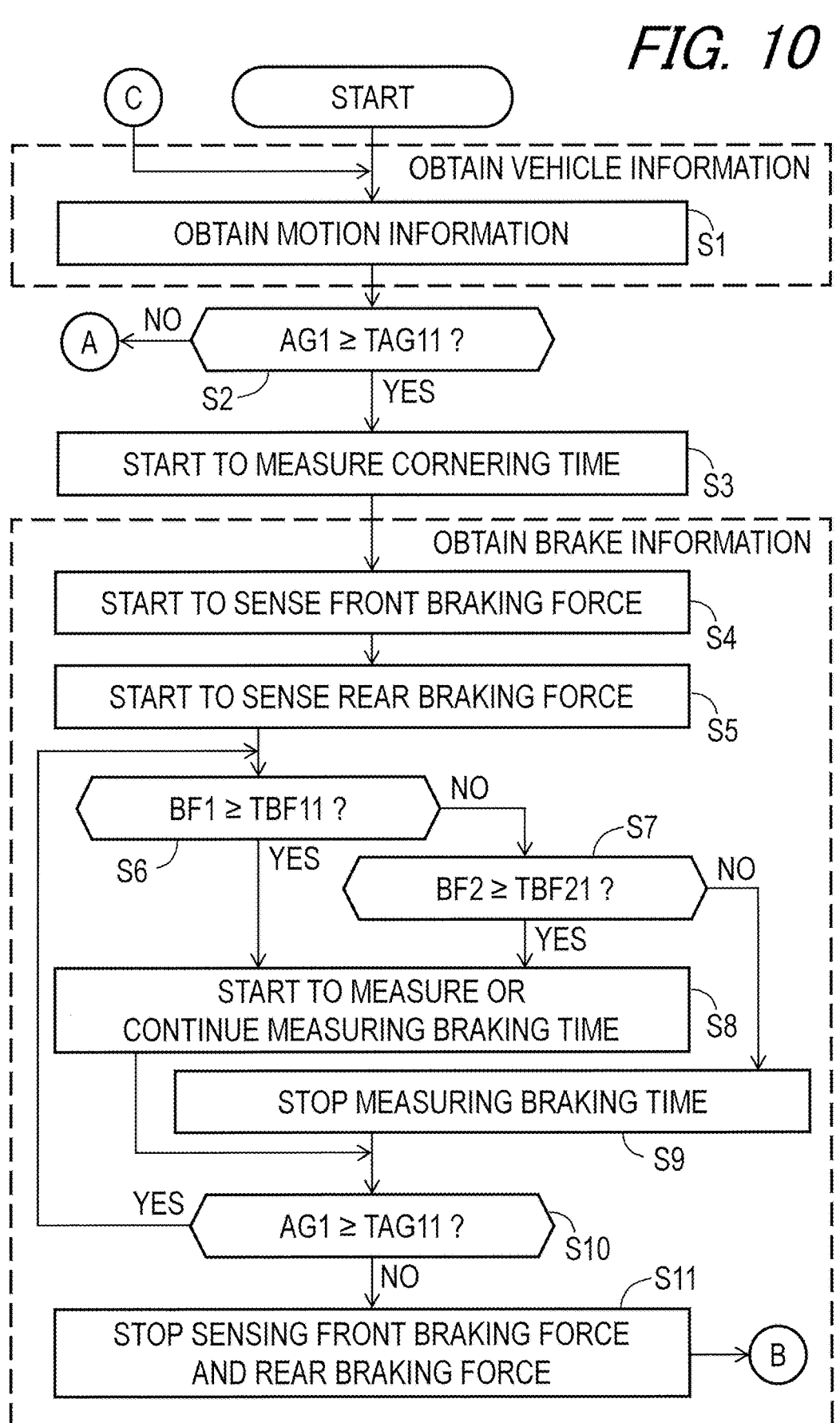
FIGS. 10 to 13 show a flowchart of the detection system of the human-powered vehicle illustrated in FIG. 1.
Figure 11:
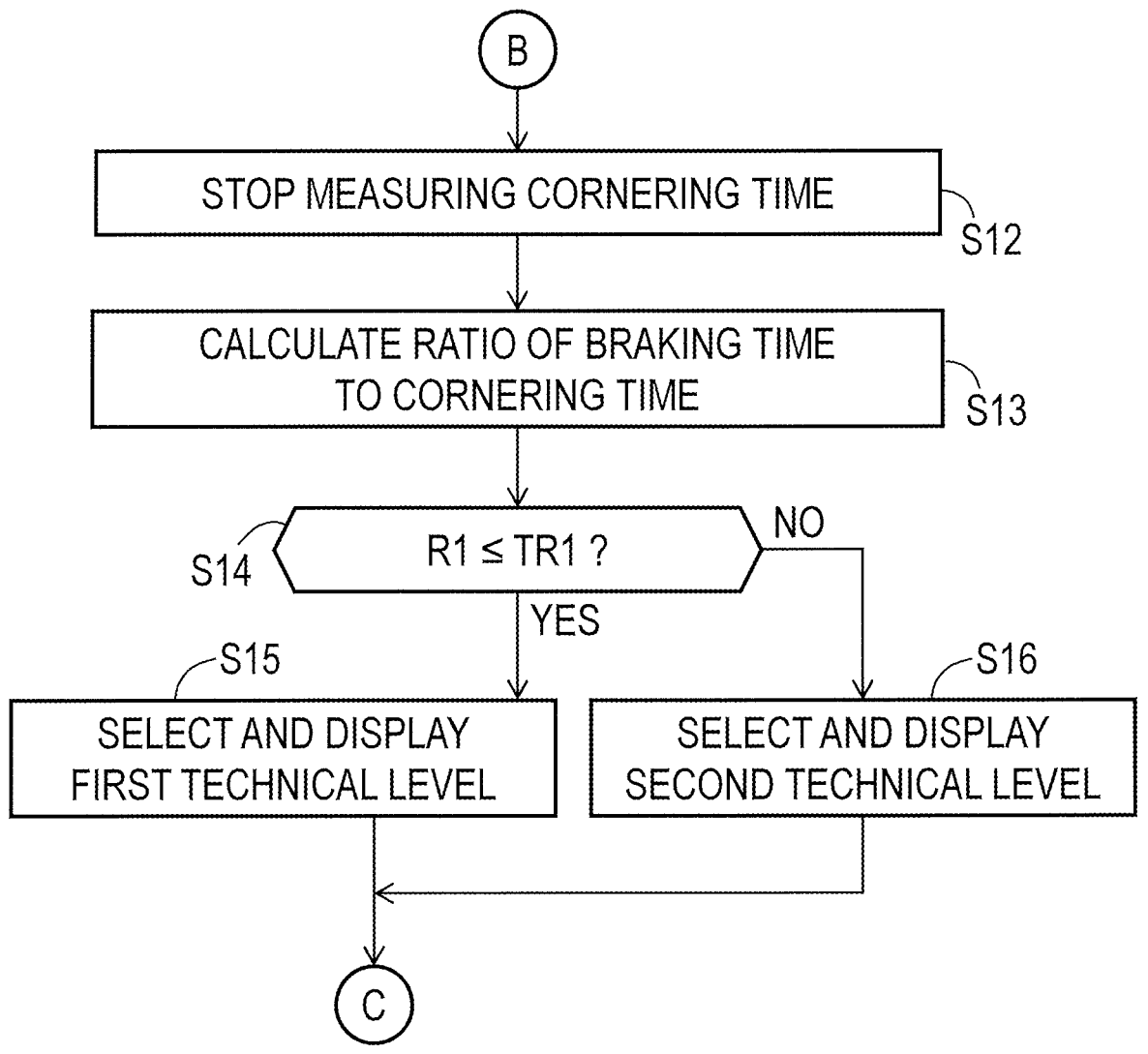

As seen in FIGS. 10 and 11, the electronic controller circuitry EC1 is configured to determine whether the human-powered vehicle B is cornering based on the motion information INF21. For example, the electronic controller circuitry EC1 is configured to conclude that the human-powered vehicle B is cornering in a case where the first rotation angle AG1 of the human-powered vehicle B is greater than or equal to a first angle threshold TAG11. The electronic controller circuitry EC1 is configured to conclude that the human-powered vehicle B is not cornering in a case where the first rotation angle AG1 of the human-powered vehicle B is less than the first angle threshold TAG11. Namely, the electronic controller circuitry EC1 is configured to conclude that the motion information INF21 meets the first motion condition MC1 in a case where the first rotation angle AG1 of the human-powered vehicle B is greater than or equal to the first angle threshold TAG11. The electronic controller circuitry EC1 is configured to conclude that the motion information INF21 meets the second motion condition MC2 in a case where the first rotation angle AG1 of the human-powered vehicle B is less than the first angle threshold TAG11. The electronic controller circuitry EC1 is configured to store the first angle threshold TAG11 in the memory EC12.

Figure 12:
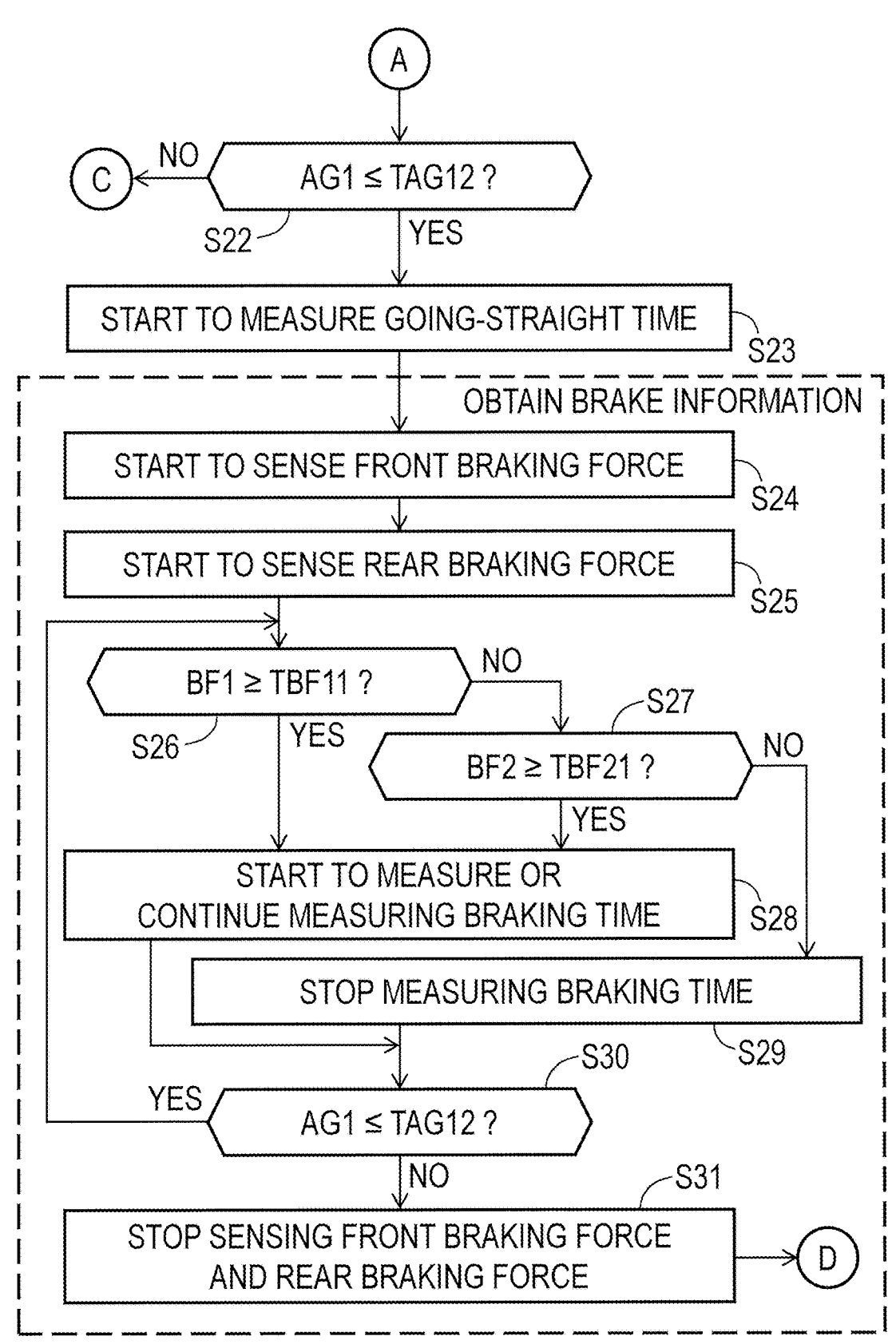
Figure 13:
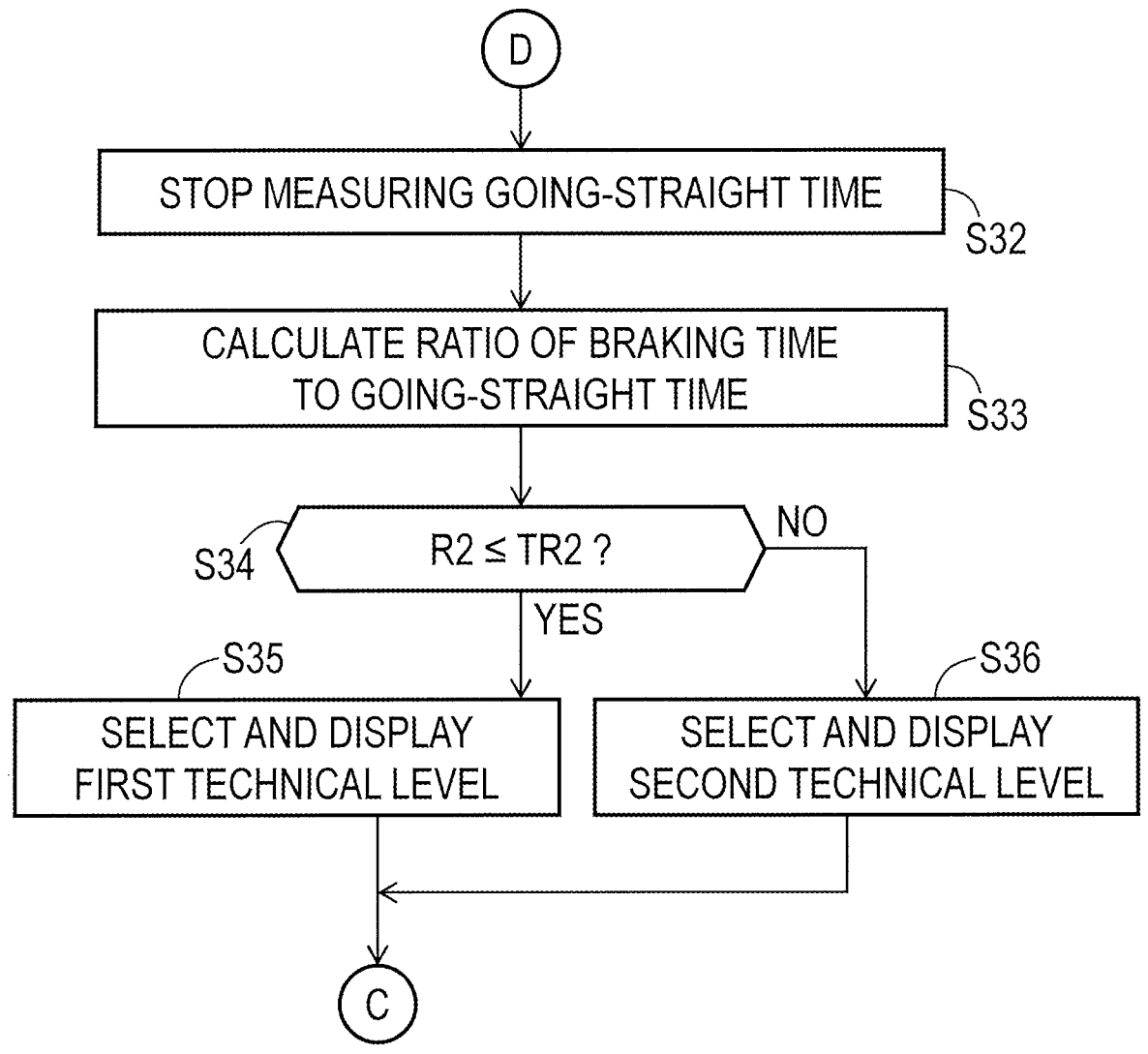

As seen in FIGS. 12 and 13, the electronic controller circuitry EC1 is configured to determine whether the human-powered vehicle B is going straight based on the motion information INF21. For example, the electronic controller circuitry EC1 is configured to conclude that the human-powered vehicle B is going straight in a case where the first rotation angle AG1 of the human-powered vehicle B is less than or equal to a first additional angle threshold TAG12. The electronic controller circuitry EC1 is configured to conclude that the human-powered vehicle B is not going straight in a case where the first rotation angle AG1 of the human-powered vehicle B is greater than or equal to the first additional angle threshold TAG12. Namely, the electronic controller circuitry EC1 is configured to conclude that the motion information INF21 meets the first motion condition MC1 in a case where the first rotation angle AG1 of the human-powered vehicle B is less than the first additional angle threshold TAG12. The electronic controller circuitry EC1 is configured to conclude that the motion information INF21 meets the second motion condition MC2 in a case where the first rotation angle AG1 of the human-powered vehicle B is greater than or equal to the first additional angle threshold TAG12. The electronic controller circuitry EC1 is configured to store the first additional angle threshold TAG12 in the memory EC12.

In the present embodiment, the first additional angle threshold TAG12 is different from the first angle threshold TAG1. However, the first additional angle threshold TAG12 can be equal to the first angle threshold TAG1 if needed or desired.

As seen in FIGS. 10 and 11, the electronic controller circuitry EC1 is configured to select the first technical level TL1 in a case where the human-powered vehicle B is cornering and where the braking time for which the braking is executed meets the braking-time condition. The electronic controller circuitry EC1 is configured to select the second technical level TL2 in a case where the human-powered vehicle B is cornering and where the braking time does not meet the braking-time condition.

The electronic controller circuitry EC1 is configured to select the first technical level TL1 in a case where the human-powered vehicle B is cornering and where the braking time meets a first braking-time condition. The electronic controller circuitry EC1 is configured to select the second technical level TL2 in a case where the human-powered vehicle B is cornering and where the braking time does not meet the first braking-time condition.

As seen in FIGS. 12 and 13, the electronic controller circuitry EC1 is configured to select the first technical level TL1 in a case where the human-powered vehicle B is going straight and where the braking time for which the braking is executed meets the braking-time condition. The electronic controller circuitry EC1 is configured to select the first technical level TL1 in a case where the human-powered vehicle B is going straight and where the braking time does not meet the braking-time condition.

The electronic controller circuitry EC1 is configured to select the first technical level TL1 in a case where the human-powered vehicle B is going straight and where the braking time meets a second braking-time condition. The electronic controller circuitry EC1 is configured to select the first technical level TL1 in a case where the human-powered vehicle B is going straight and where the braking time does not meet the second braking-time condition.

The detection methods executed by the detection system 10 will be described in detail below referring to FIGS. 10 to 13.

As seen in FIGS. 10 to 13, the detection method comprises: obtaining the brake information INF1 relating to braking of the brake device 24 and/or 26 of the human-powered vehicle B using the first sensor SS1; obtaining, using the second sensor SS2, the vehicle information INF2 including at least one of: the motion information INF21 relating to the motion of the human-powered vehicle B; and the geographical information INF22 relating to the geographical location of the human-powered vehicle B; and determining, using the electronic controller circuitry EC1, the technical level TL of the rider of the human-powered vehicle B based on the brake information INF1 and the vehicle information INF2.

The computer-readable storage medium EC12 storing program instructions for causing the detection system 10 to execute the detection method comprises: obtaining the brake information INF1 relating to braking of the brake device 24 and/or 26 of the human-powered vehicle B using the first sensor SS1; obtaining, using the second sensor SS2, the vehicle information INF2 including at least one of: the motion information INF21 relating to the motion of the human-powered vehicle B; and the geographical information INF22 relating to the geographical location of the human-powered vehicle B; and determining, using the electronic controller circuitry EC1, the technical level TL of the rider of the human-powered vehicle B based on the brake information INF1 and the vehicle information INF2.

As seen in FIG. 10, in step S1, the second sensor SS2 obtains the vehicle information INF2. For example, the motion sensor MS obtains the motion information INF21. The electronic controller circuitry EC1 receives the output of the motion sensor MS of the second sensor SS2. The electronic controller circuitry EC1 recognizes or calculates the first rotation angle AG1 of the human-powered vehicle B based on the output of the motion sensor MS.

In step S2, the electronic controller circuitry EC1 determines whether the human-powered vehicle B is cornering based on the motion information INF21. For example, the electronic controller circuitry EC1 determines whether the human-powered vehicle B is cornering based on the first rotation angle AG1. The electronic controller circuitry EC1 determines whether the first rotation angle AG1 is greater than or equal to the first angle threshold TAG11. In a case where the first rotation angle AG1 is less than the first angle threshold TAG11, it can be understood that the human-powered vehicle B is not cornering. Thus, in a case where the electronic controller circuitry EC1 concludes that the first rotation angle AG1 is less than the first angle threshold TAG11, the electronic controller circuitry EC1 concludes that the human-powered vehicle B is not cornering, then the process proceeds to step S22 depicted in FIG. 12. In a case where the first rotation angle AG1 is greater than or equal to the first angle threshold TAG11, it can be understood that the human-powered vehicle B is cornering. Thus, in a case where the electronic controller circuitry EC1 concludes that the first rotation angle AG1 is greater than or equal to the first angle threshold TAG11, the electronic controller circuitry EC1 concludes that the human-powered vehicle B is cornering, then the process proceeds to step S3. In step S3, the electronic controller circuitry EC1 starts to measure a cornering time for which the human-powered vehicle B is cornering.

In steps S4 to S11, the first sensor SS1 obtains the brake information INF1. In steps S4 and S5, the first sensor SS1 starts to sense the braking force of the brake device 24 and/or 26. In step S4, the front force sensor FS1 starts to sense the front braking force BF1 of the brake device 24. In step S5, the rear force sensor FS2 starts to sense the rear braking force BF2 of the brake device 26.

Figure 14:
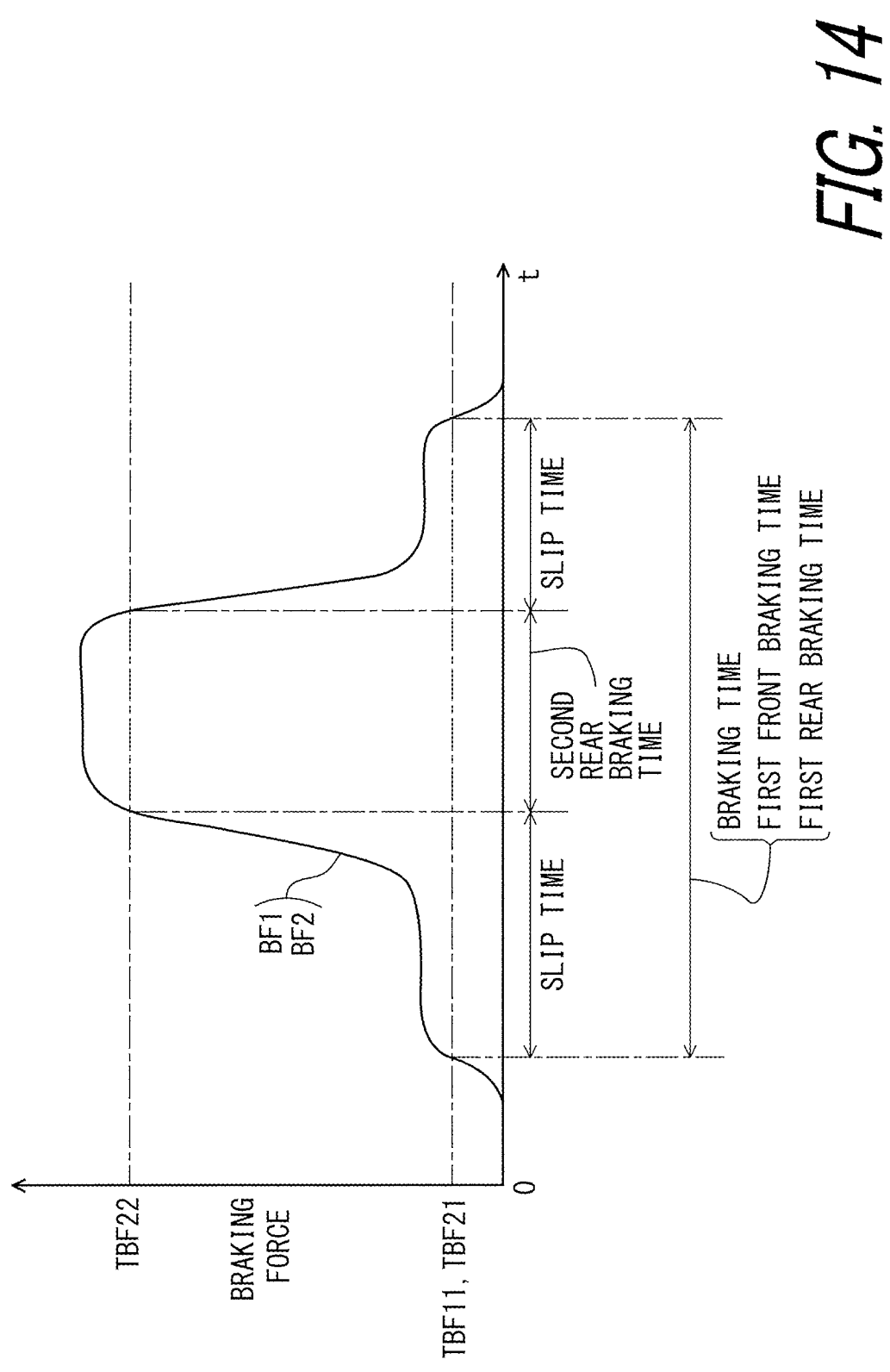
FIG. 14 shows a graph of braking force of the brake device of the human-powered vehicle illustrated in FIG. 1.

In steps S6 and S7, the electronic controller circuitry EC1 compares the braking force with a braking-force threshold. In step S6, the electronic controller circuitry EC1 compares the front braking force BF1 with a front braking-force threshold TBF11. As seen in FIG. 14, the front braking-force threshold TBF11 corresponds to a case where the brake pads 24D and 24E of the brake device 24 are comparatively lightly sliding with the disc brake rotor BR. Thus, in a case where the front braking force BF1 is greater than or equal to the front braking-force threshold TBF11, it can be understood that the brake pads 24D and 24E of the brake device 24 are comparatively lightly sliding with the disc brake rotor BR but the speed of the human-powered vehicle B is less likely to decrease.

As seen in FIG. 10, in a case where the electronic controller circuitry EC1 concludes that the front braking force BF1 is greater than or equal to the front braking-force threshold TBF11, the electronic controller circuitry EC1 concludes that the brake pads 24D and 24E of the brake device 24 are sliding with the disc brake rotor BR, then the electronic controller circuitry EC1 starts to measure the braking time for which the braking of the brake device 24 is executed in step S8. In a case where the electronic controller circuitry EC1 has started to measure the braking time before step S8, the electronic controller circuitry EC1 continues measuring the braking time.

In a case where the electronic controller circuitry EC1 concludes that the front braking force BF1 is less than the front braking-force threshold TBF11, in step S7, the electronic controller circuitry EC1 compares the rear braking force BF2 with a first rear braking-force threshold TBF21. As seen in FIG. 14, the first rear braking-force threshold TBF21 corresponds to a case where the brake pads 26D and 26E of the brake device 26 are comparatively lightly sliding with the disc brake rotor BR. Thus, in a case where the rear braking force BF2 is greater than or equal to the first rear braking-force threshold TBF21, it can be understood that the brake pads 26D and 26E of the brake device 26 are comparatively lightly sliding with the disc brake rotor BR but the speed of the human-powered vehicle B is less likely to decrease.

As seen in FIG. 10, in a case where the electronic controller circuitry EC1 concludes that the rear braking force BF2 is greater than or equal to the first rear braking-force threshold TBF21, the electronic controller circuitry EC1 concludes that the brake pads 26D and 26E of the brake device 26 are sliding with the disc brake rotor BR, then the electronic controller circuitry EC1 starts to measure the braking time for which the braking of the brake device 26 is executed in step S8. In a case where the electronic controller circuitry EC1 has started to measure the braking time before step S8, the electronic controller circuitry EC1 continues measuring the braking time.

In a case where the electronic controller circuitry EC1 concludes that the rear braking force BF2 is less than the rear braking-force threshold TBF12 in step S7, the electronic controller circuitry EC1 stops measuring the braking time in step S9. The electronic controller circuitry EC1 stores the braking time in the memory EC12. In a case where the electronic controller circuitry EC1 has not started to measure the braking time before step S9, the process proceeds to step S10.

In step S10, as with step S2, the electronic controller circuitry EC1 determines whether the human-powered vehicle B is cornering based on the motion information INF21. For example, the electronic controller circuitry EC1 determines whether the human-powered vehicle B is cornering based on the first rotation angle AG1. The electronic controller circuitry EC1 determines whether the first rotation angle AG1 is greater than or equal to the first angle threshold TAG11. In a case where the electronic controller circuitry EC1 concludes that the first rotation angle AG1 is greater than or equal to the first angle threshold TAG11, the electronic controller circuitry EC1 concludes that the human-powered vehicle B is cornering, then the process returns to step S6. Steps S6 to S9 are repeatedly executed until the human-powered vehicle B finishes cornering.

In step S10, in a case where the electronic controller circuitry EC1 concludes that the first rotation angle AG1 is less than the first angle threshold TAG11, the electronic controller circuitry EC1 concludes that the human-powered vehicle B is not cornering, then the electronic controller circuitry EC1 stops sensing the front braking force and the rear braking force in step S11. The process proceeds to step S12 depicted in FIG. 11.

As seen in FIG. 11, in step S12, the electronic controller circuitry EC1 stops measuring the cornering time. The electronic controller circuitry EC1 stores the cornering time in the memory EC12.

In step S13, the electronic controller circuitry EC1 calculates a ratio R1 of the braking time to the cornering time. The electronic controller circuitry EC1 stores the ratio R1 in the memory EC12.

In step S14, the electronic controller circuitry EC1 compares the ratio R1 with a reference ratio TR1 stored in the memory EC12. In a case where the ratio R1 is less than or equal to the reference ratio TR1, the braking time is comparatively short during cornering. Thus, in a case where the electronic controller circuitry EC1 concludes that the ratio R1 is less than or equal to the reference ratio TR1, the electronic controller circuitry EC1 selects the first technical level TL1, which indicates a higher level. The electronic controller circuitry EC1 controls the display ED2 to display the first technical level TL1. In a case where the ratio R1 is greater than the reference ratio TR1, the braking time is comparatively long during cornering. Thus, in a case where the electronic controller circuitry EC1 concludes that the ratio R1 is greater than the reference ratio TR1, the electronic controller circuitry EC1 selects the second technical level TL2, which indicates a lower level. The electronic controller circuitry EC1 controls the display ED2 to display the second technical level TL2. The process returns to step S1 depicted in FIG. 10.

As seen in FIG. 12, the process proceeds to step S22 after the electronic controller circuitry EC1 concludes that the first rotation angle AG1 is less than the first angle threshold TAG11 in step S2 of FIG. 10. In step S22, the electronic controller circuitry EC1 compares the first rotation angle AG1 with a first additional angle threshold TAG12. In a case where the first rotation angle AG1 is greater than or equal to the first additional angle threshold TAG12, it can be understood that the human-powered vehicle B is not going straight. Thus, in a case where the electronic controller circuitry EC1 concludes that the first rotation angle AG1 is greater than the first additional angle threshold TAG12, the electronic controller circuitry EC1 concludes that the human-powered vehicle B is not going straight, then the process returns to step S1 of FIG. 10. In a case where the first rotation angle AG1 is less than the first additional angle threshold TAG12, it can be understood that the human-powered vehicle B is going straight. Thus, in a case where the electronic controller circuitry EC1 concludes that the first rotation angle AG1 is less than or equal to the first additional angle threshold TAG12, the electronic controller circuitry EC1 concludes that the human-powered vehicle B is going straight, then the electronic controller circuitry EC1 starts to measure a going-straight time for which the human-powered vehicle B is going straight in step S23.

In steps S24 to S31, the first sensor SS1 obtains the brake information INF1. In steps S24 and S25, the first sensor SS1 starts to sense the braking force of the brake device 24 and/or 26. In step S24, the front force sensor FS1 starts to sense the front braking force BF1 of the brake device 24. In step S25, the rear force sensor FS2 starts to sense the rear braking force BF2 of the brake device 26.

In steps S26 and S27, the electronic controller circuitry EC1 compares the braking force with the braking-force threshold. In step S26, the electronic controller circuitry EC1 compares the front braking force BF1 with the front braking-force threshold TBF11. In a case where the electronic controller circuitry EC1 concludes that the front braking force BF1 is greater than or equal to the front braking-force threshold TBF11, the electronic controller circuitry EC1 concludes that the brake pads 24D and 24E of the brake device 24 are sliding with the disc brake rotor BR, then the electronic controller circuitry EC1 starts to measure the braking time for which the braking of the brake device 24 is executed in step S28. In a case where the electronic controller circuitry EC1 has started to measure the braking time before step S28, the electronic controller circuitry EC1 continues measuring the braking time.

In a case where the electronic controller circuitry EC1 concludes that the front braking force BF1 is less than the front braking-force threshold TBF11, in step S27, the electronic controller circuitry EC1 compares the rear braking force BF2 with the first rear braking-force threshold TBF21. In a case where the electronic controller circuitry EC1 concludes that the rear braking force BF2 is greater than or equal to the first rear braking-force threshold TBF21, the electronic controller circuitry EC1 concludes that the brake pads 26D and 26E of the brake device 26 are sliding with the disc brake rotor BR, then the electronic controller circuitry EC1 starts to measure the braking time for which the braking of the brake device 26 is executed in step S28. In a case where the electronic controller circuitry EC1 has started to measure the braking time before step S28, the electronic controller circuitry EC1 continues measuring the braking time.

In a case where the electronic controller circuitry EC1 concludes that the rear braking force BF2 is less than the rear braking-force threshold TBF21 in step S27, the electronic controller circuitry EC1 stops measuring the braking time in step S29. The electronic controller circuitry EC1 stores the braking time in the memory EC12. In a case where the electronic controller circuitry EC1 has not started to measure the braking time before step S29, the process proceeds to step S30.

In step S30, as with step S22, the electronic controller circuitry EC1 determines whether the human-powered vehicle B is going straight based on the motion information INF21. For example, the electronic controller circuitry EC1 determines whether the human-powered vehicle B is going straight based on the first rotation angle AG1. The electronic controller circuitry EC1 determines whether the first rotation angle AG1 is greater than or equal to the first additional angle threshold TAG12. In a case where the electronic controller circuitry EC1 concludes that the first rotation angle AG1 is greater than or equal to the first additional angle threshold TAG12, the electronic controller circuitry EC1 concludes that the human-powered vehicle B is going straight, then the process returns to step S26. Steps S26 to S29 are repeatedly executed until the human-powered vehicle B finishes going straight.

In a case where the electronic controller circuitry EC1 concludes that the first rotation angle AG1 is less than the first additional angle threshold TAG12, the electronic controller circuitry EC1 concludes that the human-powered vehicle B is not going straight, then the process proceeds to step S31. In step S31, the electronic controller circuitry EC1 stops sensing the front braking force and the rear braking force. The process proceeds to step S32 depicted in FIG. 13.

As seen in FIG. 13, in step S32, the electronic controller circuitry EC1 stops measuring the going-straight time. The electronic controller circuitry EC1 stores the going-straight time in the memory EC12.

In step S33, the electronic controller circuitry EC1 calculates a ratio R2 of the braking time to the going-straight time. The electronic controller circuitry EC1 stores the ratio R2 in the memory EC12.

In step S34, the electronic controller circuitry EC1 compares the ratio R2 with a reference ratio TR2 stored in the memory EC12. In a case where the ratio R2 is less than or equal to the reference ratio TR2, the electronic controller circuitry EC1 selects the first technical level TL1. The electronic controller circuitry EC1 controls the display ED2 to display the first technical level TL1. In a case where the ratio R2 is greater than the reference ratio TR2, the electronic controller circuitry EC1 selects the second technical level TL2. The electronic controller circuitry EC1 controls the display ED2 to display the second technical level TL2. The process returns to step S1 depicted in FIG. 10.

In the above embodiment and the modifications thereof, the electronic controller circuitry EC1 determines the technical level TL based on the first rotation angle AG1, the cornering time, and the braking time. As seen in FIG. 15, however, the electronic controller circuitry EC1 can be configured to determine the technical level TL based on the first rotation angle AG1, the first angular velocity AV1, and the braking force.

As seen in FIG. 15, the electronic controller circuitry EC1 is configured to determine whether the human-powered vehicle B is cornering based on the motion information INF21. In steps S41 and S42, the second sensor SS2 obtains the vehicle information INF2. In step S41, for example, the motion sensor MS obtains the motion information INF21. The electronic controller circuitry EC1 receives the output of the motion sensor MS of the second sensor SS2. The electronic controller circuitry EC1 calculates the first rotation angle AG1 of the human-powered vehicle B based on the output of the motion sensor MS. The electronic controller circuitry EC1 calculates the first angular velocity AV1 of the human-powered vehicle B based on the output of the motion sensor MS.

In step S42, the location sensor LS obtains the geographical information INF22. The location sensor LS obtains the current location of the human-powered vehicle B. For example, the location sensor LS obtains the current coordinate of the human-powered vehicle B. The electronic controller circuitry EC1 receives the output of the location sensor LS of the second sensor SS2. The electronic controller circuitry EC1 receives the current location of the location sensor LS of the second sensor SS2. For example, the electronic controller circuitry EC1 receives the current coordinate of the human-powered vehicle B from the location sensor LS. The electronic controller circuitry EC1 stores the geographical information INF22 in the memory EC12.

In step S43, the electronic controller circuitry EC1 determines whether the human-powered vehicle B is cornering based on the motion information INF21. For example, the electronic controller circuitry EC1 determines whether the human-powered vehicle B is cornering based on the first rotation angle AG1. The electronic controller circuitry EC1 determines whether the first rotation angle AG1 is greater than or equal to the first angle threshold TAG11. In a case where the electronic controller circuitry EC1 concludes that the first rotation angle AG1 is less than the first angle threshold TAG11, the electronic controller circuitry EC1 concludes that the human-powered vehicle B is not cornering, then the process proceeds to step S41. In a case where the electronic controller circuitry EC1 concludes that the first rotation angle AG1 is greater than or equal to the first angle threshold TAG11, the electronic controller circuitry EC1 concludes that the human-powered vehicle B is cornering, then the process proceeds to step S44.

In step S44, the electronic controller circuitry EC1 compares the first angular velocity AV1 with a first angular-velocity threshold TAV1. In a case where the electronic controller circuitry EC1 concludes that the first angular velocity AV1 is greater than or equal to the first angular-velocity threshold TAV1, the electronic controller circuitry EC1 concludes that the human-powered vehicle B is overturning. Thus, in step S45, the electronic controller circuitry EC1 concludes that the human-powered vehicle B is in an abnormal state. In a case where the electronic controller circuitry EC1 concludes that the first angular velocity AV1 is less than the first angular-velocity threshold TAV1, the electronic controller circuitry EC1 concludes that the human-powered vehicle B is not overturning. The process proceeds to step S46.

In steps S46 to S49, the first sensor SS1 obtains the brake information INF1. In steps S46 and S47, the first sensor SS1 starts to sense the braking force of the brake device 24 and/or 26. In step S46, the front force sensor FS1 starts to sense the front braking force BF1 of the brake device 24. In step S47, the rear force sensor FS2 starts to sense the rear braking force BF2 of the brake device 26.

In steps S48 and S49, the electronic controller circuitry EC1 compares the braking force with the braking-force threshold. In step S48, the electronic controller circuitry EC1 compares the front braking force BF1 with the front braking-force threshold TBF11. In a case where the front braking force BF1 is greater than or equal to the front braking-force threshold TBF11, it can be understood that the brake pads 24D and 24E of the brake device 24 are sliding with the disc brake rotor BR. Thus, in a case where the electronic controller circuitry EC1 concludes that the front braking force BF1 is greater than or equal to the front braking-force threshold TBF11, the electronic controller circuitry EC1 concludes that the user uses the brake device 24 during the cornering and/or the overturning of the human-powered vehicle B. Thus, in step S51, the electronic controller circuitry EC1 selects the second technical level TL2. The electronic controller circuitry EC1 controls the display ED2 to display the second technical level TL2. In step S52, the electronic controller circuitry EC1 concludes that the braking mistake occurs. In step S53, the electronic controller circuitry EC1 stores the geographical information INF22 along with the second technical level TL2 in the memory EC12.

In a case where the electronic controller circuitry EC1 concludes that the front braking force BF1 is less than the first front braking-force threshold TBF11 in step S48, the electronic controller circuitry EC1 compares the rear braking force BF2 with the first rear braking-force threshold TBF21 in step S49. In a case where the rear braking force BF2 is greater than or equal to the first rear braking-force threshold TBF21, the brake pads 26D and 26E of the brake device 26 are sliding with the disc brake rotor BR. In a case where the electronic controller circuitry EC1 concludes that the rear braking force BF2 is greater than or equal to the first rear braking-force threshold TBF21 in step S49, the user uses the brake device 26 during the cornering and/or the overturning of the human-powered vehicle B. Thus, in step S51, the electronic controller circuitry EC1 selects the second technical level TL2. The electronic controller circuitry EC1 controls the display ED2 to display the second technical level TL2. The process proceeds to step S52. In a case where the electronic controller circuitry EC1 concludes that the rear braking force BF2 is less than the first rear braking-force threshold TBF21 in step S49, the electronic controller circuitry EC1 selects the first technical level TL1 in step S50. The electronic controller circuitry EC1 controls the display ED2 to display the first technical level TL1. The process returns to step S41.

Figure 16:
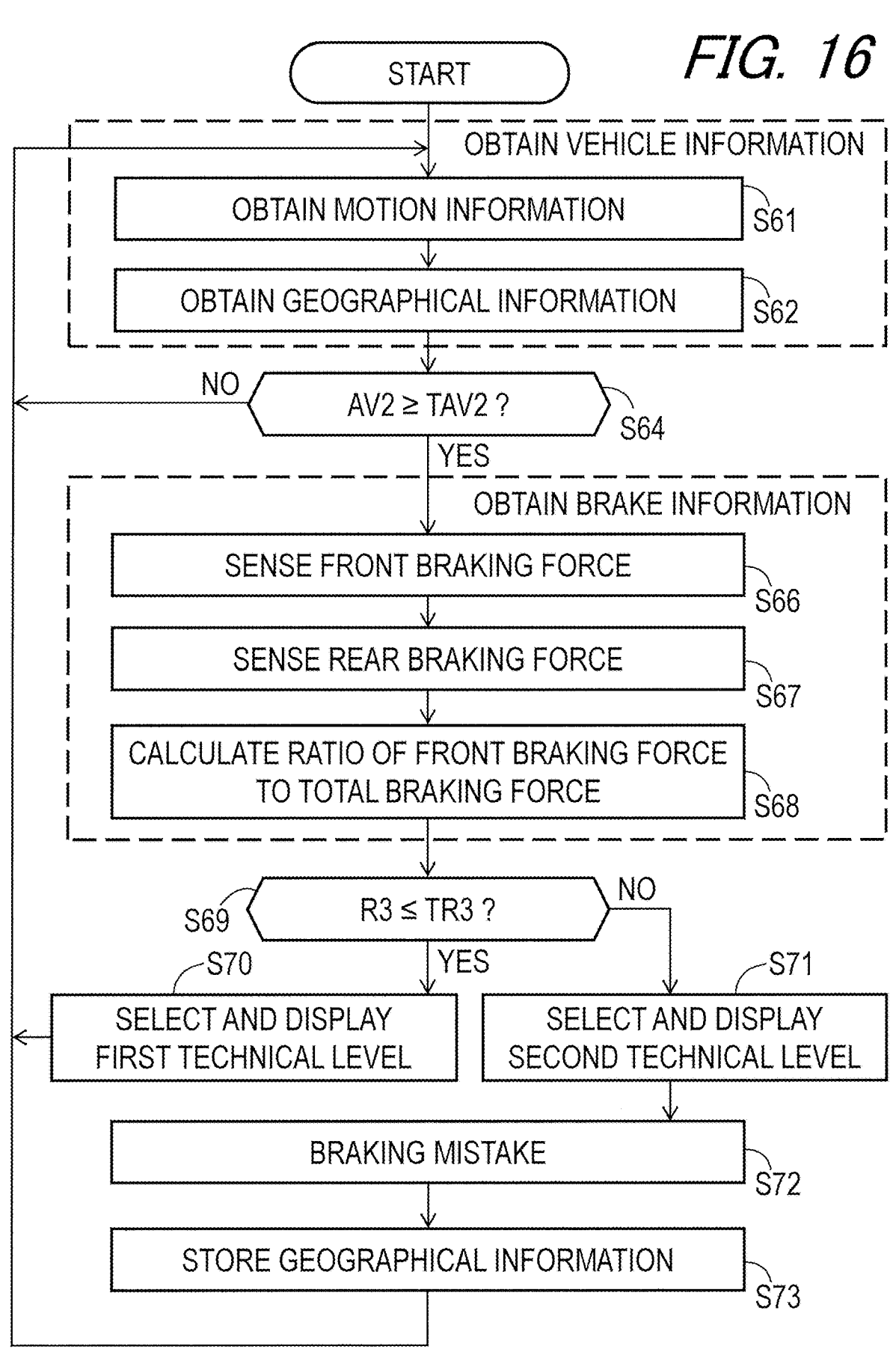

As seen in FIG. 16, the electronic controller circuitry EC1 is configured to determine whether the human-powered vehicle B is rolling forward about the second axis A2 based on the motion information INF21. The rolling forward of the human-powered vehicle B can include: a motion in which the front wheel FW sinks toward the road surface while the tire of the front wheel FW is compressed due to force causing the human-powered vehicle B to roll forward; a motion in which the front suspension FF is compressed due to force causing the human-powered vehicle B to roll forward; and a motion in which the rear wheel RW moves away from the road surface due to force causing the human-powered vehicle B to roll forward in a state where the front wheel FW is in contact with the road surface. For example, the electronic controller circuitry EC1 is configured to conclude that the human-powered vehicle B is rolling forward in a case where the second rotational angle of the human-powered vehicle B is greater than or equal to a second angle threshold. The electronic controller circuitry EC1 is configured to conclude that the human-powered vehicle B is not rolling forward in a case where the second rotational angle of the human-powered vehicle B is less than the second angle threshold. Namely, the electronic controller circuitry EC1 is configured to conclude that the motion information INF21 meets the first motion condition MC1 in a case where the second rotational angle of the human-powered vehicle B is greater than or equal to the second angle threshold. The electronic controller circuitry EC1 is configured to conclude that the motion information INF21 meets the second motion condition MC2 in a case where the second rotational angle of the human-powered vehicle B is less than the second angle threshold. The electronic controller circuitry EC1 is configured to store the second angle threshold in the memory EC12.

As seen in FIG. 16, the electronic controller circuitry EC1 is configured to determine whether the braking time for which the braking is executed meets the braking-time condition based on the brake information INF1. The electronic controller circuitry EC1 is configured to determine whether the braking time for which the braking is executed meets the braking-time condition based on the output of the first sensor SS1.

For example, the electronic controller circuitry EC1 is configured to determine whether the braking of the brake device 24 is being executed based on the output of the front force sensor FS1. The electronic controller circuitry EC1 is configured to determine whether the braking of the brake device 24 is being executed in a case where the output of the front force sensor FS1 is greater than or equal to a force threshold. The electronic controller circuitry EC1 is configured to determine whether the braking of the brake device 24 is not being executed in a case where the output of the front force sensor FS1 is less than the force threshold.

The electronic controller circuitry EC1 is configured to measure a single braking time for which the braking of the brake device 24 is being continuously executed while the output of the front force sensor FS1 is greater than or equal to the force threshold. The electronic controller circuitry EC1 is configured to total, as the braking time, the single braking times during a specific period of time such as while the vehicle information INF2 meets the first vehicle condition VC1. The electronic controller circuitry EC1 is configured to store the braking time in the memory EC12.

The electronic controller circuitry EC1 is configured to determine whether the braking of the brake device 26 is being executed based on the output of the rear force sensor FS2. The electronic controller circuitry EC1 is configured to determine whether the braking of the brake device 26 is being executed in a case where the output of the rear force sensor FS2 is greater than or equal to a force threshold. The electronic controller circuitry EC1 is configured to determine whether the braking of the brake device 26 is not being executed in a case where the output of the rear force sensor FS2 is less than the force threshold.

The electronic controller circuitry EC1 is configured to measure a single braking time for which the braking of the brake device 26 is being continuously executed while the output of the rear force sensor FS2 is greater than or equal to the force threshold. The electronic controller circuitry EC1 is configured to total, as the braking time, the single braking times during a specific period of time such as while the vehicle information INF2 meets the first vehicle condition VC1. The electronic controller circuitry EC1 is configured to store the braking time in the memory EC12.

As seen in FIG. 16, the electronic controller circuitry EC1 is configured to calculate brake power of the brake device 24 and/or 26 based on the brake information INF1. The electronic controller circuitry EC1 is configured to calculate front power of the brake device 24 based on the brake information INF1. The electronic controller circuitry EC1 is configured to calculate rear power of the brake device 26 based on the brake information INF1.

The electronic controller circuitry EC1 is configured to calculate rear power of the brake device 26 based on the brake information INF1. The electronic controller circuitry EC1 is configured to calculate rear power of the brake device 26 based on the output of the first sensor SS1. For example, the electronic controller circuitry EC1 is configured to calculate the rear power of the brake device 26 based on the output of the rear force sensor FS2. The electronic controller circuitry EC1 is configured to calculate the rear power of the brake device 26 by multiplying the output of the rear force sensor FS2 by the single brake period corresponding to the output of the rear force sensor FS2.

As seen in FIG. 16, the electronic controller circuitry EC1 is configured to determine whether the brake power of the brake device 24 and/or 26 meets brake power condition based on the brake information INF1. The electronic controller circuitry EC1 is configured to determine whether the brake power of the brake device 24 and/or 26 meets the brake power condition based on the calculated brake power and the calculated front power.

For example, the electronic controller circuitry EC1 is configured to calculate a front-brake ratio of the front power to the brake power based on the calculated brake power and the calculated front power. The electronic controller circuitry EC1 is configured to store the front brake ratio in the memory EC12. The electronic controller circuitry EC1 is configured to determine whether the front brake ratio is greater than or equal to a front brake threshold.

As seen in FIG. 16, the electronic controller circuitry EC1 can be configured to determine the technical level TL based on the second angular velocity AV2 and the ratio of the front or rear braking force to the total braking force.

For example, in steps S61 and S62, the second sensor SS2 obtains the vehicle information INF2. In step S61, for example, the motion sensor MS obtains the motion information INF21. The electronic controller circuitry EC1 receives the output of the motion sensor MS of the second sensor SS2. The electronic controller circuitry EC1 recognizes or calculates the second rotation angle AG2 of the human-powered vehicle B based on the output of the motion sensor MS. The electronic controller circuitry EC1 calculates the second angular velocity AV2 of the human-powered vehicle B based on the output of the motion sensor MS.

In step S62, the location sensor LS obtains the geographical information INF22. The location sensor LS obtains the current location of the human-powered vehicle B. For example, the location sensor LS obtains the current coordinate of the human-powered vehicle B. The electronic controller circuitry EC1 receives the output of the location sensor LS of the second sensor SS2. The electronic controller circuitry EC1 receives the current location of the location sensor LS of the second sensor SS2. For example, the electronic controller circuitry EC1 receives the current coordinate of the human-powered vehicle B from the location sensor LS. The electronic controller circuitry EC1 stores the geographical information INF22 in the memory EC12.

In step S64, the electronic controller circuitry EC1 compares the second angular velocity AV2 with a second angular-velocity threshold TAV2. In a case where the electronic controller circuitry EC1 concludes that the second angular velocity AV2 is less than the second angular-velocity threshold TAV2, the electronic controller circuitry EC1 concludes that the human-powered vehicle B is not rolling forward. Thus, the process returns to step S61. In a case where the electronic controller circuitry EC1 concludes that the second angular velocity AV2 is greater than or equal to the second angular-velocity threshold TAV2, the electronic controller circuitry EC1 concludes that the human-powered vehicle B is rolling forward. Thus, the process proceeds to step S66.

In steps S66 to S68, the first sensor SS1 obtains the brake information INF1. In steps S66 and S67, the first sensor SS1 senses the braking force of the brake device 24 and/or 26. In step S66, the front force sensor FS1 senses the front braking force BF1 of the brake device 24. In step S67, the rear force sensor FS2 senses the rear braking force BF2 of the brake device 26. In step S68, the electronic controller circuitry EC1 calculates a ratio R3 of the front braking force to the total braking force. The total braking force is a total of the front braking force and the rear braking force.

In step S69, the electronic controller circuitry EC1 compares the ratio R3 with a ratio threshold TR3. In a case where the ratio R3 is less than or equal to the ratio threshold TR3, the user mainly uses the rear brake device 26 rather than the front brake device 24. Thus, in a case where the electronic controller circuitry EC1 concludes that the ratio R3 is less than or equal to the ratio threshold TR3, the electronic controller circuitry EC1 selects the first technical level TL1 in step S70. The electronic controller circuitry EC1 controls the display ED2 to display the first technical level TL1. The process returns to step S61.

In a case where the electronic controller circuitry EC1 concludes that the ratio R3 is greater than the ratio threshold TR3, the electronic controller circuitry EC1 selects the second technical level TL2 in step S71. The electronic controller circuitry EC1 controls the display ED2 to display the second technical level TL2. In step S72, the electronic controller circuitry EC1 concludes that the braking mistake occurs. In step S73, the electronic controller circuitry EC1 stores the geographical information INF22 along with the second technical level TL2 in the memory EC12. The process returns to step S61.

As seen in FIGS. 10 to 16, the electronic controller circuitry EC1 is configured to determine the technical level TL based on the brake information INF1 and the motion information INF21. As seen in FIGS. 17 to 20, however, the electronic controller circuitry EC1 can be configured to determine the technical level TL based on the brake information INF1 and the geographical information INF22 if needed or desired.

As seen in FIG. 9, the electronic controller circuitry EC1 is configured to select the first technical level TL1 in a case where the brake information INF1 meets the first brake condition BC1 and where the geographical information INF22 meets the first geographical condition GC1. The electronic controller circuitry EC1 is configured to select the second technical level TL2 in a case where the brake information INF1 meets the second brake condition BC2 and where the geographical information INF22 meets the first geographical condition GC1.

Figure 17:
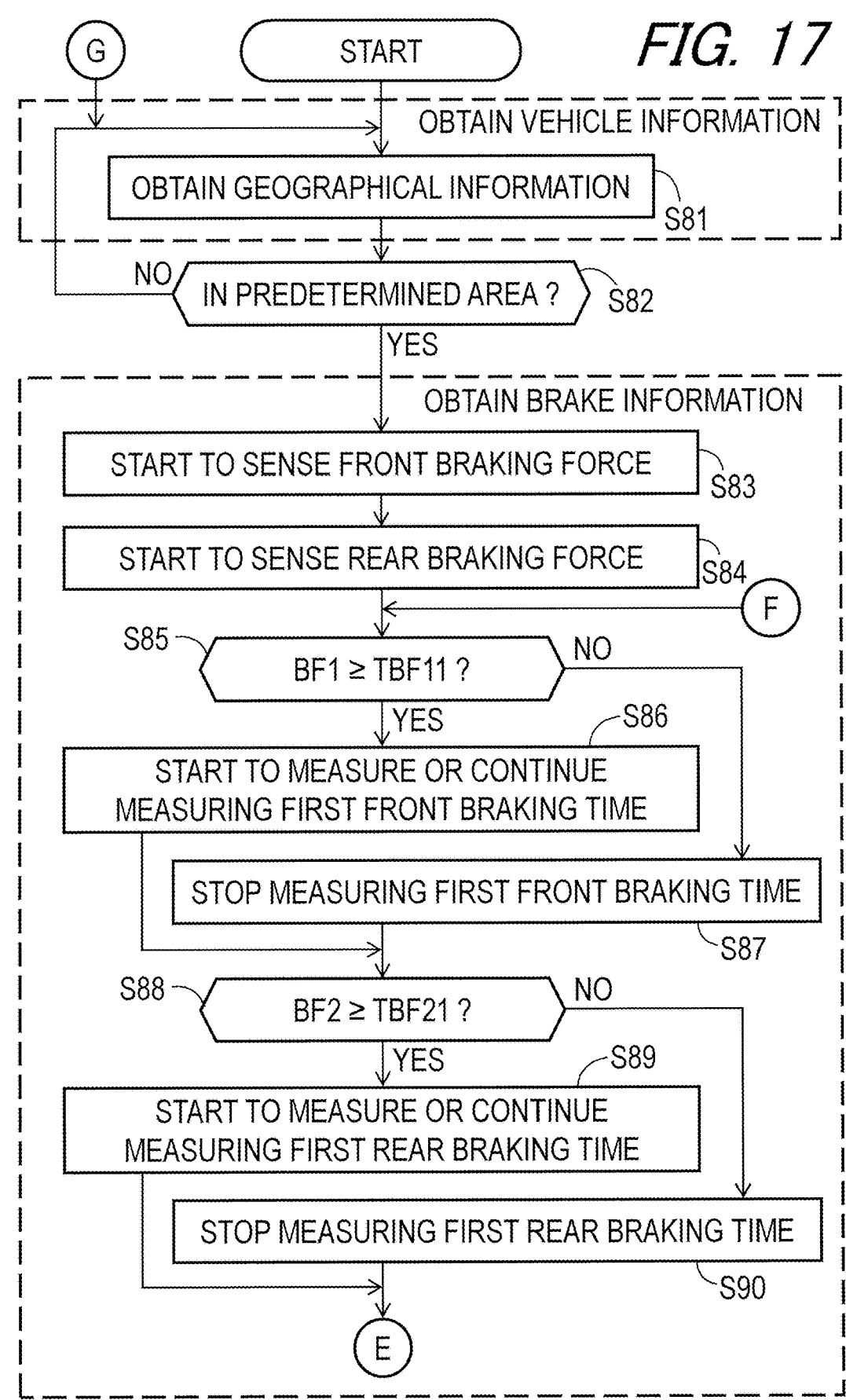
Figure 18:
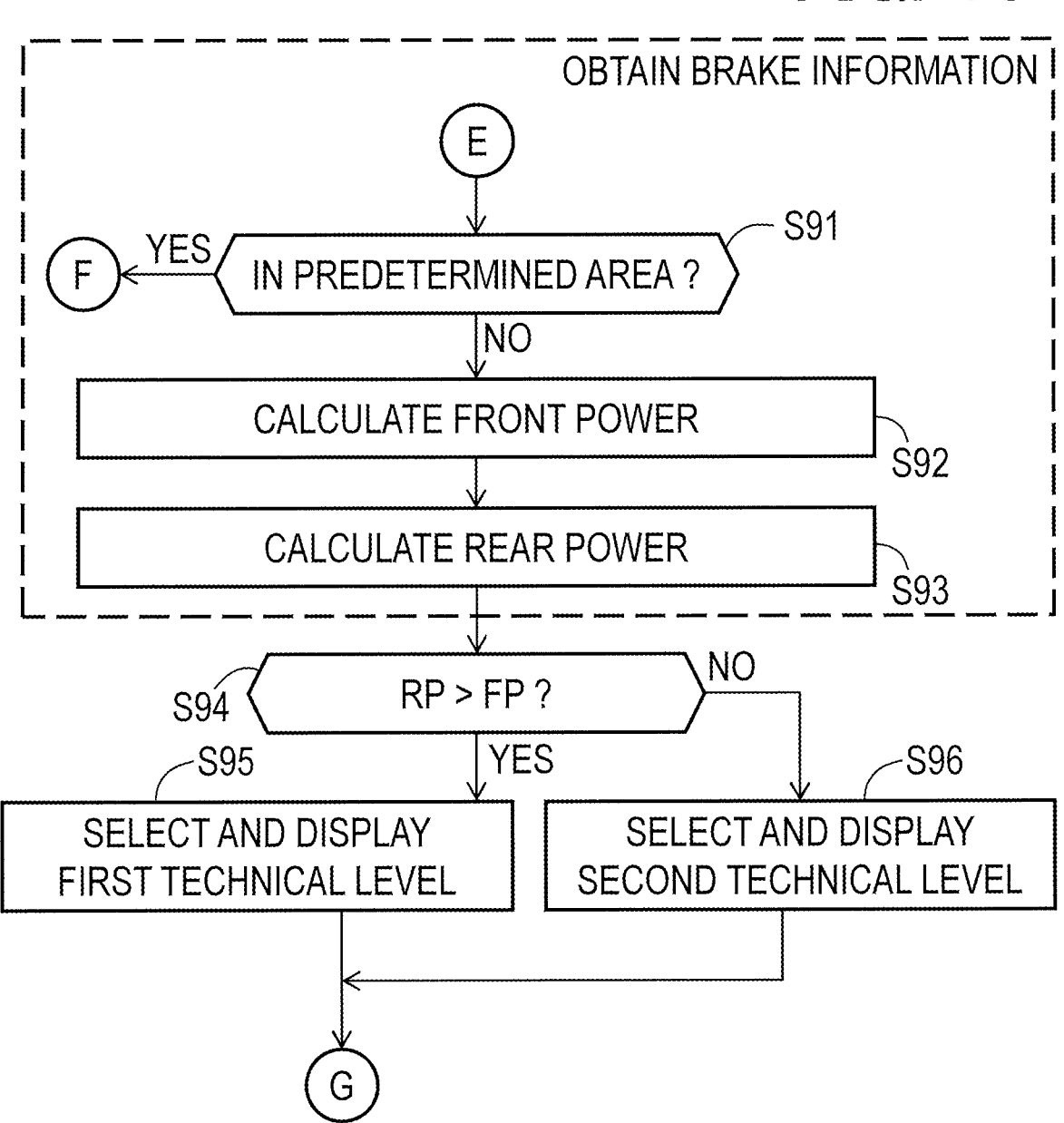
Figure 19:
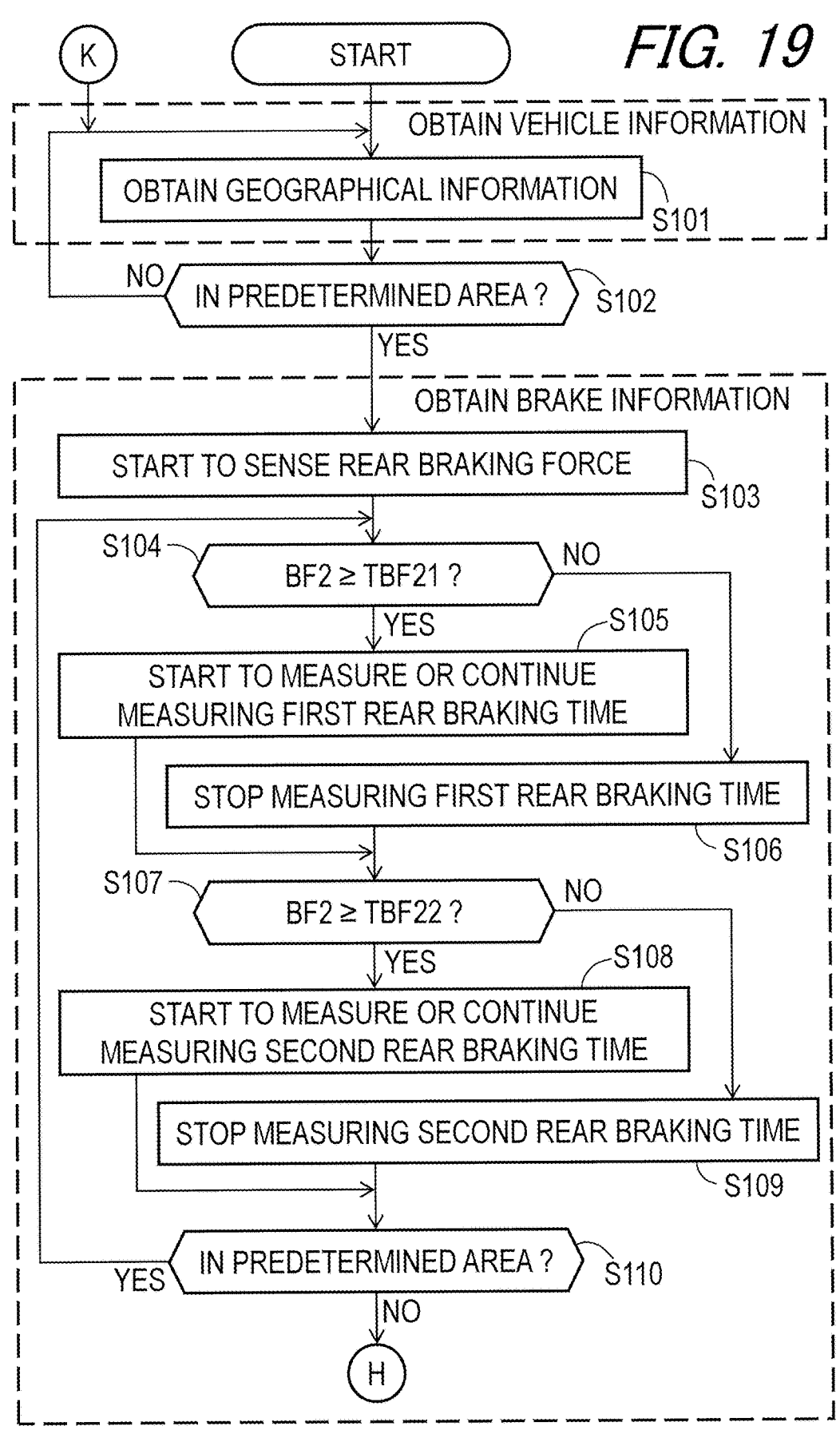
Figure 20:
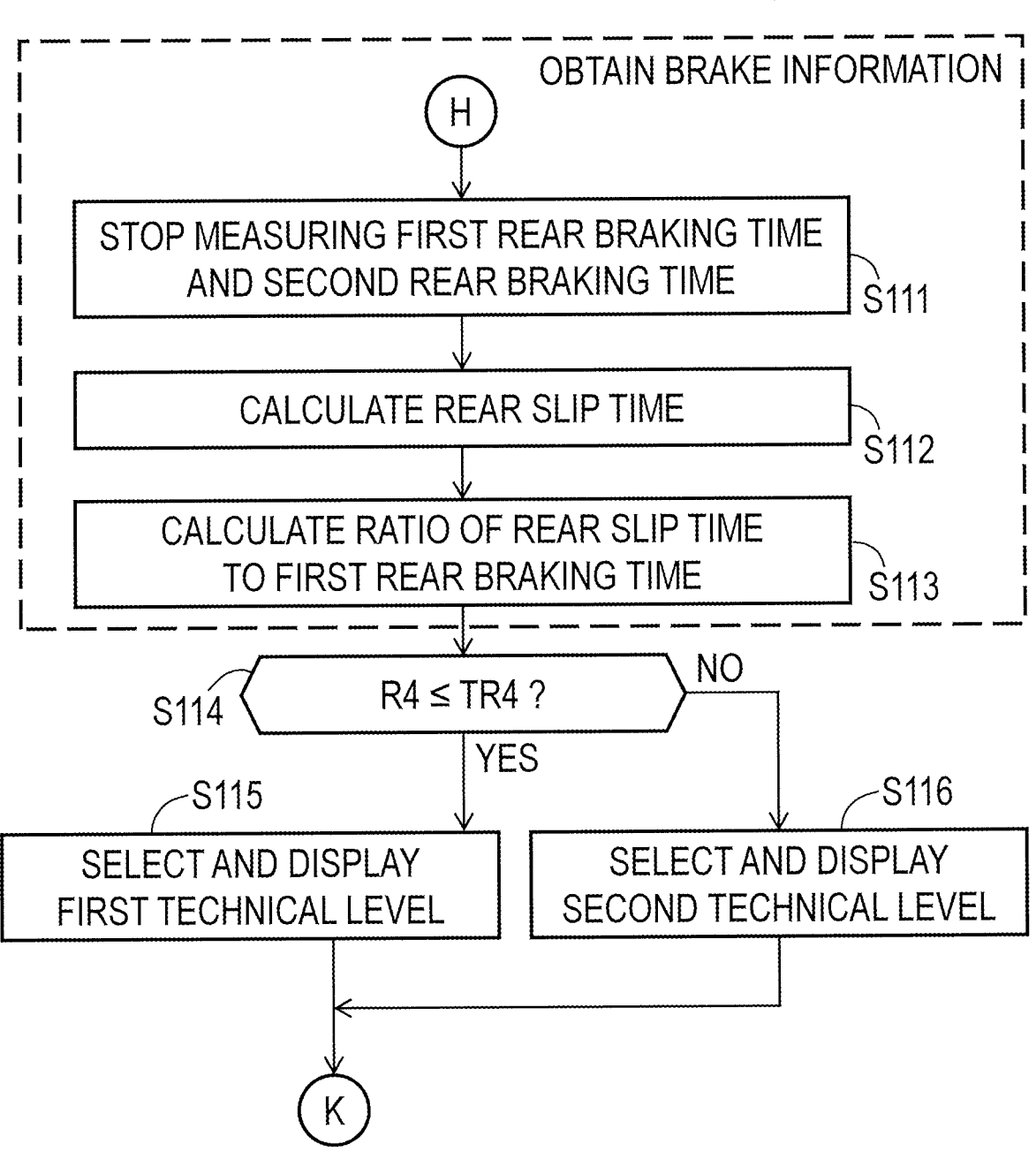

As seen in FIGS. 17 to 20, the electronic controller circuitry EC1 is configured to determine, based on the geographical information INF22, a time period for which the human-powered vehicle B travels in a section selected by a user. As seen in FIGS. 17 and 18, the electronic controller circuitry EC1 is configured to select the first technical level TL1 in a case where a relationship between front power FP of the front brake device 24 and rear power RP of the rear brake device 26 meets a brake power condition. As seen in FIGS. 19 and 20, the electronic controller circuitry EC1 is configured to select the first technical level TL1 in a case where a slip ratio R4 of the rear brake device 26 meets a rear brake slip condition.

As seen in FIG. 17, in step S81, the second sensor SS2 obtains the vehicle information INF2. For example, the location sensor LS obtains the geographical information INF22. The location sensor LS obtains the current location of the human-powered vehicle B. Specifically, the location sensor LS obtains the current coordinate of the human-powered vehicle B. The electronic controller circuitry EC1 receives the output of the location sensor LS of the second sensor SS2. The electronic controller circuitry EC1 receives the current location of the location sensor LS of the second sensor SS2. For example, the electronic controller circuitry EC1 receives the current coordinate of the human-powered vehicle B from the location sensor LS. The electronic controller circuitry EC1 stores the geographical information INF22 in the memory EC12.

In step S82, the electronic controller circuitry EC1 determines whether the human-powered vehicle B is in the predetermined area based on the geographical information INF22. For example, the electronic controller circuitry EC1 determines whether the human-powered vehicle B is in the predetermined area based on the current coordinate included in the geographical information INF22. The electronic controller circuitry EC1 compares the geographical information INF22 with the information of the predetermined area. The predetermined area is indicated with coordinates such as longitudes and latitudes. The electronic controller circuitry EC1 can be configured to compare the geographical information INF22 with the information of at least two predetermined areas if needed or desired.

In a case where the electronic controller circuitry EC1 concludes that the human-powered vehicle B is not in the predetermined areas, the process returns to step S81. In a case where the electronic controller circuitry EC1 concludes that the human-powered vehicle B is in the predetermined area, the process returns to step S83.

In steps S83 to S93, the first sensor SS1 obtains the brake information INF1. In steps S83 and S84, the first sensor SS1 starts to sense the braking force of the brake device 24 and/or 26. In step S83, the front force sensor FS1 starts to sense the front braking force BF1 of the front brake device 24. In step S84, the rear force sensor FS2 starts to sense the rear braking force BF2 of the rear brake device 26.

In step S85, the electronic controller circuitry EC1 compares the front braking force BF1 with the front braking-force threshold TBF11. In a case where the electronic controller circuitry EC1 concludes that the front braking force BF1 is greater than or equal to the front braking-force threshold TBF11, the electronic controller circuitry EC1 starts to measure a first front braking time for which the braking of the front brake device 24 is executed in step S86. In a case where the electronic controller circuitry EC1 has started to measure the braking time before step S86, the electronic controller circuitry EC1 continues measuring the first front braking time.

In a case where the electronic controller circuitry EC1 concludes that the front braking force BF1 is less than the front braking-force threshold TBF11 in step S85, the electronic controller circuitry EC1 stops measuring the first front braking time in step S87. The process proceeds to step S88.

In step S88, the electronic controller circuitry EC1 compares the rear braking force BF2 with the first rear braking-force threshold TBF21. In a case where the electronic controller circuitry EC1 concludes that the rear braking force BF2 is greater than or equal to the first rear braking-force threshold TBF21, the electronic controller circuitry EC1 starts to measure a first rear braking time for which the braking of the rear brake device 26 is executed in step S89. In a case where the electronic controller circuitry EC1 has started to measure the braking time before step S89, the electronic controller circuitry EC1 continues measuring the first rear braking time.

In a case where the electronic controller circuitry EC1 concludes that the rear braking force BF2 is less than the first rear braking-force threshold TBF21 in step S88, the electronic controller circuitry EC1 stops measuring the first rear braking time in step S90. The process proceeds to step S91 depicted in FIG. 18.

As seen in FIG. 18, in step S91, the electronic controller circuitry EC1 determines whether the human-powered vehicle B is in the predetermined area. In a case where the electronic controller circuitry EC1 concludes that the human-powered vehicle B is in the predetermined area, the process returns to step S81.

In a case where the electronic controller circuitry EC1 concludes that the human-powered vehicle B is not in the predetermined area in step S91, the electronic controller circuitry EC1 calculates front power FP of the front brake device 24 based on the brake information INF1 in step S92. The electronic controller circuitry EC1 calculates the front power FP of the front brake device 24 based on the output of the first sensor SS1 in step S92. The electronic controller circuitry EC1 calculates the front power FP based on the front braking force and the first front braking time in step S92. For example, the electronic controller circuitry EC1 calculates the front power FP by multiplying an average of the front braking force by the first front braking time.

In step S93, the electronic controller circuitry EC1 calculates rear power RP of the rear brake device 26 based on the brake information INF1 in step S93. The electronic controller circuitry EC1 calculates the rear power RP of the rear brake device 26 based on the output of the first sensor SS1 in step S93. The electronic controller circuitry EC1 calculates the rear power RP based on the rear braking force and the first rear braking time. For example, the electronic controller circuitry EC1 calculates the rear power RP by multiplying an average of the rear braking force by the first rear braking time. The process proceeds to step S94.

In step S94, the electronic controller circuitry EC1 compares the rear power RP with the front power FP. In a case where the electronic controller circuitry EC1 concludes that the rear power RP is greater than the front power FP in step S94, the electronic controller circuitry EC1 selects the first technical level TL1 in step S95. The electronic controller circuitry EC1 controls the display ED2 to display the first technical level TL1. In a case where the electronic controller circuitry EC1 concludes that the rear power RP is less than or equal to the front power FP in step S94, the electronic controller circuitry EC1 selects the second technical level TL2 in step S96. The electronic controller circuitry EC1 controls the display ED2 to display the second technical level TL2. The process returns to step S81.

As seen in FIG. 19, in step S101, the second sensor SS2 obtains the vehicle information INF2. For example, the location sensor LS obtains the geographical information INF22. The location sensor LS obtains the current location of the human-powered vehicle B. Specifically, the location sensor LS obtains the current coordinate of the human-powered vehicle B. The electronic controller circuitry EC1 receives the output of the location sensor LS of the second sensor SS2. The electronic controller circuitry EC1 receives the current location of the location sensor LS of the second sensor SS2. For example, the electronic controller circuitry EC1 receives the current coordinate of the human-powered vehicle B from the location sensor LS. The electronic controller circuitry EC1 stores the geographical information INF22 in the memory EC12.

In step S102, the electronic controller circuitry EC1 determines whether the human-powered vehicle B is in the predetermined area based on the geographical information INF22. For example, the electronic controller circuitry EC1 determines whether the human-powered vehicle B is in the predetermined area based on the current coordinate included in the geographical information INF22. The electronic controller circuitry EC1 compares the geographical information INF22 with the information of the predetermined area. The predetermined area is indicated with coordinates such as longitudes and latitudes. The electronic controller circuitry EC1 can be configured to compare the geographical information INF22 with the information of at least two predetermined areas if needed or desired.

In a case where the electronic controller circuitry EC1 concludes that the human-powered vehicle B is not in the predetermined area, the process returns to step S101. In a case where the electronic controller circuitry EC1 concludes that the human-powered vehicle B is in the predetermined area, the process returns to step S103.

In steps S103 to S113, the first sensor SS1 obtains the brake information INF1. In step S103, the rear force sensor FS2 starts to sense the rear braking force BF2 of the rear brake device 26.

In step S104, the electronic controller circuitry EC1 compares the rear braking force BF2 with the first rear braking-force threshold TBF21. In a case where the electronic controller circuitry EC1 concludes that the rear braking force BF2 is greater than or equal to the first rear braking-force threshold TBF21, the electronic controller circuitry EC1 starts to measure the first rear braking time for which the braking of the rear brake device 26 is executed in step S105. In a case where the electronic controller circuitry EC1 has started to measure the braking time before step S105, the electronic controller circuitry EC1 continues measuring the first rear braking time.

In a case where the electronic controller circuitry EC1 concludes that the rear braking force BF2 is less than the first rear braking-force threshold TBF21 in step S105, the electronic controller circuitry EC1 stops measuring the first rear braking time in step S106. The process proceeds to step S107.

In step S107, the electronic controller circuitry EC1 compares the rear braking force BF2 with a second rear braking-force threshold TBF22. As seen in FIG. 14, the second rear braking-force threshold TBF22 corresponds to a case where the brake pads 26D and 26E of the rear brake device 26 are comparatively tightly sliding with the disc brake rotor BR. Thus, in a case where the rear braking force BF2 is greater than or equal to the second rear braking-force threshold TBF22, it can be understood that the brake pads 26D and 26E of the rear brake device 26 are comparatively tightly sliding with the disc brake rotor BR, decreasing the speed of the human-powered vehicle B. The second rear braking force threshold TBF22 is greater than the first rear braking threshold TBF21.

As seen in FIG. 19, in a case where the electronic controller circuitry EC1 concludes that the rear braking force BF2 is greater than or equal to the second rear braking-force threshold TBF22 in step S107, the electronic controller circuitry EC1 concludes that the brake pads 26D and 26E of the rear brake device 26 are comparatively tightly sliding with the disc brake rotor BR or the brake pads 26D and 26E stops rotating the disc brake rotor BR, then the electronic controller circuitry EC1 starts to measure the second rear braking time for which the braking of the rear brake device 26 is executed in step S108. In a case where the electronic controller circuitry EC1 has started to measure the braking time before step S108, the electronic controller circuitry EC1 continues measuring the second rear braking time. In a case where the electronic controller circuitry EC1 concludes that the rear braking force BF2 is less than the second rear braking-force threshold TBF22 in step S107, the electronic controller circuitry EC1 stops measuring the second rear braking time in step S109. The process proceeds to step S110.

In step S110, the electronic controller circuitry EC1 determines whether the human-powered vehicle B is in the predetermined area. In a case where the electronic controller circuitry EC1 concludes that the human-powered vehicle B is in the predetermined area, the process returns to step S101 depicted in FIG. 20.

As seen in FIG. 20, in a case where the electronic controller circuitry EC1 concludes that the human-powered vehicle B is not in the predetermined area in step S110, the electronic controller circuitry EC1 stops measuring the first rear braking time and the second braking time in step S111. The electronic controller circuitry EC1 stores the first rear braking time and the second rear braking time in the memory EC12.

In step S112, the electronic controller circuitry EC1 calculates a rear slip time. For example, the rear slip time includes a time during which the rear wheel RW is slipping. It can be determined that the rear wheel RW is slipping in a case where the vehicle speed obtained based on the rotational speed of the rear wheel RW is lower than the propulsion speed of the human-powered vehicle B. The propulsion speed of the human-powered vehicle B can be calculated based on the geographical information INF22 or the output of the acceleration sensor MS1. The first rear braking time indicates a total rear braking time including the rear slip time. The second rear braking time indicates a rear braking time for which the rear brake device 26 applies the greater braking force to the disc brake rotor BR than the rear braking time other than the second rear braking time. Thus, for example, the electronic controller circuitry EC1 calculates the rear slip time by subtracting the second rear braking time from the first rear braking time.

In step S113, the electronic controller circuitry EC1 calculates a slip ratio R4 of the rear slip time to the first rear braking time.

In step S114, the electronic controller circuitry EC1 compares the slip ratio R4 with a ratio threshold TR4. In a case where the electronic controller circuitry EC1 concludes that the slip ratio R4 is less than or equal to the ratio threshold TR4, in step S115, the electronic controller circuitry EC1 selects the first technical level TL1. The electronic controller circuitry EC1 controls the display ED2 to display the first technical level TL1. In a case where the electronic controller circuitry EC1 concludes that the slip ratio R4 is greater than the ratio threshold TR4, in step S116, the electronic controller circuitry EC1 selects the second technical level TL2. The electronic controller circuitry EC1 controls the display ED2 to display the second technical level TL2. The process returns to step S101.

In the above embodiments and the modifications thereof, the electronic controller circuitry EC1 is configured to determine the technical level TL based on the brake information INF1 and the vehicle information INF2. As seen in FIGS. 21 to 24, however, the electronic controller circuitry EC1 can be configured to determine a technical level TL of the rider of the human-powered vehicle B based on the motion information INF21 without the brake information INF1 if needed or desired. As seen in FIGS. 21 to 24, the electronic controller circuitry EC1 is configured to determine whether the human-powered vehicle B is cornering based on the motion information INF21. The electronic controller circuitry EC1 is configured to select the first technical level TL1 in a case where the human-powered vehicle B is cornering and where a state of the human-powered vehicle B is in a predetermined state.

Figure 21:
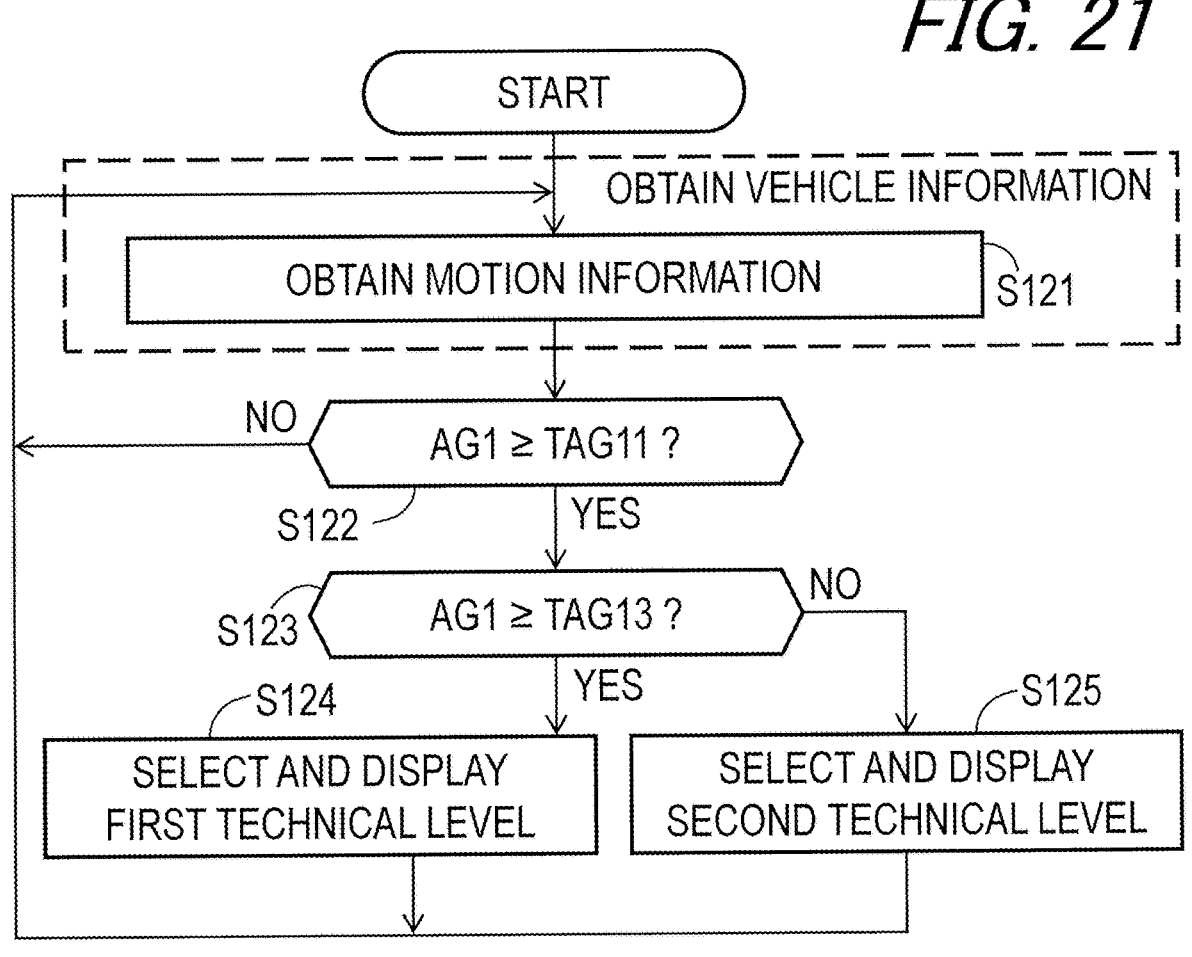

As seen in FIG. 21, the electronic controller circuitry EC1 is configured to determine whether the human-powered vehicle B is cornering based on the motion information INF21. In step S121, the second sensor SS2 obtains the vehicle information INF2. For example, the motion sensor MS obtains the motion information INF21. The electronic controller circuitry EC1 receives the output of the motion sensor MS of the second sensor SS2. The electronic controller circuitry EC1 recognizes or calculates the first rotation angle AG1 of the human-powered vehicle B based on the output of the motion sensor MS.

In step S122, the electronic controller circuitry EC1 determines whether the human-powered vehicle B is cornering based on the motion information INF21. For example, the electronic controller circuitry EC1 determines whether the human-powered vehicle B is cornering based on the first rotation angle AG1. The electronic controller circuitry EC1 determines whether the first rotation angle AG1 is greater than or equal to the first angle threshold TAG11. In a case where the electronic controller circuitry EC1 concludes that the first rotation angle AG1 is less than the first angle threshold TAG11, the electronic controller circuitry EC1 concludes that the human-powered vehicle B is not cornering, then the process returns to step S121. In a case where the electronic controller circuitry EC1 concludes that the first rotation angle AG1 is greater than or equal to the first angle threshold TAG11, the electronic controller circuitry EC1 concludes that the human-powered vehicle B is cornering, then the process proceeds to step S123.

In step S123, the electronic controller circuitry EC1 determines whether the first rotation angle AG1 is greater than or equal to a third angle threshold TAG13. The third angle threshold TAG13 is greater than the first angle threshold TAG11. In a case where the first rotation angle AG1 is greater than or equal to the third angle threshold TAG13 during cornering, it can be understood that the user can incline the human-powered vehicle B at a greater inclination angle about the first axis A1 during cornering. Thus, in a case where the electronic controller circuitry EC1 concludes that the first rotation angle AG1 is greater than or equal to the third angle threshold TAG13 in step S123, the electronic controller circuitry EC1 selects the first technical level TL1 in step S124. The electronic controller circuitry EC1 controls the display ED2 to display the first technical level TL1. In a case where the electronic controller circuitry EC1 concludes that the first rotation angle AG1 is less than the third angle threshold TAG13 in step S123, the electronic controller circuitry EC1 selects the second technical level TL2 in step S125. The electronic controller circuitry EC1 controls the display ED2 to display the second technical level TL2. The process returns to step S121.

Figure 22:
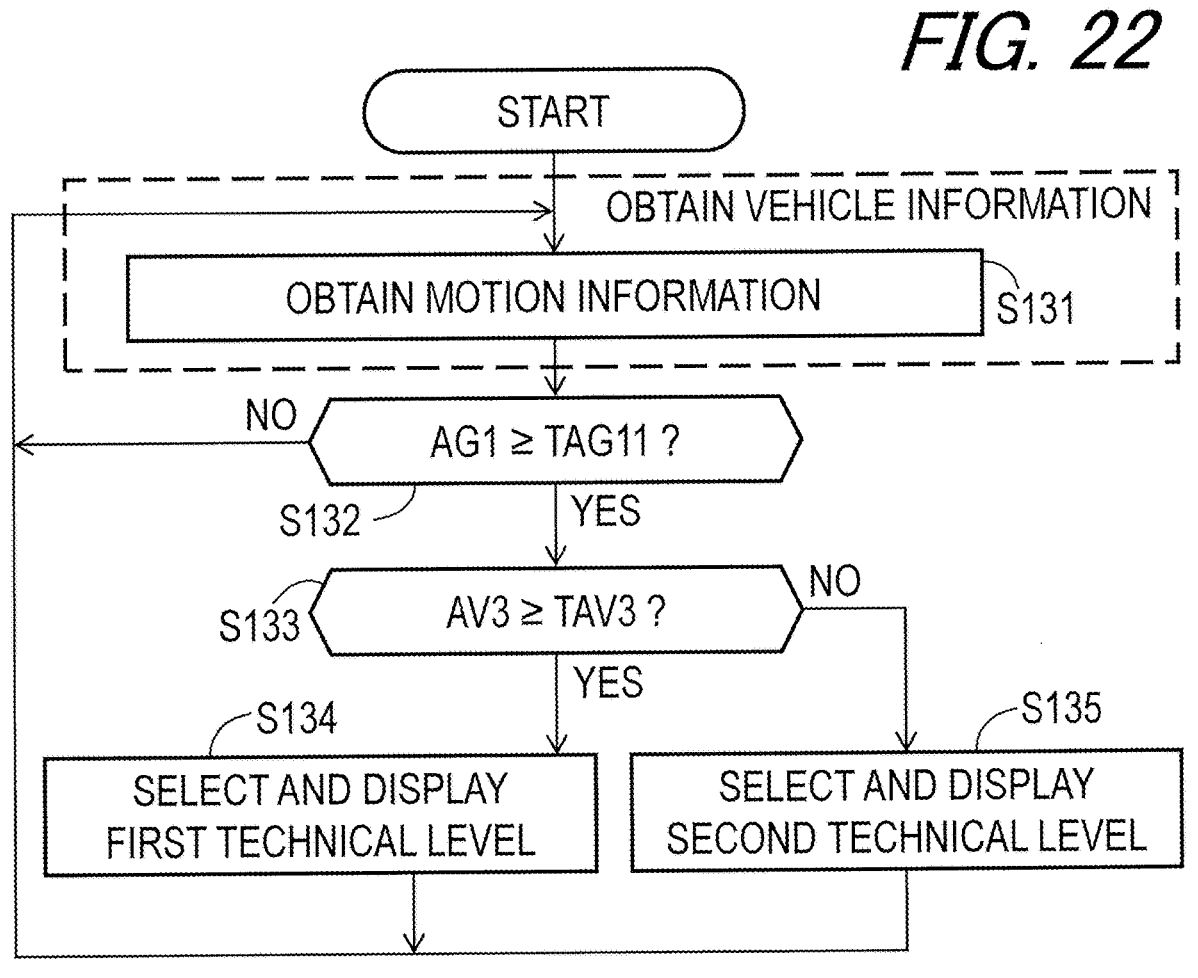

As seen in FIG. 22, the electronic controller circuitry EC1 is configured to determine whether the human-powered vehicle B is cornering based on the motion information INF21. In step S131, the second sensor SS2 obtains the vehicle information INF2. For example, the motion sensor MS obtains the motion information INF21. The electronic controller circuitry EC1 receives the output of the motion sensor MS of the second sensor SS2. The electronic controller circuitry EC1 recognizes or calculates the first rotation angle AG1 of the human-powered vehicle B based on the output of the motion sensor MS. Furthermore, the electronic controller circuitry EC1 receive the third rotation angle AG3 from the motion sensor MS. The electronic controller circuitry EC1 calculates the third angular velocity AV3 of the human-powered vehicle B based on the third rotation angle AG3.

In step S132, the electronic controller circuitry EC1 determines whether the human-powered vehicle B is cornering based on the motion information INF21. In a case where the electronic controller circuitry EC1 concludes that the first rotation angle AG1 is less than the first angle threshold TAG11 in step S132, the process returns to step S131. In a case where the electronic controller circuitry EC1 concludes that the first rotation angle AG1 is greater than or equal to the first angle threshold TAG11 in step S132, the process proceeds to step S133.

In step S133, the electronic controller circuitry EC1 compares the third angular velocity AV3 with a third angular-velocity threshold TAV3. In a case where the third angular velocity AV3 is greater than or equal to the third angular-velocity threshold TAV3, it can be understood that the human-powered vehicle B is cornering fast. Namely, the user has a higher cornering skill. Thus, in a case where the electronic controller circuitry EC1 concludes that the third angular velocity AV3 is greater than or equal to the third angular-velocity threshold TAV3 in step S133, the electronic controller circuitry EC1 selects the first technical level TL1 in step S134. The electronic controller circuitry EC1 controls the display ED2 to display the first technical level TL1.

In a case where the third angular velocity AV3 is less than the third angular-velocity threshold TAV3 in step S133, it can be understood that the human-powered vehicle B is cornering slow. Thus, in a case where the electronic controller circuitry EC1 concludes that the third angular velocity AV3 is less than the third angular-velocity threshold TAV3 in step S133, the electronic controller circuitry EC1 selects the second technical level TL2 in step S135. The electronic controller circuitry EC1 controls the display ED2 to display the second technical level TL2.

Figure 23:
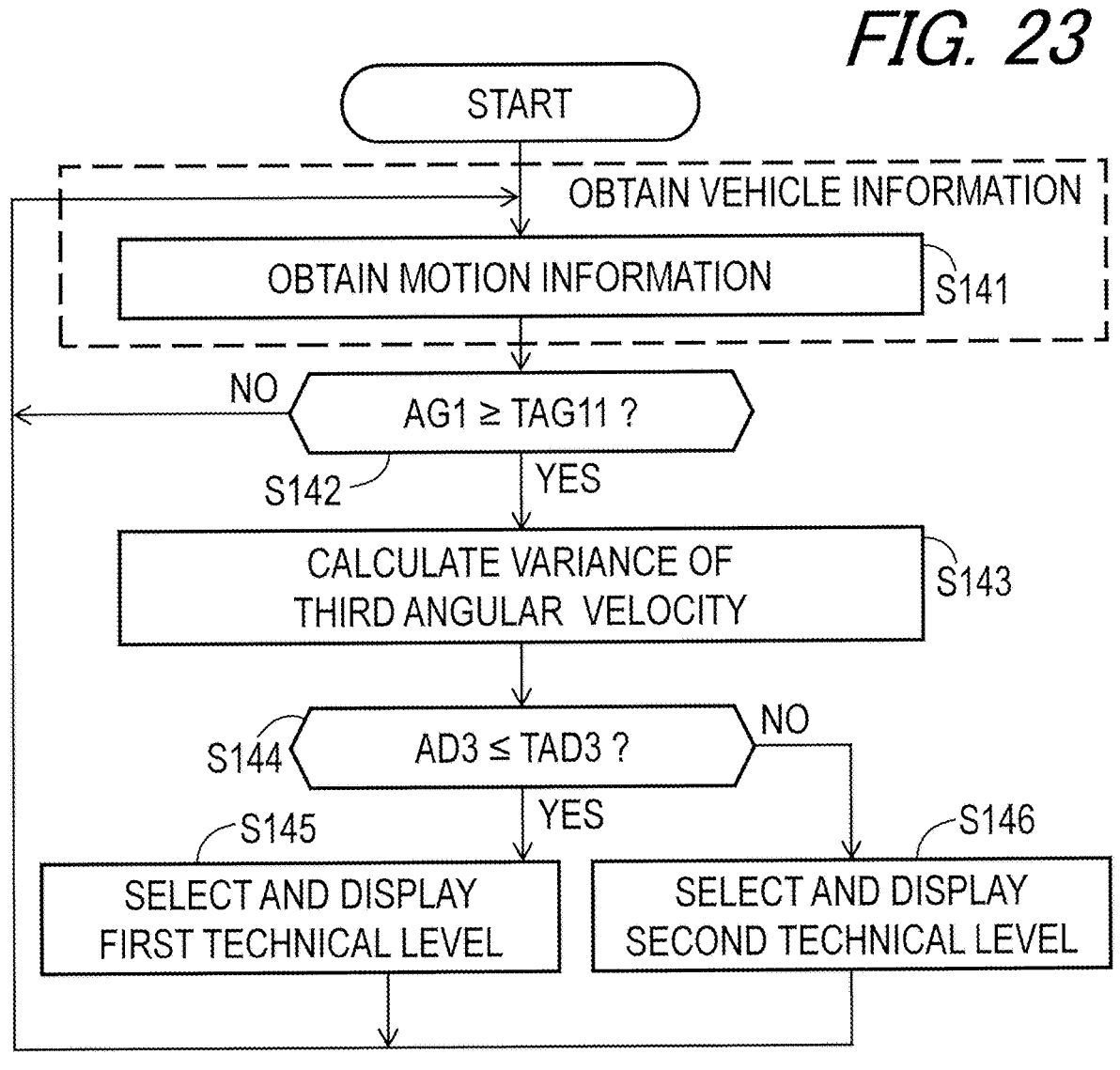

As seen in FIG. 23, the electronic controller circuitry EC1 is configured to determine whether the human-powered vehicle B is cornering based on the motion information INF21. In step S141, the second sensor SS2 obtains the vehicle information INF2. For example, the motion sensor MS obtains the motion information INF21. The electronic controller circuitry EC1 receives the output of the motion sensor MS of the second sensor SS2. The electronic controller circuitry EC1 recognizes or calculates the first rotation angle AG1 of the human-powered vehicle B based on the output of the motion sensor MS. Furthermore, the electronic controller circuitry EC1 receive the third rotation angle AG3 from the motion sensor MS. The electronic controller circuitry EC1 calculates the third angular velocity AV3 of the human-powered vehicle B based on the third rotation angle AG3. The electronic controller circuitry EC1 stores the third rotation angles AG3 received from the motion sensor MS in the memory EC12 during cornering. The electronic controller circuitry EC1 stores the calculated third angular velocities AV3 in the memory EC12 during cornering.

In step S142, the electronic controller circuitry EC1 determines whether the human-powered vehicle B is cornering based on the motion information INF21. In a case where the electronic controller circuitry EC1 concludes that the first rotation angle AG1 is less than the first angle threshold TAG11 in step S142, the process returns to step S141. In a case where the electronic controller circuitry EC1 concludes that the first rotation angle AG1 is greater than or equal to the first angle threshold TAG11 in step S142, the process proceeds to step S143.

In step S143, the electronic controller circuitry EC1 calculates a variance AD3 of the third angular velocity AV3 based on the third angular velocities AV3 calculated by the electronic controller circuitry EC1 in step S141.

In step S144, the electronic controller circuitry EC1 compares the variance AD3 of the third angular velocity AV3 with a variance threshold TAD3. In a case where the variance AD3 is less than or equal to the variance threshold TAD3, it can be understood that the human-powered vehicle B is cornering stably. Thus, in a case where the electronic controller circuitry EC1 concludes that the variance AD3 is less than or equal to the variance threshold TAD3 in step S144, the electronic controller circuitry EC1 selects the first technical level TL1 in step S145. The electronic controller circuitry EC1 controls the display ED2 to display the first technical level TL1.

In a case where the variance AD3 is greater than the variance threshold TAD3, it can be understood that the human-powered vehicle B is cornering unstably. Thus, in a case where the electronic controller circuitry EC1 concludes that the variance AD3 is greater than the variance threshold TAD3 in step S144, the electronic controller circuitry EC1 selects the second technical level TL2 in step S146. The electronic controller circuitry EC1 controls the display ED2 to display the second technical level TL2.

Figure 24:
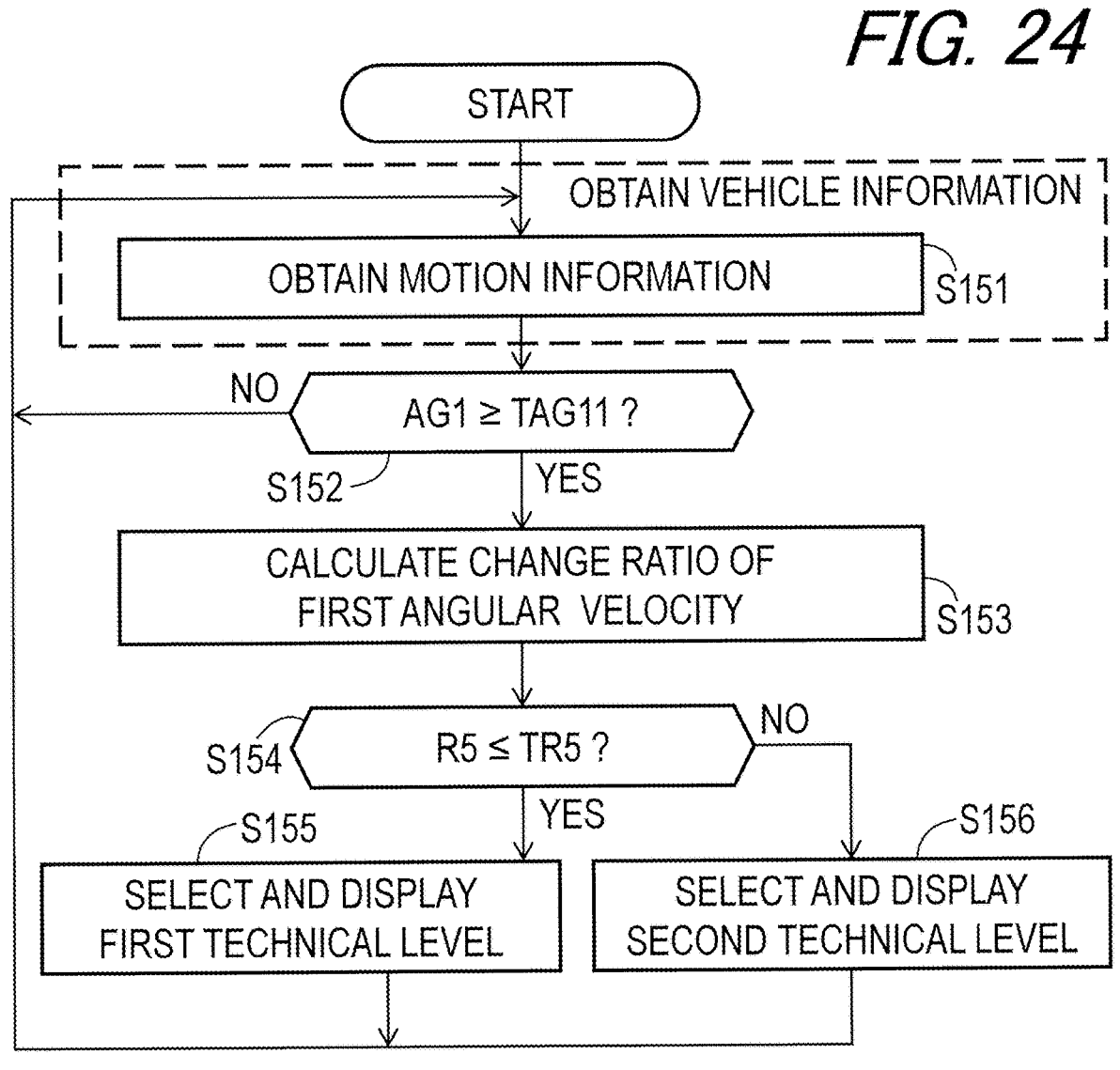

As seen in FIG. 24, the electronic controller circuitry EC1 is configured to determine whether the human-powered vehicle B is cornering based on the motion information INF21. In step S151, the second sensor SS2 obtains the vehicle information INF2. For example, the motion sensor MS obtains the motion information INF21. The electronic controller circuitry EC1 receives the output of the motion sensor MS of the second sensor SS2. The electronic controller circuitry EC1 recognizes or calculates the first rotation angle AG1 of the human-powered vehicle B based on the output of the motion sensor MS. The electronic controller circuitry EC1 calculates the first angular velocity AV1 based on the first rotation angle AG1. The electronic controller circuitry EC1 stores the first rotation angles AG1 received from the motion sensor MS in the memory EC12 during cornering. The electronic controller circuitry EC1 stores the calculated first angular velocities AV1 in the memory EC12 during cornering.

In step S152, the electronic controller circuitry EC1 determines whether the human-powered vehicle B is cornering based on the motion information INF21. In a case where the electronic controller circuitry EC1 concludes that the first rotation angle AG1 is less than the first angle threshold TAG11, the process returns to step S151. In a case where the electronic controller circuitry EC1 concludes that the first rotation angle AG1 is greater than or equal to the first angle threshold TAG11, the process proceeds to step S153.

In step S153, the electronic controller circuitry EC1 calculates a change ratio R5 of the first angular velocity AV1 based on the first rotation angles AG1 or the first angular velocities AV1 stored in the memory EC12.

In step S154, the electronic controller circuitry EC1 compares the change ratio R5 with a ratio threshold TR5. In a case where the change ratio R5 is less than or equal to the ratio threshold TR5, it can be understood that the human-powered vehicle B is cornering stably. Thus, in a case where the electronic controller circuitry EC1 concludes that the change ratio R5 is less than or equal to the ratio threshold TR5 in step S154, the electronic controller circuitry EC1 selects the first technical level TL1 in step S155. The electronic controller circuitry EC1 controls the display ED2 to display the first technical level TL1.

In a case where the change ratio R5 is greater than the ratio threshold TR5, it can be understood that the human-powered vehicle B is cornering unstably. Thus, in a case where the electronic controller circuitry EC1 concludes that the change ratio R5 is greater than the ratio threshold TR5 in step S154, the electronic controller circuitry EC1 selects the second technical level TL2 in step S156. The process returns to step S151. The electronic controller circuitry EC1 controls the display ED2 to display the second technical level TL2.

In the above embodiments and the modifications thereof, the electronic controller circuitry EC1 is configured to select the technical level TL in real time. In each of the above embodiments and the modifications thereof, however, the electronic controller circuitry EC1 can be configured to select the technical level TL based on corrected data after the user finishes riding the human-powered vehicle B.

In the above embodiments and the modifications thereof, the electronic controller circuitry EC1 is provided to the electric device ED. In each of the above embodiments and the modifications thereof, however, the electronic controller circuitry EC1 can be provided to at least one of the human-powered vehicle components BC other than the electric device ED if needed or desired.

In the above embodiments and the modifications thereof, the second sensor SS2 is provided to the electric device ED. In each of the above embodiments and the modifications thereof, however, the second sensor SS2 can be provided to at least one of the human-powered vehicle components BC other than the electric device ED if needed or desired. The second sensor SS2 can be provided separately from the human-powered vehicle components BC if needed or desired. In such modifications, the second sensor SS2 can include its own electronic controller circuitry and communicator circuitry if needed or desired.

In the above embodiments and the modifications thereof, the first sensor SS1 is provided to the brake device 24 and/or 26. The front force sensor FS1 is provided to the front brake device 24. The rear force sensor FS2 is provided to the rear brake device 26. However, the front force sensor FS1 can be provided to one of the brake operating device 34 and the hydraulic hose H1 if needed or desired. The rear force sensor FS2 can be provided to one of the brake operating device 36 and the hydraulic hose H2 if needed or desired.

In the modification shown in FIG. 4, step S50 can be executed before obtaining the brake information INF1 after the electronic controller circuitry EC1 concludes that the first angular velocity AV1 is less than the first angular-velocity threshold TAV1. Step S51 can be executed before obtaining the brake information INF1 after the electronic controller circuitry EC1 concludes that the first angular velocity AV1 is greater than or equal to the first angular-velocity threshold TAV1.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A detection system comprising:
a first sensor configured to obtain brake information relating to braking of a brake device of a human-powered vehicle;
a second sensor configured to obtain vehicle information including at least one of motion information relating to a motion of the human-powered vehicle, and geographical information relating to a geographical location of the human-powered vehicle; and electronic controller circuitry configured to determine a technical level of a rider of the human-powered vehicle based on the brake information and the vehicle information, wherein
the technical level includes a first technical level and a second technical level,
the electronic controller circuitry is configured to select the first technical level in a case where the brake information meets a first brake condition and where the vehicle information meets a first vehicle condition, and
the electronic controller circuitry is configured to select the second technical level in a case where the brake information meets a second brake condition and where the vehicle information meets the first vehicle condition, the second brake condition being different from the first brake condition.

2. The detection system according to claim 1, wherein the electronic controller circuitry is configured to determine the technical level based on the brake information and the motion information.

3. The detection system according to claim 1, wherein the electronic controller circuitry is configured to determine the technical level based on the brake information and the geographical information.

4. The detection system according to claim 1, wherein the first sensor is configured to be provided to the brake device.

5. The detection system according to claim 1, wherein the first sensor includes a strain gauge.

6. The detection system according to claim 1, wherein the second sensor is configured to be provided to a vehicle body of the human-powered vehicle.

7. The detection system according to claim 1, wherein the second sensor includes a motion sensor configured to obtain the motion information.

8. The detection system according to claim 7, wherein the motion sensor includes an acceleration sensor configured to obtain, as the motion information, acceleration applied to the human-powered vehicle.

9. The detection system according to claim 1, wherein the second sensor includes a location sensor configured to obtain the geographical information.

10. The detection system according to claim 9, wherein the location sensor includes a GPS sensor.

11. The detection system according to claim 1, wherein the electronic controller circuitry is configured to select the first technical level in a case where the motion information meets a first motion condition, and
the electronic controller circuitry is configured to select the second technical level in a case where the motion information meets the first motion condition.

12. The detection system according to claim 1, wherein the electronic controller circuitry is configured to select the first technical level in a case where the geographical information meets a first geographical condition, and
the electronic controller circuitry is configured to select the second technical level in a case where the geographical information meets the first geographical condition.

13. The detection system according to claim 1, wherein the electronic controller circuitry is configured to determine whether the human-powered vehicle is cornering based on the motion information.

14. The detection system according to claim 13, wherein the electronic controller circuitry is configured to select the first technical level in a case where the human-powered vehicle is cornering and where a braking time for which the braking is executed meets a braking-time condition.

15. The detection system according to claim 13, wherein the electronic controller circuitry is configured to select the first technical level in a case where the human-powered vehicle is cornering and where a state of the human-powered vehicle is in a predetermined state.

16. The detection system according to claim 1, wherein the electronic controller circuitry is configured to determine whether the human-powered vehicle is going straight based on the motion information.

17. The detection system according to claim 16, wherein the electronic controller circuitry is configured to select the first technical level in a case where the human-powered vehicle is going straight and where a braking time for which the braking is executed meets a braking-time condition.

18. The detection system according to claim 1, wherein the electronic controller circuitry is configured to determine, based on the geographical information, a time period for which the human-powered vehicle travels in a section selected by a user, and the electronic controller circuitry is configured to select the first technical level in a case where a relationship between front power of a front brake device and rear power of a rear brake device meets a brake power condition, or where a slip ratio of the rear brake device meets a rear brake slip condition.

19. A detection system comprising:

a sensor configured to obtain motion information relating to a motion of a human-powered vehicle, and electronic controller circuitry configured to determine a technical level of a rider of the human-powered vehicle based on the motion information, wherein the technical level includes a first technical level and a second technical level, the electronic controller circuitry is configured to select the first technical level in a case where brake information meets a first brake condition and where the motion information meets a first motion condition, and the electronic controller circuitry is configured to select the second technical level in a case where the brake information meets a second brake condition and where the motion information meets the first motion condition, the second brake condition being different from the first brake condition.

20. A detection method comprising:

obtaining brake information relating to braking of a brake device of a human-powered vehicle using a first sensor;

obtaining, using a second sensor, vehicle information including at least one of motion information relating to a motion of the human-powered vehicle, and geographical information relating to a geographical location of the human-powered vehicle; and determining, using electronic controller circuitry, a technical level of a rider of the human-powered vehicle based on the brake information and the vehicle information, wherein the technical level includes a first technical level and a second technical level, the electronic controller circuitry is configured to select the first technical level in a case where the brake information meets a first brake condition and where the vehicle information meets a first vehicle condition, and the electronic controller circuitry is configured to select the second technical level in a case where the brake information meets a second brake condition and where the vehicle information meets the first vehicle condition, the second brake condition being different from the first brake condition.

21. A non-transitory computer-readable storage medium storing program instructions for causing a detection system to execute a detection method comprising:

obtaining brake information relating to braking of a brake device of a human-powered vehicle using a first sensor;

obtaining, using a second sensor, vehicle information including at least one of motion information relating to a motion of the human-powered vehicle, and geographical information relating to a geographical location of the human-powered vehicle; and determining, using electronic controller circuitry, a technical level of a rider of the human-powered vehicle based on the brake information and the vehicle information, wherein the technical level includes a first technical level and a second technical level, the electronic controller circuitry is configured to select the first technical level in a case where the brake information meets a first brake condition and where the vehicle information meets a first vehicle condition, and the electronic controller circuitry is configured to select the second technical level in a case where the brake information meets a second brake condition and where the vehicle information meets the first vehicle condition, the second brake condition being different from the first brake condition.

* * * * *